(12) United States Patent
Batchko et al.

(10) Patent No.: US 7,672,059 B2
(45) Date of Patent: Mar. 2, 2010

(54) FLUIDIC LENS WITH ELECTROSTATIC ACTUATION

(75) Inventors: Robert G. Batchko, Albuquerque, NM (US); Justin Mansell, Albuquerque, NM (US); Andrei Szilagyi, Danville, CA (US)

(73) Assignee: Holochip Corporation, Albuquerque, NM (US)

( * ) Notice: Subject to any disclaimer, the term of this patent is extended or adjusted under 35 U.S.C. 154(b) by 0 days.

(21) Appl. No.: 11/747,845

(22) Filed: May 11, 2007

(65) Prior Publication Data

US 2007/0263293 A1    Nov. 15, 2007

Related U.S. Application Data

(63) Continuation-in-part of application No. 11/383,216, filed on May 14, 2006, and a continuation-in-part of application No. 11/333,817, filed on Jan. 17, 2006, now Pat. No. 7,218,429, and a continuation-in-part of application No. 10/617,572, filed on Jul. 11, 2003, now Pat. No. 7,072,086, and a continuation-in-part of application No. 10/029,399, filed on Oct. 19, 2001, now Pat. No. 7,218,430.

(60) Provisional application No. 60/747,181, filed on May 12, 2006, provisional application No. 60/680,632, filed on May 14, 2005, provisional application No. 60/683,072, filed on May 21, 2005, provisional application No. 60/703,827, filed on Jul. 29, 2005, provisional application No. 60/723,381, filed on Oct. 3, 2005, provisional application No. 60/916,739, filed on May 8, 2007, provisional application No. 60/395,849, filed on Jul. 11, 2002, provisional application No. 60/242,395, filed on Oct. 20, 2000.

(51) Int. Cl.
*G02B 3/12* (2006.01)
*G02B 1/06* (2006.01)

(52) U.S. Cl. ................................ 359/666; 359/665
(58) Field of Classification Search ................. 351/41, 351/159; 359/253, 665, 666, 667
See application file for complete search history.

(56) References Cited

U.S. PATENT DOCUMENTS 696,788 A    4/1902    Clile ........................ 359/689

(Continued)

FOREIGN PATENT DOCUMENTS

WO    WO 99/18456    4/1999

(Continued)

OTHER PUBLICATIONS

U.S. Appl. No. 60/747,181, to Batchko, entitled "Electrostatic Actuation of Fluid Lens", filed May 12, 2006.

(Continued)

*Primary Examiner*—David N Spector
(74) *Attorney, Agent, or Firm*—Joshua D. Isenberg; JDI Patent

(57) ABSTRACT

An electrostatically actuated fluidic device capable of providing a variable focal length lens is disclosed. The device includes an elastic capacitor section, an elastic lens section in fluid communication with the capacitor section, the elastic lens section being characterized by a focal length and a fluid capable of fluid motion disposed at least partially in the capacitor and lens sections. A voltage may be applied to the capacitor section causing it to deform, which causes a portion of the fluid to flow into or out of the lens section. As a result, a change in volume of fluid in the lens section causes it to deform resulting in a variation in the focal length of the lens section.

72 Claims, 41 Drawing Sheets

U.S. PATENT DOCUMENTS

| | | | | |
|---|---|---|---|---|
| 2,300,251 | A | 10/1942 | Flint | 359/666 |
| 2,504,039 | A | 4/1950 | O'Leary | 359/478 |
| 4,261,655 | A | 4/1981 | Honigsbaum | |
| 4,444,471 | A | 4/1984 | Ford, Jr. et al. | |
| 4,466,706 | A | 8/1984 | Lamothe, II | |
| 4,514,048 | A | 4/1985 | Rogers | |
| 4,783,155 | A | 11/1988 | Imataki et al. | 359/666 |
| 4,784,479 | A | 11/1988 | Ikemori | 359/666 |
| 4,890,903 | A | 1/1990 | Treisman et al. | 359/666 |
| 5,672,001 | A | 9/1997 | Bertling et al. | |
| 5,774,273 | A | 6/1998 | Bornhorst | |
| 5,973,852 | A | 10/1999 | Task | 359/666 |
| 6,288,767 | B1 * | 9/2001 | Murata et al. | 349/200 |
| 6,369,954 | B1 | 4/2002 | Berge et al. | 359/666 |
| 6,542,309 | B2 | 4/2003 | Guy | 359/666 |
| 6,618,208 | B1 | 9/2003 | Silver | 359/666 |
| 6,860,601 | B2 | 3/2005 | Shadduck | 351/176 |
| 7,068,439 | B2 | 6/2006 | Esch et al. | 359/666 |
| 7,072,086 | B2 | 7/2006 | Batchko | 359/15 |
| 7,142,369 | B2 | 11/2006 | Wu et al. | 359/666 |
| 7,218,429 | B2 | 5/2007 | Batchko | 359/15 |
| 7,218,430 | B2 | 5/2007 | Batchko | 359/107 |
| 7,359,124 | B1 | 4/2008 | Fang et al. | 359/666 |
| 7,369,321 | B1 | 5/2008 | Ren et al. | 359/666 |
| 7,369,723 | B1 | 5/2008 | Mescher | 385/33 |
| 7,374,301 | B1 | 5/2008 | Simmers | |
| 7,440,193 | B2 * | 10/2008 | Gunasekaran et al. | 359/666 |
| 7,453,646 | B2 * | 11/2008 | Lo | 359/665 |
| 2004/0240076 | A1 | 12/2004 | Silver | 359/666 |
| 2004/0262645 | A1 | 12/2004 | Huff et al. | |
| 2006/0077562 | A1 | 4/2006 | Silver | |
| 2006/0126190 | A1 | 6/2006 | Berge et al. | 359/665 |
| 2006/0164731 | A1 | 7/2006 | Wu et al. | 359/666 |
| 2007/0030573 | A1 | 2/2007 | Batchko | 359/665 |
| 2007/0211207 | A1 | 9/2007 | Lo et al. | 351/41 |
| 2008/0218873 | A1 * | 9/2008 | Batchko et al. | 359/665 |
| 2008/0231963 | A1 * | 9/2008 | Batchko et al. | 359/665 |
| 2008/0285143 | A1 * | 11/2008 | Batchko et al. | 359/665 |
| 2009/0021823 | A1 | 1/2009 | Heim et al. | 359/290 |
| 2009/0040361 | A1 | 2/2009 | Heim et al. | 348/340 |
| 2009/0052049 | A1 * | 2/2009 | Batchko et al. | 359/666 |

FOREIGN PATENT DOCUMENTS

| | | |
|---|---|---|
| WO | WO 2008/138005 A1 * | 11/2008 |
| WO | WO 2008/138010 A1 * | 11/2008 |

OTHER PUBLICATIONS

U.S. Appl. No. 60/680,632, to Batchko, entitled "Fluidic Optical Device", filed May 14, 2005.

U.S. Appl. No. 60/683,072, to Batchko, entitled "Fluidic Optical Devices", filed May 21, 2005.

U.S. Appl. No. 60/703,827, Batchko, entitled "Fluidic Optical Devices", filed Jul. 29, 2005.

U.S. Appl. No. 60/723,381, to Batchko, entitled "Fluidic Optical Devices" filed Oct. 3, 2005.

U.S. Appl. No. 60/916,739, to Batchko, entitled "Fluidic Lens With Manually-Adjustable Focus" filed May 8, 2007.

U.S. Appl. No. 60/395,849, to Batchko, entitled "Digital Focus Lens System", filed Jul. 11, 2002.

U.S. Appl. No. 60/242,395, to Batchko, entitled "Combinatorial Optics" filed Oct. 20, 2000.

J. Chen et al., "Variable-Focusing Microlens with Microfluidic Chip", J. Micromech.Microeng. 14, p. 675-680, 2004.

S. Perichon et al. "Stretchable Gold Conductors on Elastomeric Substrate", Applied Physics Letters, vol. 82, No. 15, p. 2404-2406, Apr. 14, 2003.

Hongwen Ren et al. "Variable-Focus Liquid Lens By Changing Aperature", Applied Physics Letters, vol. 86, No. 21107, May 17, 2005.

International Search Report and Written Opinion of the International Searching Authority for the International application No. PCT/US08/63107 dated Aug. 4, 2008, 7 pages.

Office Action dated Oct. 22, 2008 for U.S. Appl. No. 11/928,076, 8 pages.

Office Action dated Jun. 12, 2008 for U.S. Appl. No. 11/383,216, 22 pages.

International Search Report and Written Opinion of the International Searching Authority dated Aug. 8, 2008—International Patent Application No. PCT/ US08/63122.

Final Office Action dated Jan. 22, 2009 for U.S. Appl. No. 11/383,216, 18 pages.

Office Action dated Mar. 5, 2009 for U.S. Appl. No. 11/928,216, 7 pages.

Notice of Allowance and Fee(s) Due dated Apr. 9, 2009 for U.S. Appl. No. 11/383,215, 6 pages.

Office Action dated Apr. 28, 2009 for U.S. Appl. No. 12/117,625, 6 pages.

Notice of Allowance and Fee(s) Due dated Apr. 23, 2009 for U.S. Appl. No. 11/928,076, 7 pages.

Final Office Action dated Sep. 17, 2009 for U.S. Appl. No. 12/117,625 entitled "Fluidic Lens With Manually-Adjustable Focus".

Ex parte Quayle Action dated Aug. 20, 2009 for U.S. Appl. No. 11/928,076 entitled "Fluidic Optical Devices".

Notice of Allowance dated Aug. 13, 2009 for U.S. Appl. No. 11/928,216 entitled "Fluidic Optical Devices".

Notice of allowance dated Aug. 28, 2009 for U.S. Appl. No. 11/383,216 entitled "Fluidic Optical Devices".

Non-final Office Action dated Sep. 21, 2009 for U.S. Appl. No. 11/928,376 entitled "Fluidic Optical Devices".

* cited by examiner

FLUIDIC LENS WITH ELECTROSTATIC ACTUATION

CLAIM OF PRIORITY

This application claims the benefit of priority of the U.S. Provisional Patent Application No. 60/747,181, entitled "ELECTROSTATIC ACTUATION OF FLUIDIC LENS", filed May 12, 2006, which is hereby incorporated by reference. This application is a continuation-in-part of commonly assigned U.S. patent application Ser. No. 11/383,216 filed May 14, 2006, entitled FLUIDIC OPTICAL DEVICE, and published as U.S. Patent Application Publication 20070030573, the contents of which are incorporated herein by reference. This application claims the benefit of priority of U.S. patent application Ser. No. 11/383,216 and the benefit of priority of all applications to which U.S. patent application Ser. No. 11/383,216 claims the benefit of priority, including U.S. Provisional Patent Application 60/680,632 to Robert G. Batchko et al entitled "FLUIDIC OPTICAL DEVICES", filed May 14, 2005, the entire disclosures of which are incorporated herein by reference, U.S. Provisional Patent Application 60/683,072 to Robert G. Batchko et al entitled "FLUIDIC OPTICAL DEVICES", filed May 21, 2005, the entire disclosures of which are incorporated herein by reference, U.S. Provisional Patent Application 60/703,827 to Robert G. Batchko et al entitled "FLUIDIC OPTICAL DEVICES", filed Jul. 29, 2005, the entire disclosures of which are incorporated herein by reference, U.S. Provisional Patent Application 60/723,381 to Robert G. Batchko et al., filed Oct. 3, 2005, the entire disclosures of which are incorporated herein by reference, and U.S. Provisional Patent Application 60/747, 181. This application also claims the benefit of priority of U.S. Provisional Patent Application 60/916,739 to Robert G. Batchko et al., filed May 8, 2007, the entire disclosures of which are incorporated herein by reference.

This application is also a continuation-in-part of U.S. patent application Ser. No. 10/617,572, filed Jul. 11, 2003, published as U.S. Patent Application Publication 20040114203 A1 and issued as U.S. Pat. No. 7,072,086, the entire disclosures of which are incorporated herein by reference. This application is also a continuation-in-part of U.S. patent application Ser. No. 11/333,817, filed Jan. 17, 2006, now U.S. Pat. No. 7,218,429 and published as U.S. Patent Application Publication 2006/0114534 A1, the entire disclosures of which are incorporated herein by reference. Application Ser. Nos. 10/617,572 and 11/333,817 claim the benefit of U.S. Provisional Patent Application No. 60/395,849 filed Jul. 11, 2002, the entire disclosures of which are incorporated herein by reference. This application is also a continuation-in-part of U.S. patent application Ser. No. 10/029,399 filed Oct. 19, 2001, now U.S. Pat. No. 7,218,430 and published as U.S. Patent Application Publication 2002/0158866 A1, the entire contents of which are incorporated herein by reference. Application Ser. No. 10/029,399 claims the benefit of U.S. Provisional Application 60/242,395 filed Oct. 20, 2000, the entire disclosures of which are incorporated herein by reference. This application claims the benefit of priority of application Ser. Nos. 11/333,817, 10/617,572, 10/029,399, 60/395,849, and 60/242,395.

FIELD OF THE INVENTION

This invention generally relates to fluidic lens systems and more particularly to electrostatically actuated fluidic lens.

BACKGROUND OF THE INVENTION

The prior art contains a number of references to fluidic lens systems. A notable example is provided by those based on the electro-wetting effect (see, e.g. Bruno Berge, et al., "Lens with variable focus", PCT Publication No. WO 99/18456). In that system, a lens-like volume of one refractive liquid is separated from its surroundings on at least one side by another immiscible refractive liquid. Although this yields a conveniently compact system, it is difficult to provide enough refractive index difference between the two liquids to provide adequate light-ray bending ability. A refractively superior system has also been demonstrated (see J. Chen et al., J. Micromech. Microeng. 14 (2004) 675-680) wherein only one lenticular body is provided, bounded on at least one side by an optically clear, compliant membrane. In that system, the refractive power of the lens is controlled by pumping in or out a controlled amount of fluid, thereby changing the curvature of the bounding membrane. Although improved, that system still suffers from the disadvantage that the pressurized fluid source is located remotely. This makes the form-factor of the whole system inconvenient.

Thus, there is a need in the art, for a fluidic lens that overcomes the above disadvantages.

BRIEF DESCRIPTION OF THE DRAWINGS

Other objects and advantages of the invention will become apparent upon reading the following detailed description and upon reference to the accompanying drawings in which.

DESCRIPTION OF THE SPECIFIC EMBODIMENTS

Although the following detailed description contains many specific details for the purposes of illustration, anyone of ordinary skill in the art will appreciate that many variations and alterations to the following details are within the scope of the invention. Accordingly, the exemplary embodiments of the invention described below are set forth without any loss of generality to, and without imposing limitations upon, the claimed invention.

Alternative fluidic optical devices are described in commonly assigned U.S. provisional patent applications 60/680, 632, filed May 14, 2005, 60/683,072, filed May 21, 2005, 60/703,827, filed Jul. 29, 2005 and 60/723,381, filed Oct. 3, 2005, which are incorporated herein by reference. Such fluidic optical devices include a device skeleton having an aperture and a reservoir in fluid communication with the aperture. The aperture and reservoir are integral to the skeleton. A transparent fluid is enclosed within the aperture and reservoir. One or more optical surfaces at least partially bound the aperture. Distortion of the reservoir results in the displacement of at least a portion of the fluid between the reservoir and the aperture. In response to the fluid displacement at least one of the optical surfaces is displaced from an initial position to vary an optical property of the device. There are sufficient restoring forces in at least a portion of the distorted reservoir, displaced fluid, aperture and actuator to restore the displaced optical surface to its initial position upon release of a force applied to the reservoir.

The device may include an actuator adapted to apply a force to and cause a distortion in at least a portion of the reservoir. Major Goals of fluidic lens actuation include the following:

Relatively Low Cost: e.g., about $0.01 bill of materials (BOM) per lens

Greater than about 100 Diopter focal power range in ~100 $mm^3$ footprint (e.g., 10 mm in length by 10 mm in width by 1.0 mm thick.

Achieve performance specifications with respect to speed, power, temperature, quality.

Approach to Solution

Achieve as much integration of the Lens and Actuator as possible. It is desirable that the lens and its actuator be designed and manufactured to operate as one.

Eliminate extraneous materials

Ideally, the lens and actuator comprises one or more of fluid, plastic and metal.

Utilize as much available space (e.g., 100 $mm^3$) as possible, while achieving desired energy/power requirements.

Figure 1:
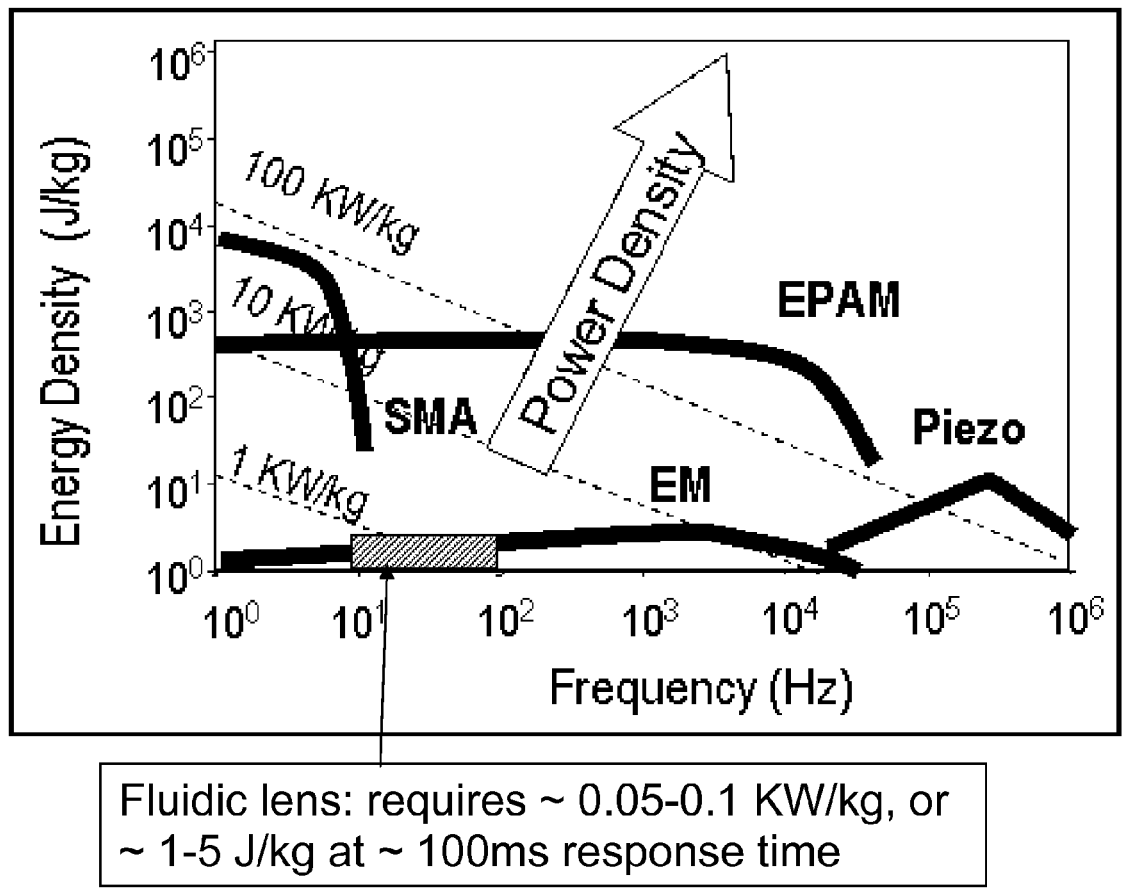
FIG. 1 is a graph of the energy and power requirements as a function of actuation frequency for various actuators.

There are many possible actuator solutions. Among these are shape memory alloy (SMA) actuators, Electroactive Polymer (EAP) actuators also known as Electroactive Polymer Artificial Muscle (EPAM) actuators, electrostatic actuators, piezoelectric actuators, stepper motor or other forms of motor actuators and electromagnetic (EM) actuators. Estimated energy and power requirements as a function of actuation frequency for these various actuators are shown in FIG. 1. However, shape memory alloy actuators tend to be bistable and can be difficult to work with. EAP/EPAM actuators may have relatively poor work function. Piezo actuators tend to be expensive and EM actuators tend to be relatively weak and bulky. Electrostatic actuators are attractive due to their relatively low cost, simple manufacturing and reliable performance with no additional materials. Electrostatic actuators also have relatively low energy consumption at response times of interest to certain commercial applications as indicated in FIG. 1.

Figure 2A:
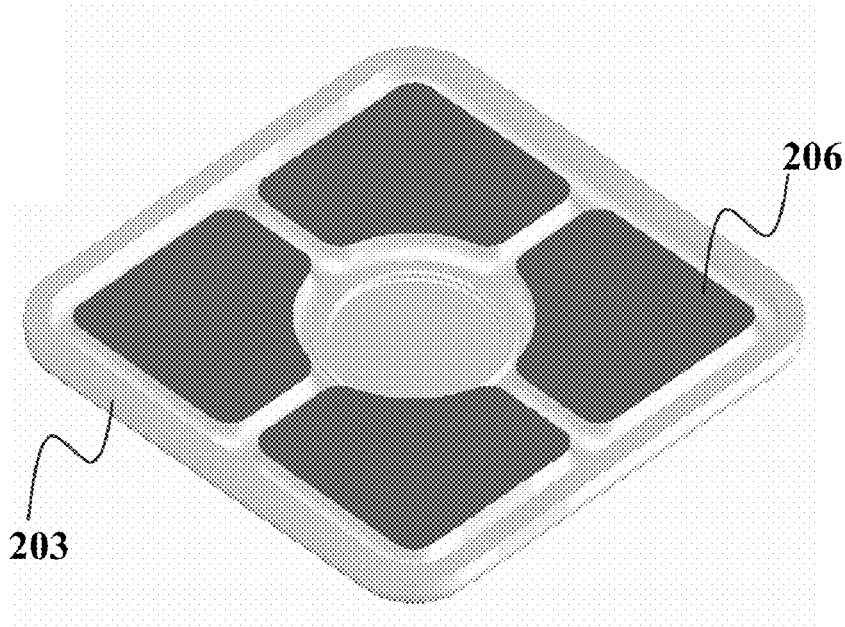
FIG. 2A is a three-dimensional view of One half of Double Lens, or membrane side of Single Lens according to an embodiment of the present invention.
Figure 2B:
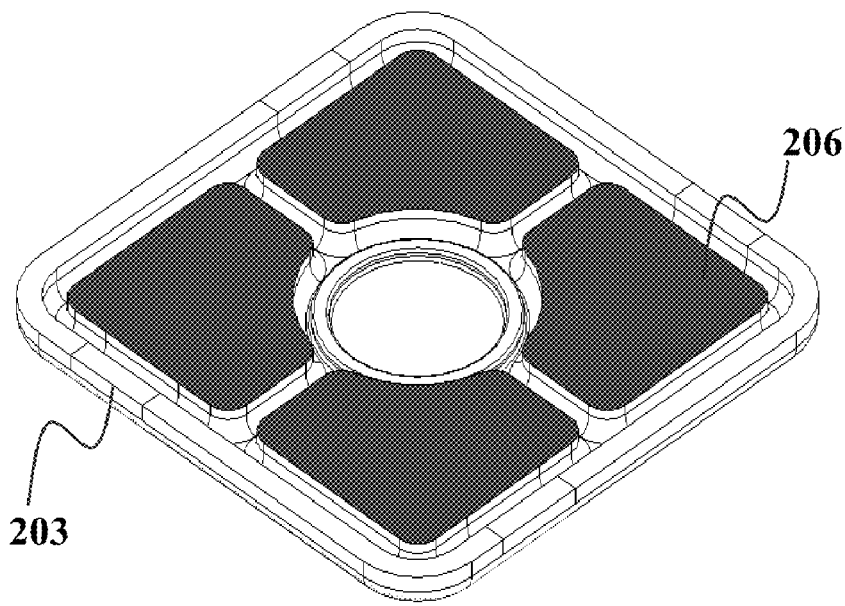
FIG. 2B is a three-dimensional view of One half of Double Lens, or membrane side of Single Lens with edge lines shown.

A type of electrostatic actuator referred to herein as a Capacitive Fluidic Lens is a small dynamically adjustable optical lens. An example of a capacitive fluidic lens 200 according to an embodiment of the invention is depicted in FIGS. 2A-2F. The capacitive fluidic lens 200 includes a fluid filled elastomeric membrane 202. The membrane 202 includes insulated conducting electrodes 204 on the inside and metalized contacts that lead to the outside. An electrostatic force between the electrodes 204 and one or more spaced-apart electrically conductive electrodes 206 exerts pressure on fluid in a reservoir bounded by the membrane 202 which controls lens optical power. An electrostatic force is applied to the membrane 202 when a voltage is applied between the electrodes 204 and 206. This force causes the conductive surfaces to move toward each other, which pressurizes the contained fluid and bulges out a center lens area 208. This causes an approximately spherical protrusion that provides the curvature necessary to act as a lens as shown in FIGS. 2D-2E.

It is noted that there may be two or more insulated electrodes on the membrane. Multiple electrode segments allow for asymmetrical actuation of the lens and control over its shape. In addition, the membrane may include channels between the electrodes that facilitate fluid flow toward the central lens section.

Figure 2C:
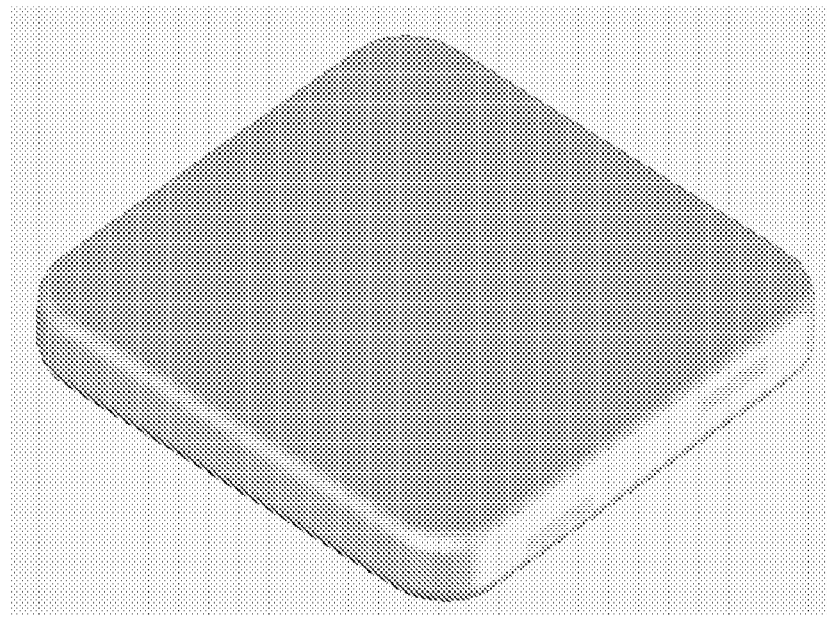
FIG. 2C is a three-dimensional view of Relaxed Double Lens with exposed electrical contacts.
Figure 2D:
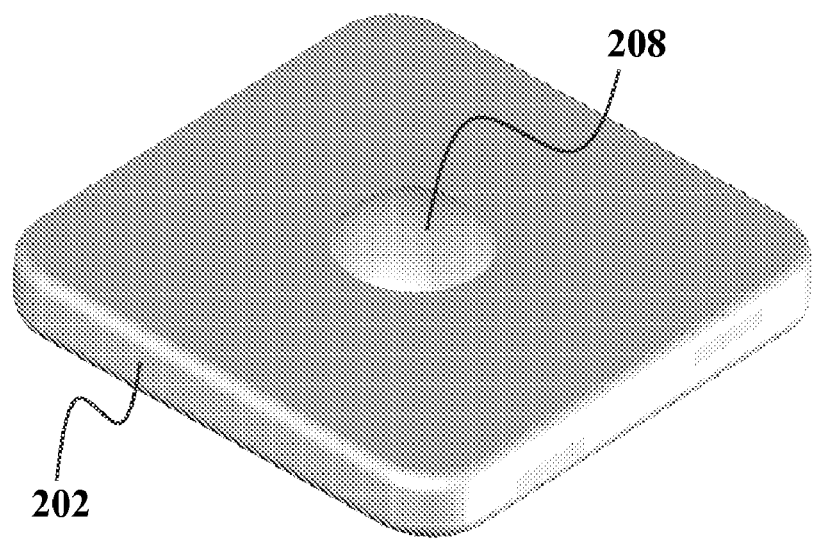
FIG. 2D is a three-dimensional view of Activated Double Lens.
Figure 2E:
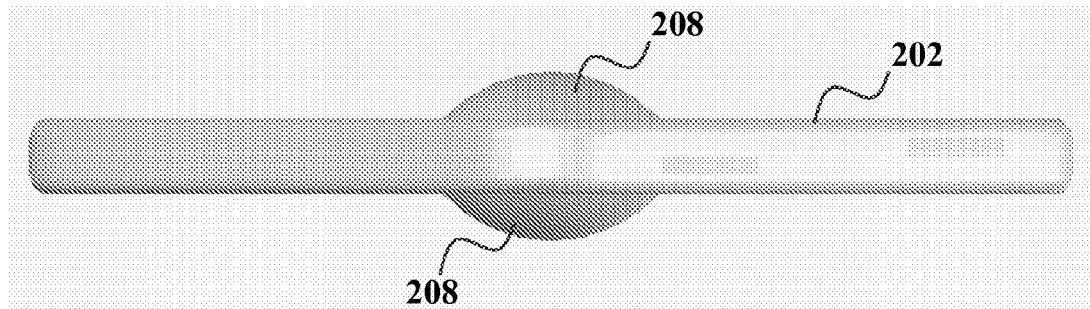
FIG. 2E is a side view of the Activated Double Lens of FIG. 2D.
Figure 2F:
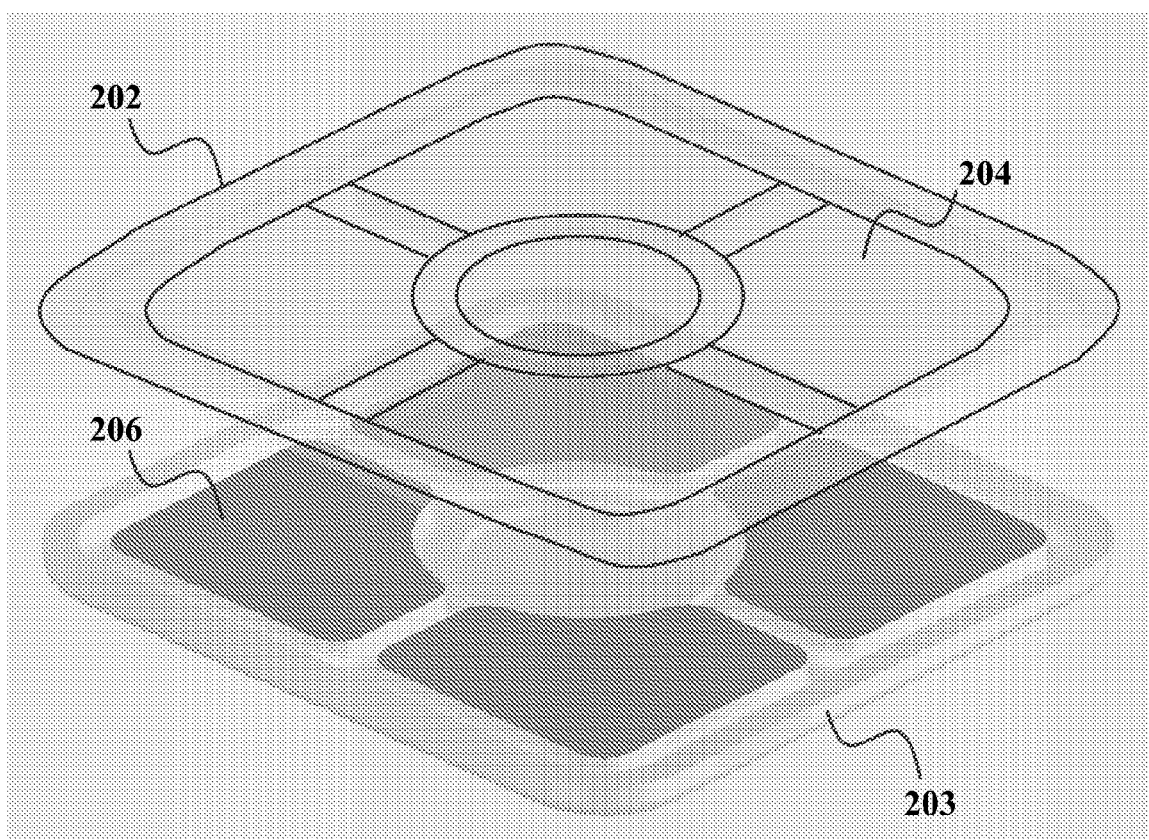
FIG. 2F is an exploded view of a double lens according to an embodiment of the present invention showing insulated capacitive surfaces on the inside and metal contacts that lead to the outside.
Figure 2G:
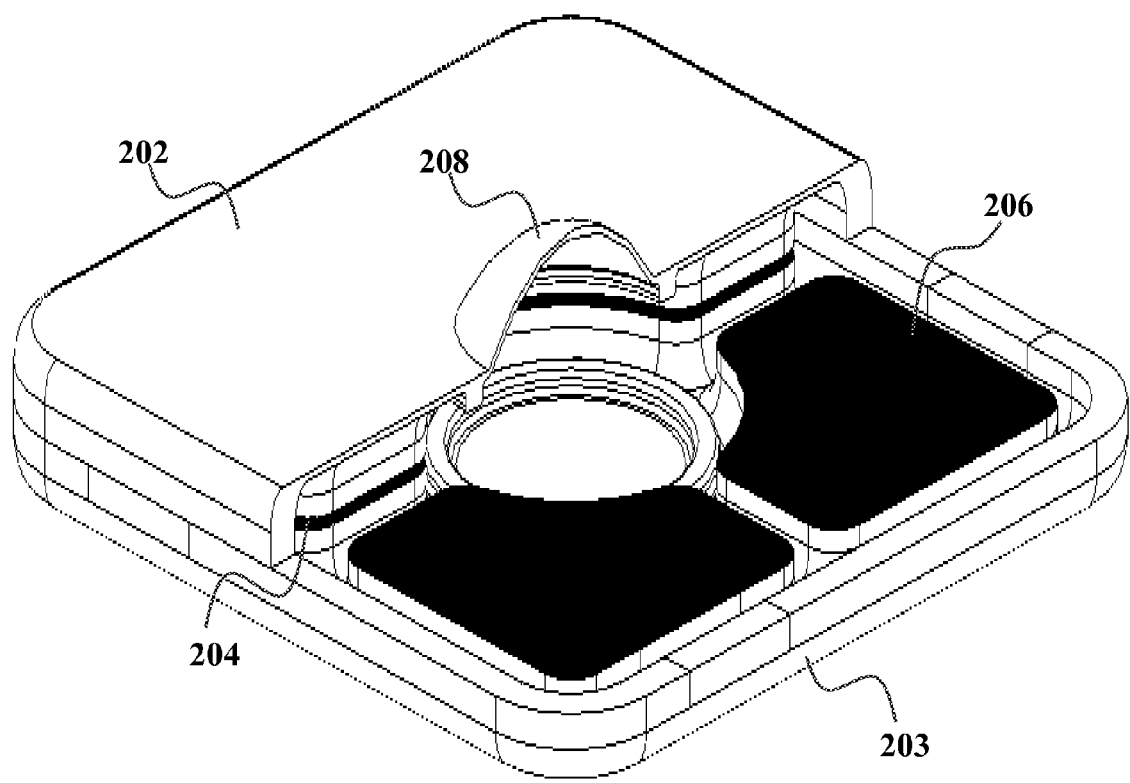
FIG. 2G is a three-dimensional view of Double Lens with cutaway.

As shown in FIGS. 2C-2D, the fluidic lens may be a single membrane 202 with a single lens area 208 that curves under fluid pressure. Alternatively, as shown in FIGS. 2E-2G, capacitive fluidic lenses according to embodiments of the present invention may be arranged in either a single lens configuration where there is one flexible bulging membrane 202 and a rigid base 203, or with two flexible bulging membranes 202A, 202B mounted back to back. The single lens of FIGS. 2A-2B may have a smaller package, while the double lens of FIG. 2B may have twice the optical power. It is possible to form a fluidic lens structure using two halves of the type shown in FIGS. 2A-2B to produce a double action fluidic lens.

It is known in the art that electrostatic actuators tend to be bi-stable unless a zipper action is used; that is to say, when parallel plates are actuated against a linearly elastic restoring force, electrostatic actuation tends to be snap acting because the electrostatic force is proportional to the reciprocal of the square of the gap distance. However, if the geometry of the actuator provides a closing action that starts at one end and gradually closes zippers the gap closed from one end to the other, a stable, proportional actuation occurs. The Capacitive Fluidic Lens utilizes this zipper action by allowing the conductive surfaces to touch at the outer edge of the system first. Then, as voltage is applied, the contacting surface line moves toward the center proportionally.

Such wedged or 'zipper' actuators typically use an air dielectric (instead of fluid as in the present example). In such a case, the conducting plate (or elastic membrane in the present case) provides a restoring force characterized, e.g., by a spring constant. The restoring force prevents the electrodes from snapping together abruptly. The viscosity of the fluid may provide a damping force.

By way of example, zipper actuation may be implemented where an electrode and a conductive membrane start out in a wedged configuration with the electrode and membrane furthest apart in the middle and closest together at a periphery. Alternatively, a smaller gap could also be located proximate to the center (i.e., the optical aperture) and the larger gap could be located closer to the outer edge of the membrane. In this latter case, flow channels may be provided in order to allow the fluid to flow from the outer edge to the central optical aperture.

As a voltage is applied between the electrode and membrane they are drawn into closer contact with each other with the edge of the contacting regions being drawn radially inward as greater and greater voltage is applied. Mechanical forces and viscoelastic forces between the membrane and a fluid prevent the membrane from "snapping" against the electrode as soon as a voltage is applied.

A high index of refraction of the contained fluid adds to the optical power of the lens. Therefore, a higher power lens can be created in smaller package with a careful choice of optical fluid. Typical good fluids are Fomblin and silicone (PDMS) oils.

Although adding to the overall optical power, high refractive index materials can cause large Fresnel reflections which add to the loss of the optical system. Some of these Fresnel reflection losses are able to be compensated by broad-band anti-reflection coatings. Furthermore, it is possible to make the membrane itself act as the anti-reflection coating.

The choice of elastomeric material is paramount to the design of the Capacitive Fluidic Lens. It requires good optical clarity, high elastic strain ability with little or no creep, and ease of manufacturing. PDMS is a good candidate as well as some clear thermo-plastic elastomers, which can be injection molded. For the conductive surfaces, a filler material can be added to the bulk media to provide electrical conductivity. See Electrical Contacts and Capacitive Surfaces for more details and alternatives.

By way of example, and without limitation, the elastomeric material may be made of a silicone-based polymer such as poly(dimethylsiloxane) also known as PDMS or a polyester material such as PET or Mylar™. It is noted that if the fluid and membrane may have sufficiently similar refractive indices, or include a suitable optical coating, scattering of light at their interface can be significantly reduced. Further, it may be desirable to select a membrane having an index of refraction that serves to substantially impedance match the refractive indices of the fluid and the external environment, thereby reducing optical scattering in the proximity of the optical surfaces of the capacitive lens.

The Electrical Contacts and the Capacitive Surfaces are made by applying a metallized coating to the flexible membranes, or by adding conductive filler material to the bulk material. Externally, electrical connections are then made by physical contact to exposes pads, or by soldering leads to the pads. The Capacitive Surfaces require dielectric insulation, which can be formed by a number of materials and coating methods. One good choice is Teflon, which can be applied by either dipping, spraying.

With three or more isolated capacitive regions, image stabilization algorithms can be applied to tip the axis of the lens and dynamically stabilize the image. Static lenses and other optical elements, placed in contact with or spaced apart from the fluidic lens (or lenses in a zoom configuration), may be desirable in order to add or subtract a static amount of diopters from the range of diopters of the fluid lens. When the f/# (focal length/diameter) of the fluid lens goes below 10, spherical aberration may become significant. In this case, a static aspheric optical element, in optical communication with the fluidic lens, may be desirable in order to correct for such spherical aberration.

Most zoom lenses follow a design having a number of individual lenses that may be either fixed, or slide axially along the body of the lens. As the magnification of a zoom lens changes, it is necessary to compensate for any movement of the focal plane to keep the focused image sharp. This compensation may be done by mechanical means (moving the complete lens assembly as the magnification of the lens changes), or optically (arranging the position focal plane to vary as little as possible as the lens is zoomed). With the capacitive fluidic lenses of embodiments of the present invention, such a zoom lens system can be implemented without any of the lenses having to translate.

Figure 3A:
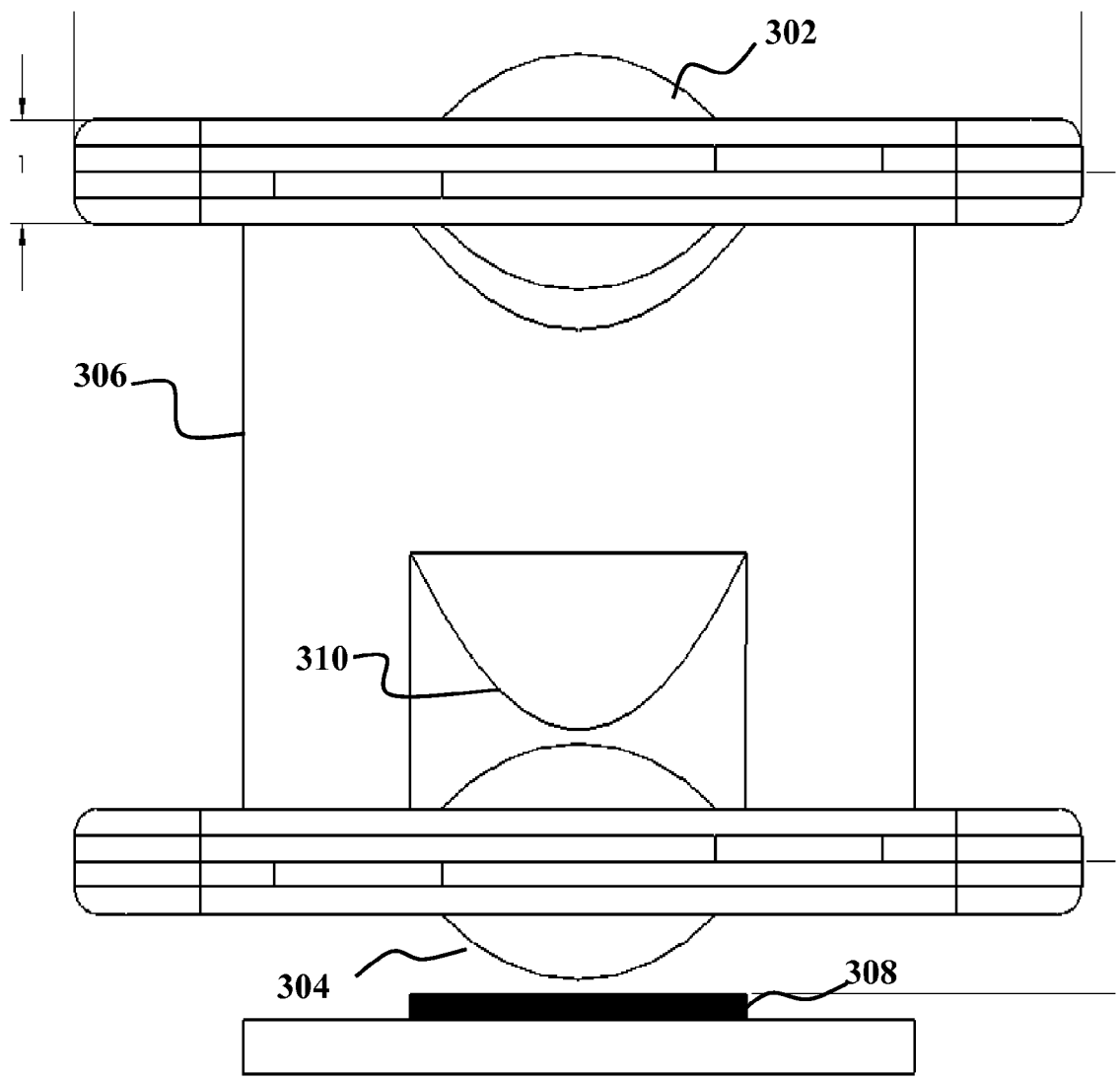
FIG. 3A is a side view of Dual Double Lens with fixed lens body for zoom capability and an image sensor.
Figure 3B:
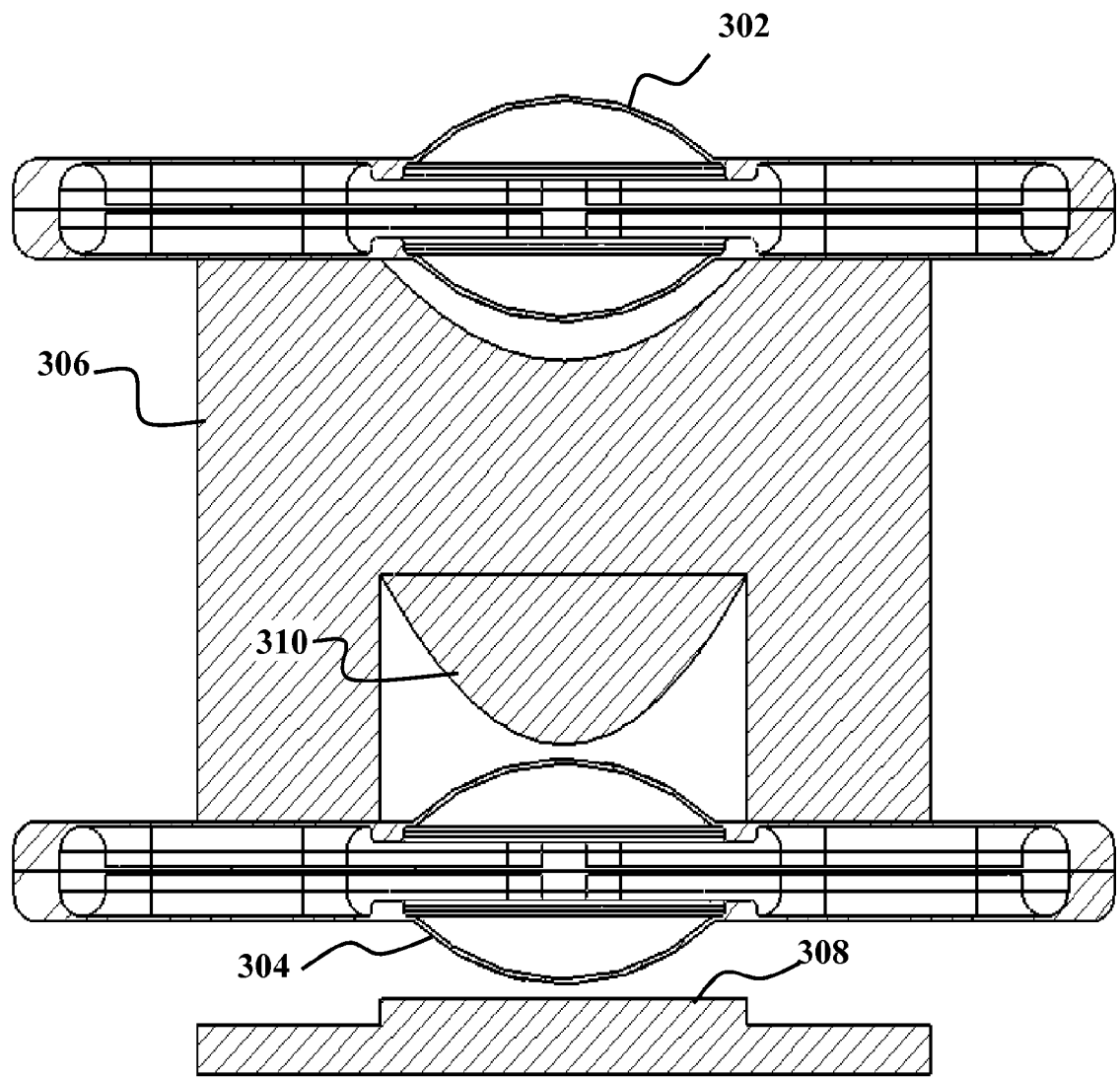
FIG. 3B is a cross-sectional view of Dual Double Lens with fixed lens body for zoom capability and an image sensor of FIG. 3A.
Figure 3C:
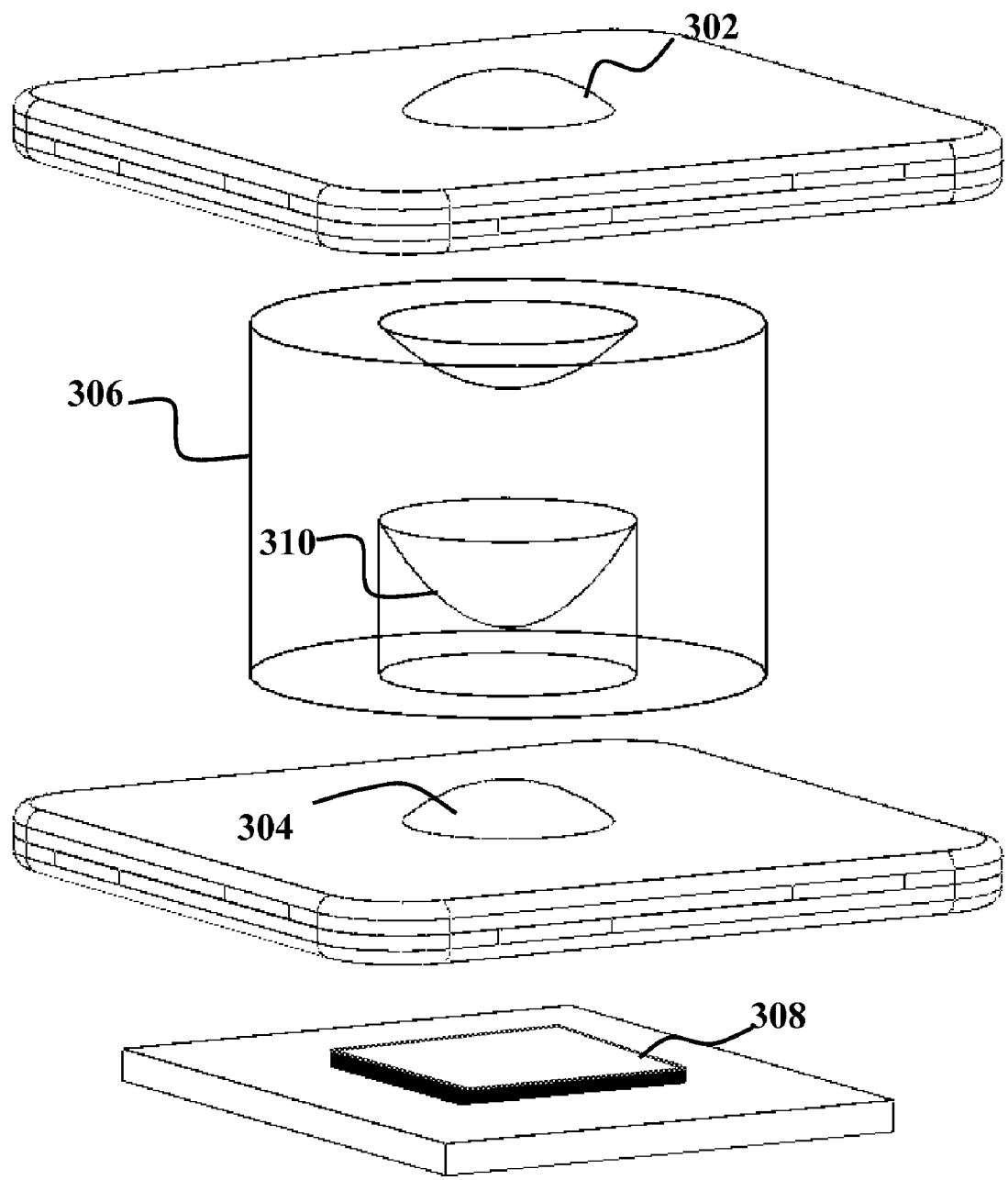
FIG. 3C is an exploded, perspective view of Dual Double Lens with fixed lens body for zoom capability and an image sensor of FIG. 3A.
Figure 3D:
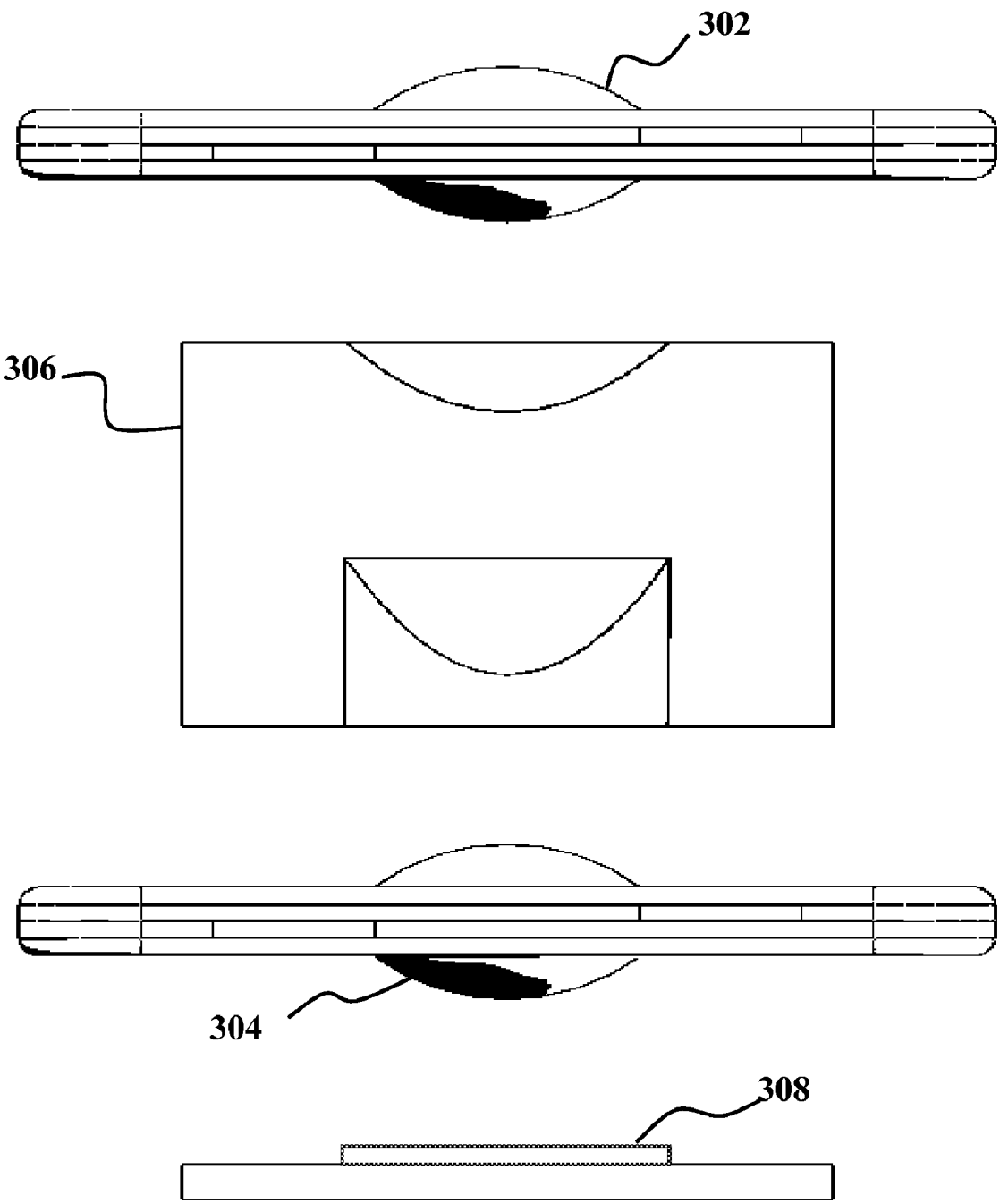
FIG. 3D is an exploded side view of Dual Double Lens with fixed lens body for zoom capability and an image sensor of FIG. 3A.

By way of example, two fluidic lenses may be combined with a fixed static optical element to form a compact lens system, e.g. a zoom lens system as shown in FIGS. 3A-3D. As shown in FIG. 3A, a compact zoom system 300 includes two fluidic lenses 302, 304, a static spacer optic 306 and an image sensor 308. The static spacer optic 306 may be located between the two variable focus electrostatic fluidic lenses (for zoom lens applications) or between a variable focus lens and an image sensor (for autofocus applications). The static optical element may be an aspheric lens or other optical element. FIG. 3B is a cross-sectional view of the compact zoom system 300 of FIG. 3A. FIG. 3C is an exploded, perspective view of the compact zoom system 300 of FIG. 3A. FIG. 3D is an exploded side view of the compact zoom system 300 of FIG. 3A. In the example depicted in FIGS. 3A-3D, the static optical element 306 includes a convex surface 310 proximate a first fluidic lens and a concave optical surface proximate a second fluidic lens. As described above, such a static aspheric optical element, in optical communication with the fluidic lenses, may be desirable in order to correct for such spherical aberration. Optical systems of the type shown in FIGS. 3A-3D may optionally further include one or more additional optical components, e.g. a wide-angle objective lens or lens group, achromatic lens or lens groups, etc.

By way of example, the static optical element may be made of a solid material that has an index of refraction greater than that of a surrounding medium such as air (n>1). Such a spacer optic would serve to lengthen the effective optical path length between the optical elements located on either side of it. The spacer optic may also have optical surfaces patterned into it in order to modify static optical properties to the system (for example, the spacer optic may have a concave lens surface in order to add negative focal power to the system, or it can have diffraction gratings in order to filter portions of the light going through it; it can have optical coatings (antireflection, etc). In addition, the spacer optic may also provide structural support to the system, and it can be part of the overall integration and packaging.

The system may focus an image onto an image detector such as a charge coupled device (CCD), CMOS image sensor, photographic film, holographic film or other optical image detector. Since the lenses don't have to move and the focal length can be computer controlled a simple, versatile and inexpensive zoom lens can be implemented using fluidic lenses as described herein.

Those of skill in the art will recognize that other multiple lens systems can be implemented using capacitive fluidic lenses of the type described herein. Such systems may include, but are not limited to cameras, telescopes, microscopes, rifle scopes and endoscopes. As such, embodiments of the invention are not limited to zoom lens applications.

With variable a spacer optic between the focal length lenses in a zoom system it is possible to effectively reduce the size of the system compared to a conventional telescoping zoom system, where, the lenses have to be free to move and the space between them is variable. Conventional zoom lenses are described e.g., in U.S. Pat. No. 696,788, which is incorporated herein by reference. In the above embodiment, the space between the lenses may be fixed.

Conventional variable focus optical systems typically utilize one or more static (e.g., fixed focal length) lenses or groups of lenses that change their position in order to effect parameters including focus (such as an autofocus lens system), field of view (or zoom), tilt (for image stabilization). According to embodiments of the present invention, conventional fixed focal length moving lenses may be replaced with variable-focal-length lenses that are fixed in their position but are able to change parameters such as focal length and orientation of their optical axes in order to change the same parameters listed above. With electrostatic fluidic lenses of the types described herein, a compact multi-lens optical (e.g., zoom, autofocus, image stabilization, etc) image capture system may be fabricated with an overall length that is less than for a comparable system the uses fixed focal length lenses that translate along an optical axis. Consequently, the optical path length and/or physical size of the system may be made more compact that in prior art systems. For example, the overall length of such a system can be <10 mm and it can provide >3× zoom and autofocus.

The above advantages and others may be obtained using a static optical element between any variable focus lenses (i.e., electrowetting, fluidic, liquid crystal, electro-optic, etc.)

Certain calculations and simulations have been made regarding the electrical and optical performance of capacitive fluidic lenses of the types described herein. For simulation simplicity the footprint of the capacitor is assumed circular, making the problem fully axi-symmetrical. Since the central electrode is taken as a plane of symmetry, the model only tackles the upper half. The construction of the actuator is further assumed to have the following characteristics and dimensions:

Electrodes: The electrodes are assumed to be rigidly translatable in the z direction.

Cylindrical boundary: Fluid tight joints are assumed to prevent leaks between electrodes and boundary, without introducing any mechanical hindrance to the motion (in reality, those joints might be flexures, with some small but finite restoring force)

Membrane: The membrane is assumed to be flexibly joined to the electrodes (or having an extension bonded to the underside of the electrodes).

Figure 4:
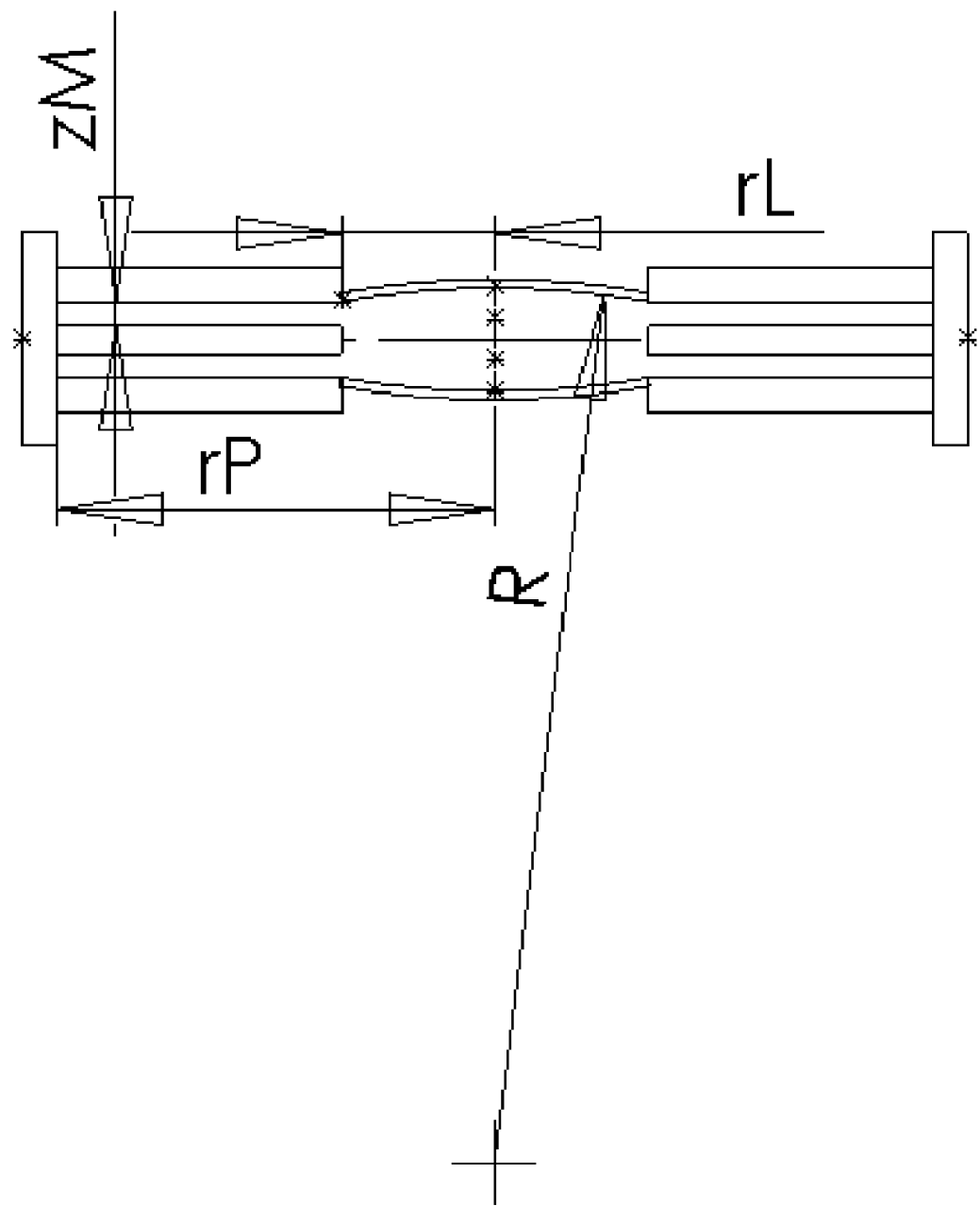
FIG. 4 is an axial section through capacitively actuated lens according to an embodiment of the present invention.

Boundary conditions and other assumptions: Fluid elements are assumed to be in contact with electrodes have the same motion as the electrodes. The central electrode is assumed to be fixed. It is further assumed that fluid elements directly under the flexible lens membranes do not contribute to viscous pressure gradients Variable definitions and numerical input parameters, which are illustrated in FIG. 4

| E | Modulus (Pa) | 2.20E+06 |
| --- | --- | --- |
| ν | Poisson's ratio | 4.00E−01 |
| t | Membrane Thickness (mm) | 0.1 |
| n | Fluid RI | 1.3 |
| μ/ρ | Kinematic viscosity (nominal, cSt) | 100 |
| ρ | Density (nominal, kg/m^3) | 1900 |
| $\epsilon_r$ | Fomblin Y relative dielectric const. | 2.05 |
| $z_m$ | Instantaneous dielectric thickness | |
| z | Coordinate perpendicular to electrodes | |
| $r_L$ | Lens Radius (mm) | 1.75 |
| $r_P$ | Piston Radius (mm) | 5 |
| r | Radial coordinate | |
| R | Radius of curvature of membrane | |
| $v_r$ | Radial component of fluid velocity | |
| $v_z$ | Vertical component of fluid velocity | |
| $v_m$ | $dz_m/dt$ = electrode velocity | |
| Q | Flow density | |
| P | Pressure | |
| N | Membrane tension (N/m) | |
| h | Height of spherical cap of membrane | |
| V | Volume | |
| φ | Half angle of spherical cap | |
| $\sigma_r$ | Radial stress in the plane of the membrane | |
| Re | Reynolds number | |

The fluid flow on which the electro-statically actuated fluidic lens is based, can be described as follows:
Incompressible
Unsteady
Viscous
Laminar (low Reynolds number)
Axi-symmetric The Reynolds number in the present case is estimated as follows:

$$Re = v_r(r_P - r_L)/(\mu/\rho) \tag{1}$$

Stokes equation is the low Reynolds number limit of the Navier-Stokes equation $$\nu \Delta \vec{v} = \frac{1}{\rho} \vec{\nabla} p \tag{2}$$

Equation of continuity is equivalent to conservation of mass for a homogeneous, incompressible fluid $$\vec{\nabla} \cdot \vec{v} = 0 \Leftrightarrow \frac{1}{r}\frac{\partial}{\partial r}(rv_r) + \frac{\partial v_z}{\partial z} = 0 \tag{3}$$

Electrostatic force between the electrodes of a capacitor (neglecting fringing fields):

$$F = \frac{1}{2}\varepsilon A\left(\frac{V}{z_m}\right)^2 \tag{4}$$

Figure 5:
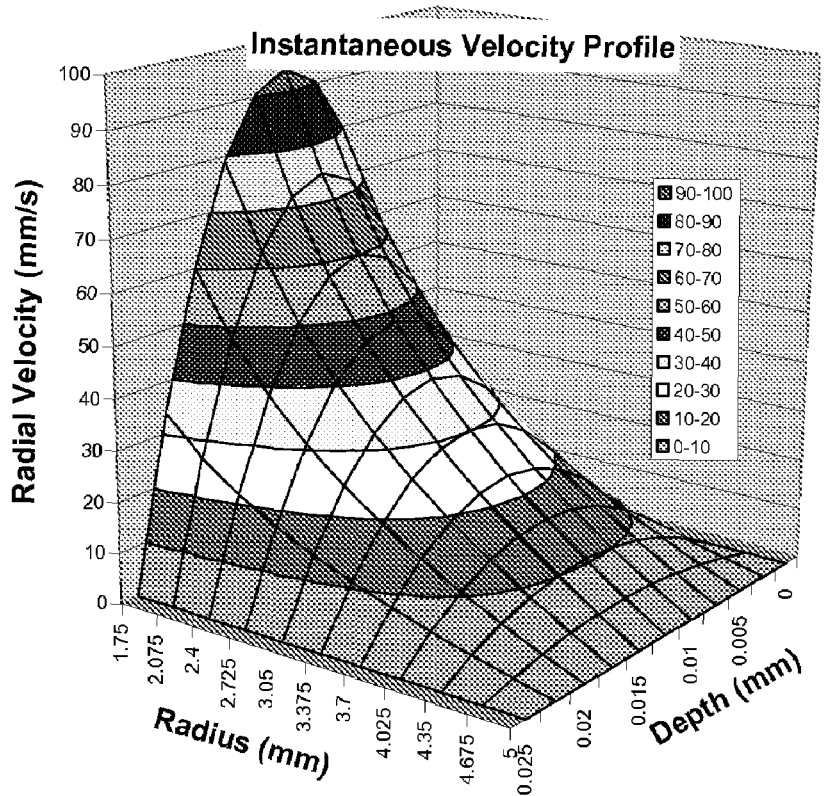
FIG. 5 is a three-dimensional graph illustrating a radial velocity profile.

A radial velocity profile is shown in FIG. 5. The radial velocity component solution was discovered phenomenologically, as follows:

Consider the fluid volume swept by the electrode as it moves over a distance dz within the radial range from $r_P$ to r. Since the fluid is incompressible, that entire volume will penetrate inwardly and be distributed over an imaginary cylindrical wall of circumference $2\pi r$ and height $z_m$. The resulting integrated radial flow is $$Q(r) = \frac{\pi(r_P^2 - r^2)}{2\pi r z_m}\frac{dz_m}{dt} \tag{5}$$

Note that with a negative (downward) moving top electrode, the flow is negative (i.e. moving radially inward).

From the theory of Poiseuille flows in narrow channels it is known that viscous forces cause the velocity profile to assume a parabolic shape. The no slip assumption further requires the radial velocity to vanish at the electrodes. In conformity to those expectations, we propose a radial flow density of the form:

$$Q(r,z) = A(r) \cdot z(z_m - z) \tag{6}$$

Integrating over the imaginary cylindrical wall of area $2\pi r z_m$ and requiring consistency with Equation 5 results in:

$$v_r(r, z) \equiv Q(r, z) = \frac{3(r_P^2 - r^2)}{r}\frac{z(z_m - z)}{z_m^3}\frac{dz_m}{dt} \tag{7}$$

The complete solution will require knowledge of the z velocity component as well. We obtain that by integrating the continuity equation 3 with respect to z. That process is aided by recognizing that $$\frac{1}{r}\frac{\partial}{\partial r}(rv_r)$$

is independent of r. The result is $$v_z(r, z) = \frac{z^2(3z_m - 2z)}{z_m^3} \frac{dz_m}{dt} \quad (8)$$

Figure 6:
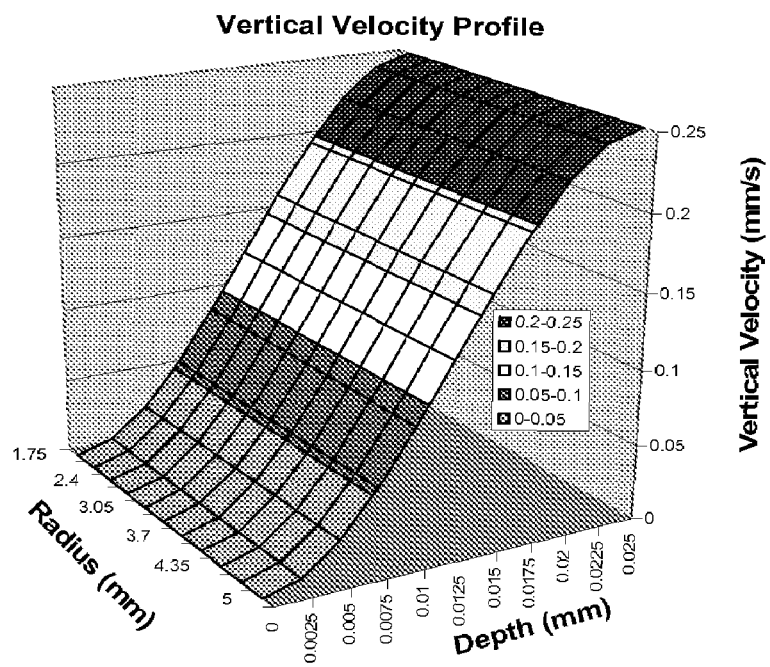
FIG. 6 is a three-dimensional graph illustrating a vertical velocity profile.

FIG. 6 illustrates a vertical velocity profile. As expected, the vertical velocity satisfies the boundary conditions of z=0 and z=$z_m$. The nonlinearity in the profile arises from the presence of momentum boundary layers near the electrodes. In such layers, the velocity of the wall tends to propagate further into the fluid than might be expected from pure interpolation.

Now that the velocity is known, the Laplacian in the Stokes equation 2 can be evaluated producing a function of only the radius. This, in turn, can be integrated to yield the radial pressure profile:

$$P(r) = P(r_L) - \left[r_P^2 \ln\frac{r}{r_L} - \frac{1}{2}(r^2 - r_L^2)\right]\frac{6\mu}{z_m^3}\frac{dz_m}{dt} \quad (9)$$

Figure 7:
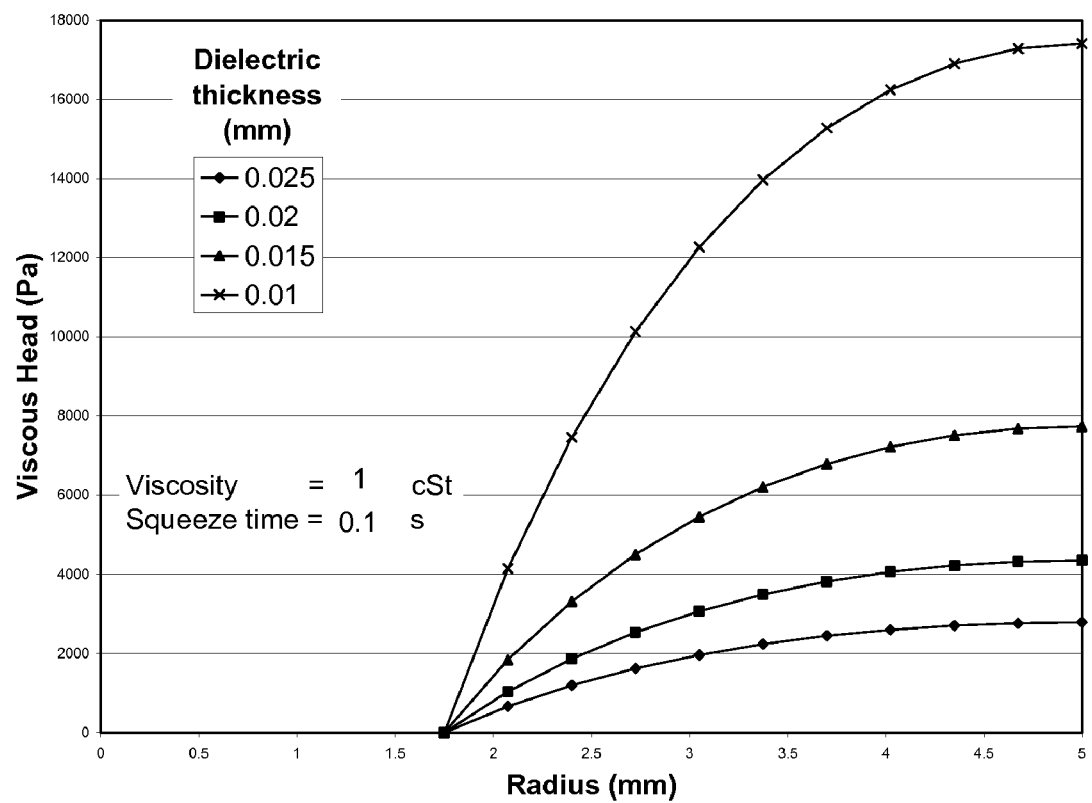
FIG. 7 is a graph illustrating a radial pressure profile.

As expected, when r is in the range from $r_L$ to $r_P$ and the top electrode is pressed downward (negative velocity), the pressure increases radially outward from $r_L$. The thickness $z_m$ of the channel features very prominently in the formula, as can be seen in FIG. 7. An inverse cubic dependence is known from the theory of viscous flow in fully developed narrow channels (also known as squeeze layers). To the author's knowledge, Equations 7, 8 and 9 may be the first analytical description of velocity and pressure in unsteady, non-fully developed, axisymmetric narrow channels.

The load carried by the electrostatic actuator comes from viscous effects and from the elastic deformation of the lens membrane (inertial loading is ignored here because of the low frequencies involved). The load exerted by the fluid over the area of the electrode is evaluated by integrating Equation 9:

$$F_{viscous} = -2\pi\frac{r_L^4}{2}\left[x^4 \ln x - \frac{3x^2 - 1}{4}(x^2 - 1)\right]\frac{6\mu}{z_m^3}\frac{dz_m}{dt} \quad (10)$$

where $x = r_P/r_L$.

To overcome this load, the electrostatic actuator would have to produce an opposing force of at least equal magnitude.

The deflected lens membrane is restrained by peripheral contact with the rigid electrode. The forces involved are described in terms of a tension N, which is a force per unit of circumference length. The total load exerted by the membrane is obtained by integrating the vertical component of the tension over the lens circumference:

$$F_{membrane} = 2\pi r_L N \sin\varphi = \pi r_L^2 P(r_L) \quad (11)$$

where $$\sin\varphi = \frac{r_L}{R} \quad (12)$$

The radius of curvature R relates to the lens "sag" h (or the height of the spherical cap) by simple geometry:

$$R = \frac{h^2 + r_L^2}{2h} \quad (13)$$

The sag, in turn can be determined by equating the spherical cap volume $$\frac{\pi}{3}h^2(3R - h)$$

with the volume swept by the entire cylindrical surface $\pi r_P^2 (z_m(0) - z_m)$. That constraint becomes $$h(h^2 + 3r_L^2) = 6r_P^2(z_m(0) - z_m) \quad (14)$$

It is clear that the assumption implied by Equation 14 is that the lens is flat at the beginning of the stroke. Nevertheless, it would be equally easy to assume either a positive or negative curvature dome at the start of the stroke simply by adding a constant term the right side. Tension N is evaluated by relating it to the radial stress in the membrane:

$$\frac{N}{t} = \sigma_r = \frac{E}{1 - v^2}\varepsilon_r \quad (15)$$

where $$\varepsilon_r = \frac{\varphi R - r_L}{r_L} = \frac{\varphi - \sin\varphi}{\sin\varphi} \quad (16)$$

Equations 15 and 16 are combined $$N\sin\varphi = t\frac{E}{1 - v^2}(\varphi - \sin\varphi) \quad (17)$$

followed by Equations 11 and 17:

$$F_{membrane} = 2\pi r_L t\frac{E}{1 - v^2}(\varphi - \sin\varphi) \quad (18)$$

Although the relationship between the membrane load and electrode height is not simple, the process of numerical evaluation is straightforward:

$$z_m \xrightarrow{Eq.14} h \xrightarrow{Eq.13} R \xrightarrow{Eq.12} \varphi \xrightarrow{Eq.18} F_{membrane} \quad (19)$$

The overall load is then the result of combining Equations 19 and 10.

The above analysis permits quantitative and graphical estimation of the electrostatically actuated fluidic lens in terms of a certain response function, namely position and speed versus voltage and radius of curvature. The latter can be related to the lens refractive power P in diopters:

$$P = \frac{n - 1}{R} \quad (20)$$

Figure 8:
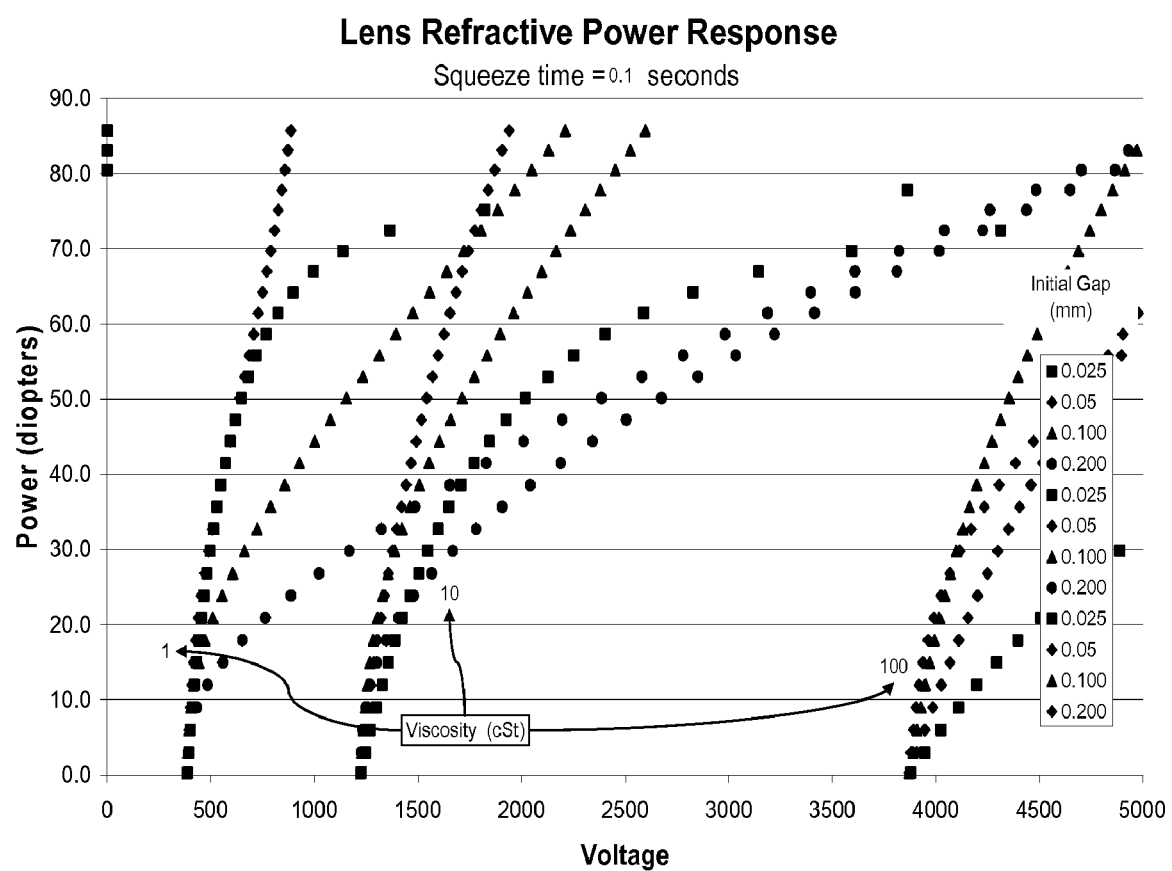
FIG. 8 is a graph of the refractive power as a function of drive voltage for a squeeze time of 0.1 second.
Figure 9:
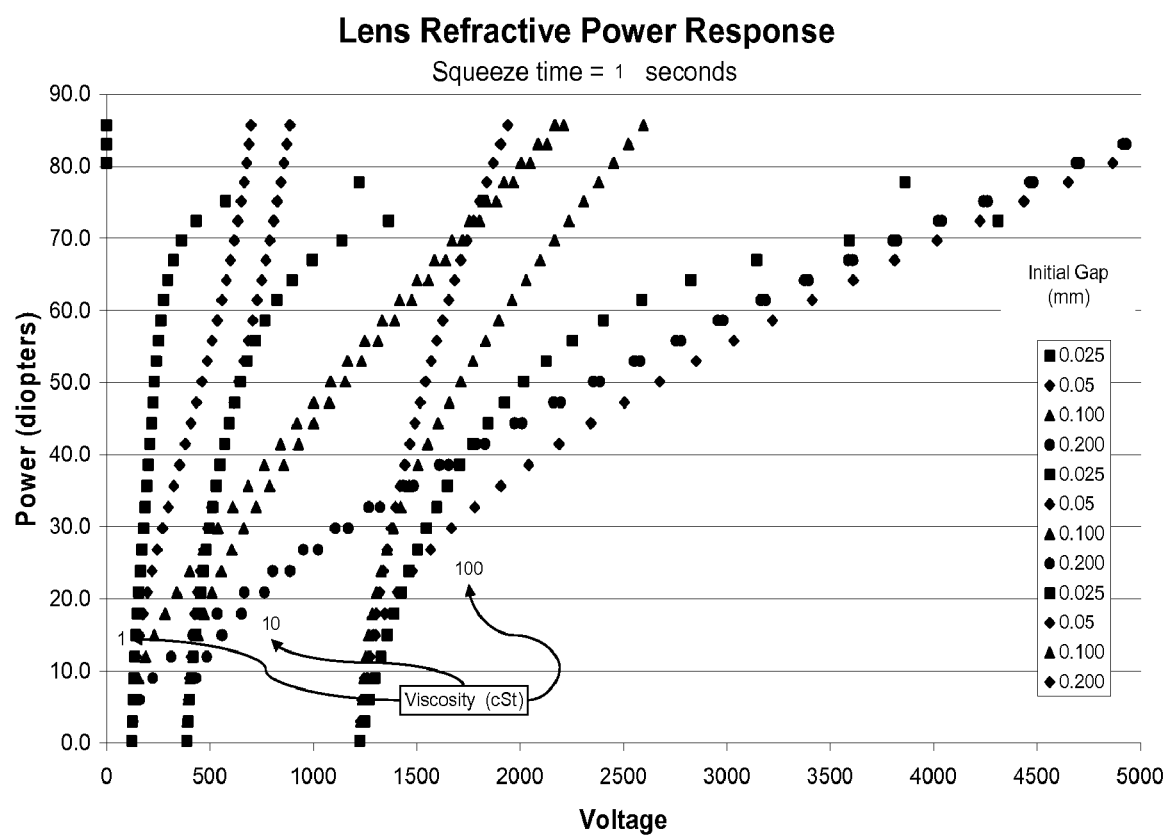
FIG. 9 is a graph of the refractive power as a function of drive voltage for a squeeze time of 1 second.

FIG. 8 and FIG. 9 illustrate results of such an analysis for three groups of curves corresponding to viscosities of 1, 10 and 100 cSt. Typically, FIG. 8 illustrates refractive power as a function of drive voltage for a squeeze time of 0.1 second, and FIG. 9 illustrates refractive power as a function of drive voltage for a squeeze time of 1 second. Within each group, four curves are shown distinguished by their initial dielectric gap, namely 0.025, 0.050, 0.100 and 0.200 mm. Typically, the curves follow the intuitively expected behavior of larger optical power for larger drive voltages. The presence of viscous flow, however, introduces significant effects, compared to electrostatic actuators with air gaps. In the latter case, a snap down instability is found to occur for sufficiently small electrode gaps, where electrostatic forces increase much faster than elastic restoring forces. Squeezing thin viscous fluids elicits forces that increase even faster, thus eliminating the snap-down. In these figures, the speed of actuation is represented by the "squeeze time", such that the speed is the ratio of the initial gap to the squeeze time. Since the viscous forces increase rapidly during the narrowing of the channel, the voltages increase as well. For this reason, the highest voltages do not always occur at the larger gaps, as would be expected from electrostatics alone.

As was previously mentioned, viscous forces dominate the dynamics of narrow channels. The balance of forces:

$$\frac{1}{2}\varepsilon A \left(\frac{V}{z_m}\right)^2 = \pi r_L^2 p(r_L) + F_{viscous} \qquad (21)$$

Solving Equation 10 for $dz_m/dt$, substituting in Equation 21 and neglecting membrane forces yields $$\frac{dz_m}{dt} = \frac{\frac{1}{2}\varepsilon A\left(\frac{V}{z_m}\right)^2}{-2\pi\frac{r_L^4}{2}\left[\frac{x^4\ln x - \frac{3x^2-1}{4}(x^2-1)\right]\frac{6\mu}{z_m^3}} = -\frac{\varepsilon AV^2}{2\pi r_L^4\left[\frac{x^4\ln x - \frac{3x^2-1}{4}(x^2-1)\right]6\mu}z_m \qquad (22)$$

This is now the classical exponential decay differential equation, with solution:

$$z_m(t) = z_m(0)\exp(-t/\tau) \qquad (23)$$

with $$\tau = 12\frac{\mu}{\varepsilon}\left(\frac{r_L}{V}\right)^2\left(\frac{x^4\ln x}{x^2-1} - \frac{3x^2-1}{4}\right) \qquad (24)$$

Figure 10:
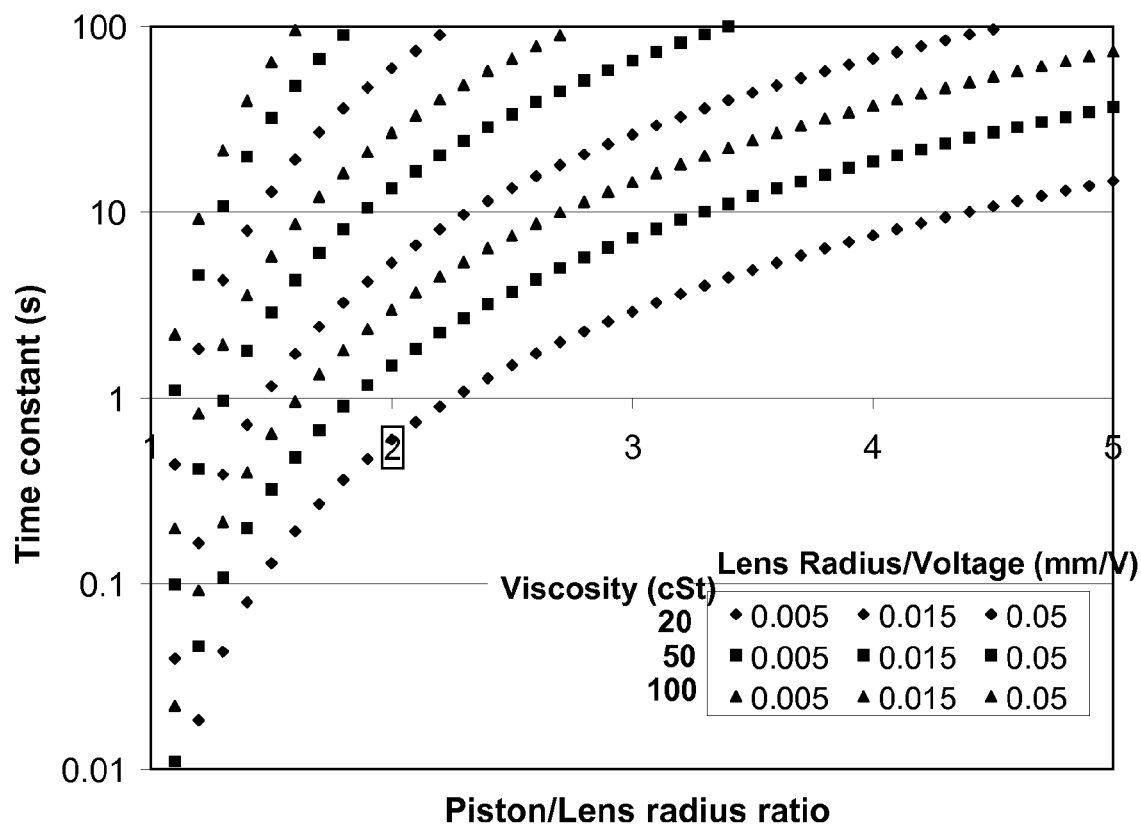
FIG. 10 is a graph illustrating viscous time constant dependence on lens geometry and viscosity.
Figure 11:
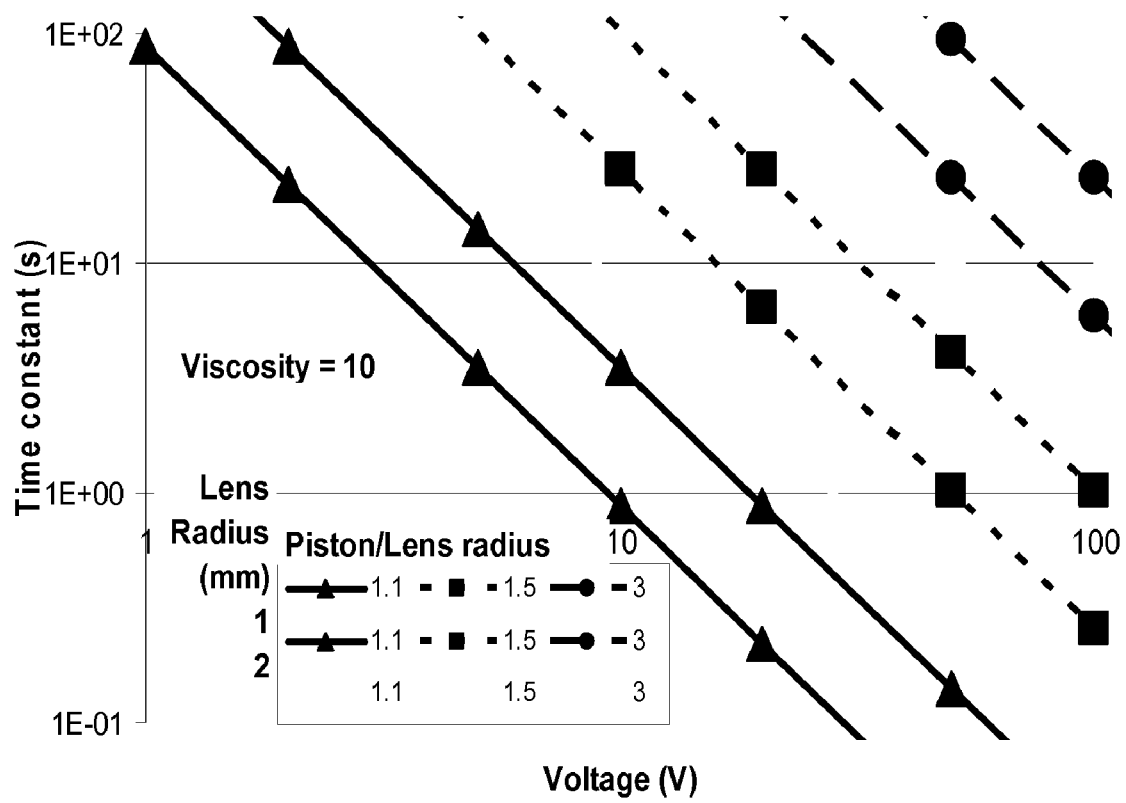
FIG. 11 is a graph of time constant as a function of voltage.

The behavior of this time constant is depicted in FIG. 10. Clearly the fastest response requires small lenses, not much larger pistons, low viscosity and large voltage. As can be seen from FIG. 11, the constant fastest for electrostatically actuated fluidic lenses characterized by low viscosity, small Lens Radius/Voltage ratio and small Piston Radius/Lens Radius ratio.

The findings of previous sections as well as prior art in the microfluidics field suggest that there are ways to improve the overall system response. The so-called "zipper" approach, for instance focuses the electric field in a relatively narrow region, where the lens aspect ratio x is small (see equation 24). By chaining a sequence of such regions mechanically, the overall effect can be large, without having the multiplicity of regions negate the advantage of small aspect ratio in each.

This is possible because of the highly nonlinear behavior of the aspect ratio function. Many important design implications may be gained from the above physics model & analysis. For example, a smaller lens is better in terms of faster response time, lower actuation voltage, etc. In addition, collapse of the initial gap brings the next electrode region into a close gap and small x condition. Also, a controlled compliance electrode may be used to couple annular regions. Furthermore, the dielectric gap vs. radius and electrode compliance may be designed for continuous performance. Segmented electrodes may be used for digital or hybrid operation as well as for tilt functionality. It is also possible to focus the electric field (e.g., with a smaller gap) in narrow region (small x).

Figure 12A:
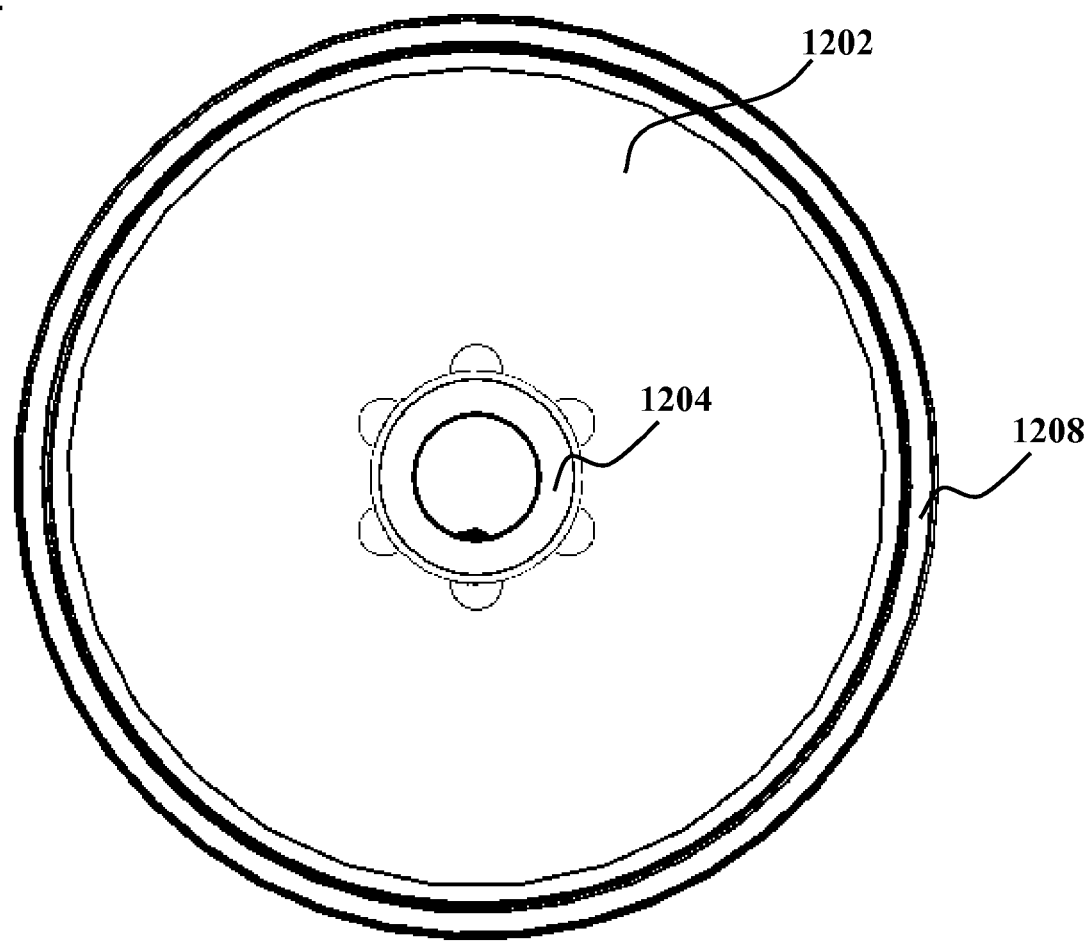
FIG. 12A is a top view of round, zipper-action, electrostatically actuated, fluidic lens according to an embodiment of the present invention.
Figure 12B:
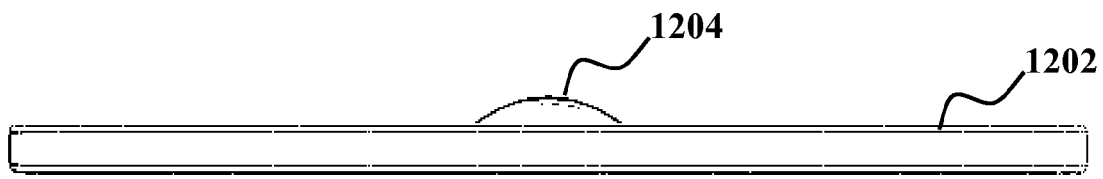
FIG. 12B is a side view of round, zipper-action, electrostatically actuated, fluidic lens according to an embodiment of the present invention.

Following the guidelines established from the modeling described above, a zipper action capacitive fluidic lens design may be as shown in FIGS. 12A-12F. FIG. 12A is a top view of a zipper action capacitive fluidic lens 1200. The lens 1200 includes a disk shaped base 1202 having an aperture 1210 covered by an optic 1203, which may consist of any optical element including an optical flat, a lens element, a mirror, a polarization filter, a neutral density filter, and color filter or combination thereof. The optic 1203 may consist of compositions of glass, plastic, PDMS, metal or any materials having suitable transmission, rigidity, optical distortion, and other mechanical, physical and optical properties. The aperture ring 1204 includes passages that communicate through a wall of the aperture ring to depressions in the surface of the base. The combination of passages in the aperture ring and passages in the base allows fluid to flow from a reservoir region that surrounds the aperture ring. A membrane 1206 covers the base and aperture ring and is held in place by a retaining ring 1208 at the outer periphery of the base. A fluid is enclosed between the membrane 1206 and the base 1202. The membrane 1206 is secured to an upper surface of the aperture ring 1204, e.g. by an adhesive or other means. The upper surface of the aperture ring slightly lies above the level of the base such that the membrane slopes gradually upward from the retaining ring toward the upper surface of the aperture ring 1204. FIG. 2B is a side view of the zipper action capacitive fluidic lens 1200 of FIG. 12A.

Figure 12C:
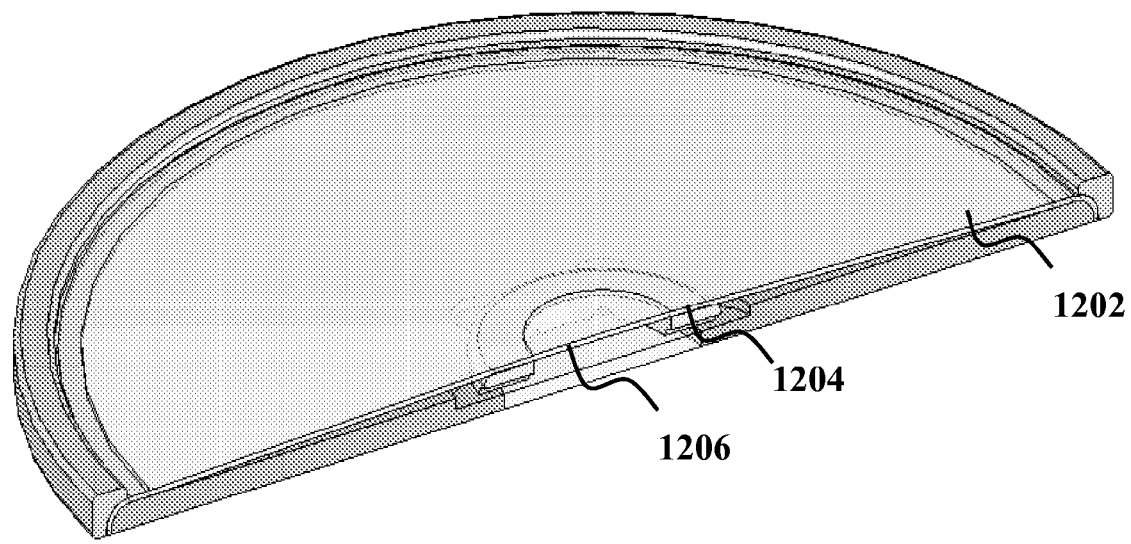
FIG. 12C is a perspective view illustrating a relaxed state of round, zipper-action, electrostatically actuated, fluidic lens according to an embodiment of the present invention.
Figure 12D:
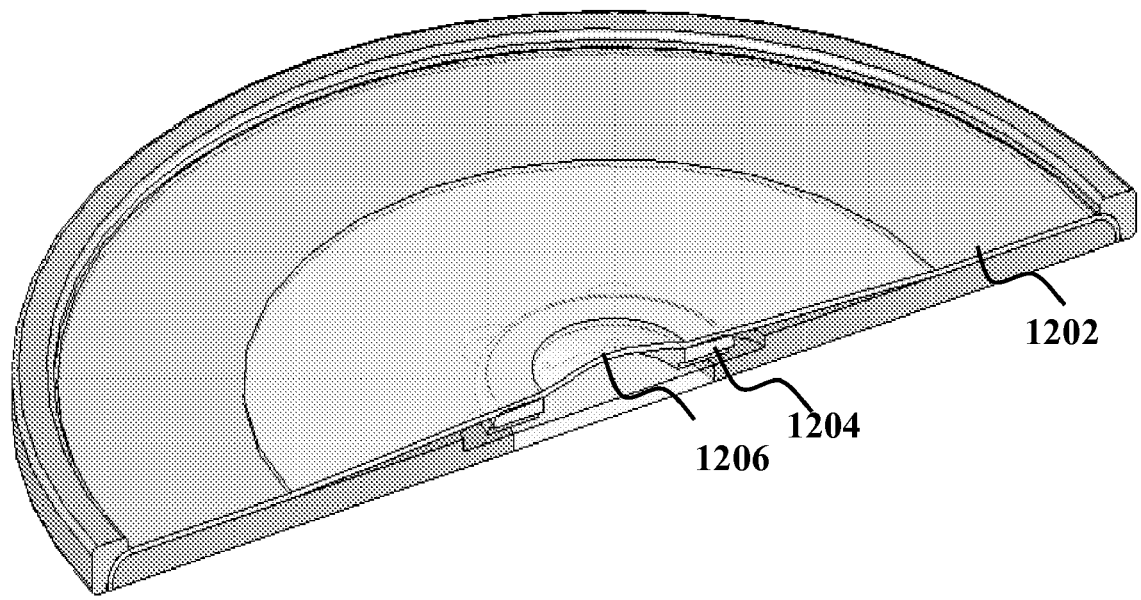
FIG. 12D is a perspective view illustrating half actuated state of round, zipper-action, electrostatically actuated, fluidic lens according to an embodiment of the present invention.
Figure 12E:
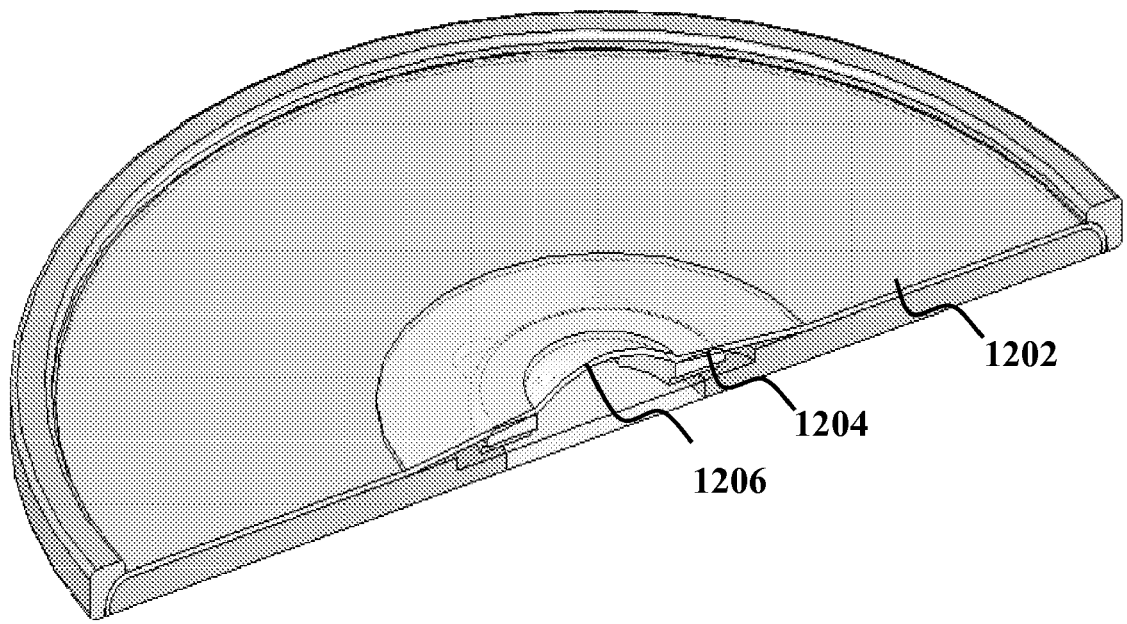
FIG. 12E is a perspective view illustrating fully actuated state of round, zipper-action, electrostatically actuated, fluidic lens according to an embodiment of the present invention.
Figure 12F:
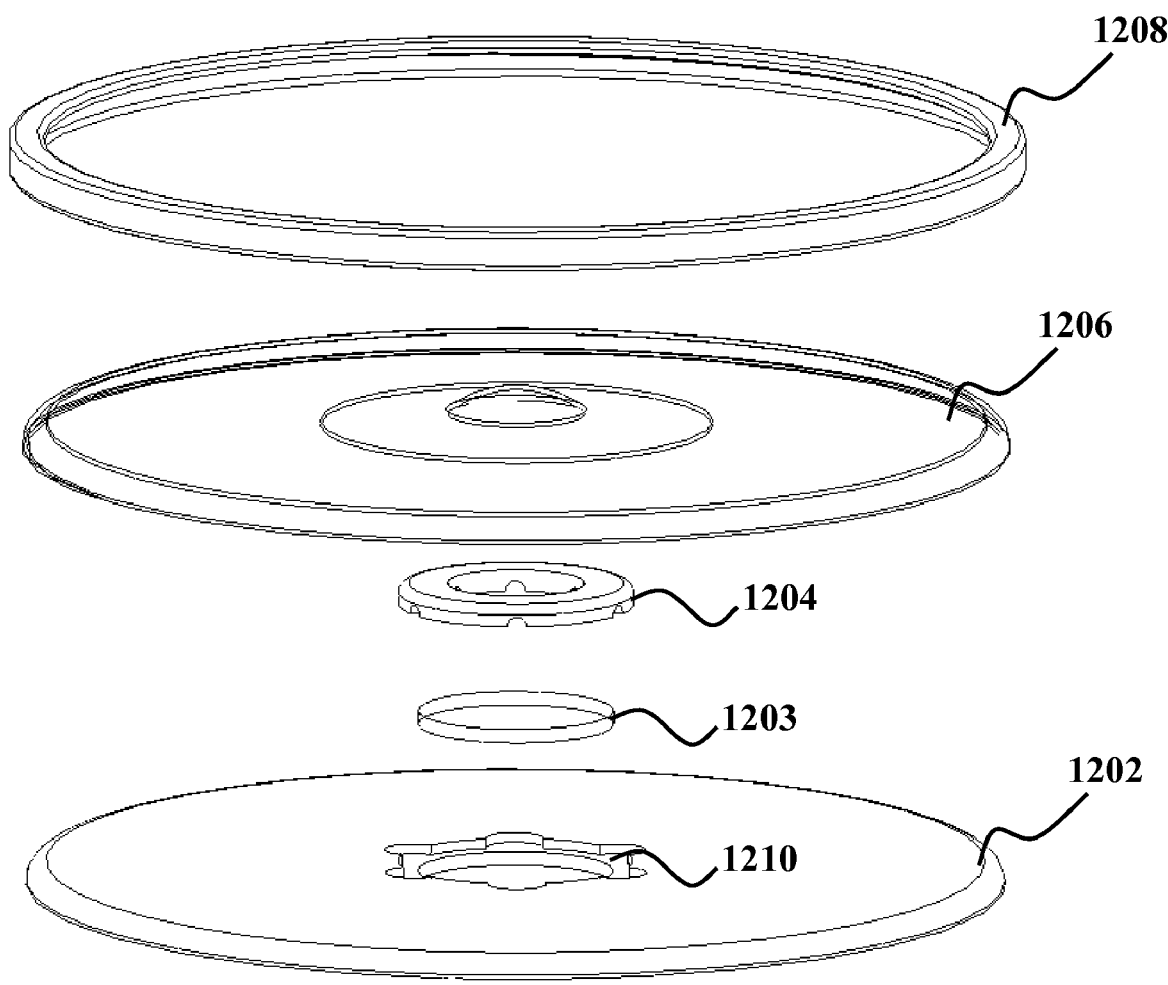
FIG. 12F is an exploded view of round, zipper-action, electrostatically actuated, fluidic lens according to an embodiment of the present invention.

A portion of the membrane that lies radially outward of the aperture ring may be coated with a conductive coating, e.g., gold. The base may include an electrically isolated conductive coating that serves as an electrode. The sloping of the membrane allows for zipper action of the capacitive fluidic lens. The zipper action is illustrated in FIGS. 12C-12E. FIG. 12C is a three-dimensional view of the fluidic lens 1200 at a relaxed state. FIG. 12D illustrates the fluidic lens 1200 at a half actuated state and FIG. 12D illustrates the fluidic lens 1200 at a fully actuated state. FIG. 12F is a exploded view of the zipper action capacitive fluidic lens 1200.

As a greater voltage is applied a greater area of the membrane is pulled into contact with the base. This squeezes more fluid into the aperture ring causing the membrane covering the opening in the aperture ring to bulge.

Figure 13:
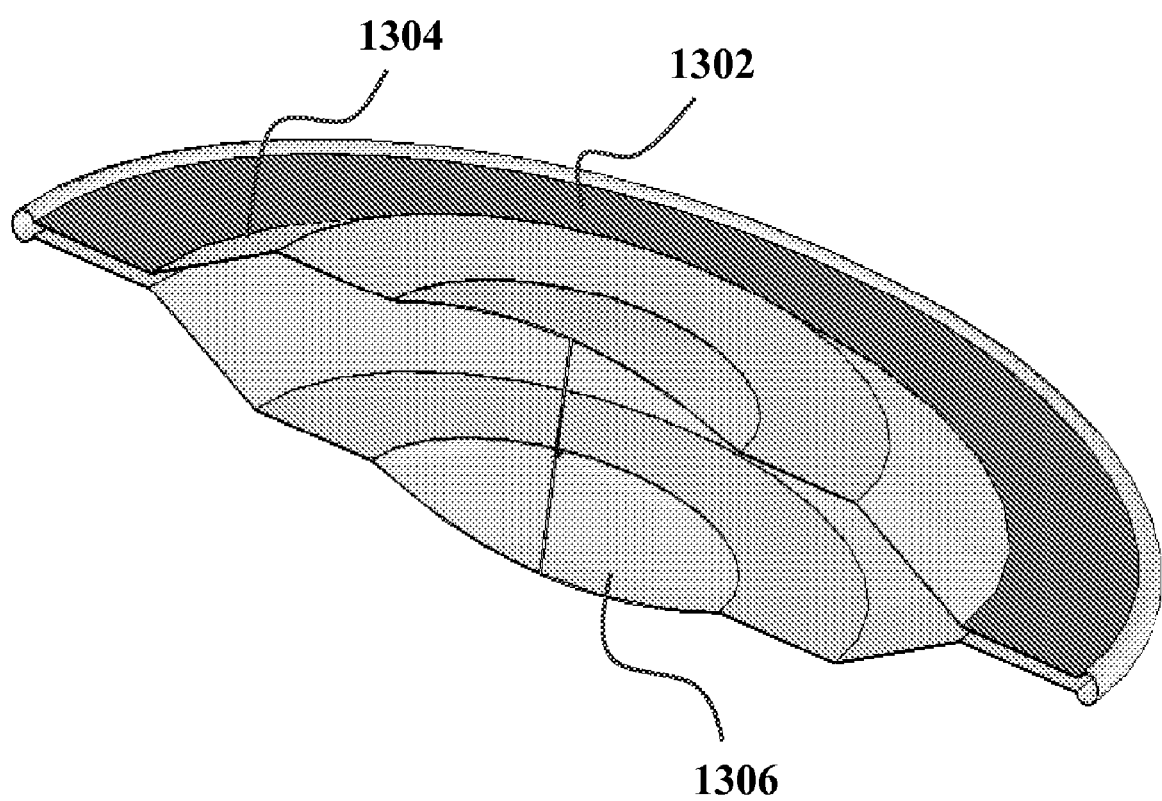
FIG. 13 is a three-dimensional cross-sectional view of a fluidic lens according to an embodiment of the present invention.

Embodiments of the present invention include an amplification feature moves rigidly with electrode. An example of such a feature is shown in FIG. 13. Here the fluidic lens uses two parallel electrodes 1302. Each electrode has low ratio of piston radius to lens radius ($r_P/r_L$). Both electrode 1302 and amplifier 1304 move to transfer fluid to lens. Only the electrode area contributes to viscous forces. The lens includes a rigid bowl-shaped feature having an aperture. An elastic membrane 1306 covers the aperture. The amplification feature suppresses a snap-down effect without having to use zipper actuation. Note: Snap-down occurs when the fluid dielectric is air or other such very low viscosity fluid. The occurrence of snap-down can be an advantage for digital (bi-stable) actuation, but for analog devices it is an undesirable phenomenon, limiting the stroke to the stable portion of the device response curve. The amplification feature allows analog control over the entire stroke of the lens actuation. It is also possible to control a tilt angle of the lens by making the electrode in two or more electrode segments and independently applying voltages to each segment.

Although it is possible to use zipper actuation with the Electrostatic Flow Amplifier (schematically pictured above) the amplification feature renders it unnecessary. The zipper is normally used to lower the voltage required by a relatively large stroke. It does that by employing a graduated electrode gap. The small end of the gap profile allows a small voltage to initiate the pulling together of the electrodes. Flexibility of at-least-one electrode allows a portion thereof to lie down (conform) to the other electrode while the remaining portion has not yet collapsed. Persistent application of the voltage eventually brings a maximal portion of the electrodes to a collapsed condition.

With the electrostatic amplification device, the stroke of the electrostatic actuator is hydraulically amplified to produce the lens motion. This means that fluid from a relatively large area is collected into the relatively small area under the lens membrane. A small stroke of a rigid plate capacitor can produce considerable doming of the lens. Where it not for the retarding effects of viscous flow, a small-gap rigid-electrode capacitor would provide adequate stroke at adequate voltage. Unfortunately, it is precisely at such small gap that viscous forces would provide great opposition to the electrostatic force. This opposition would require application of unreasonably large voltages or waiting a long time for the flow to trickle through the narrow gap.

The Electrostatic Flow Amplifier approach was conceived to overcome these limitations of the flat-plate electrostatic actuator, while retaining its snap-down suppression property. The device area is mostly rigid, except for the lens dome and the flexible edge seal. The viscous opposition to actuation is significantly reduced by limiting the small gap region to the relatively narrow electroded area. The voltage can be kept low because: (a) fluid path length through a thin gap channel is short (narrow electrode), and (b) the small gap is located in the outer regions of the device where fluid velocity is low (velocity increases radially inward for constant gap capacitors). This would be true even if the lens dome were to occupy the entire non-electroded area of the device. In that case, the volume of fluid transferred to the lens might be inadequate, owing to the relatively small electroded area. By adding the intermediate Amplification feature between the electrodes and the lens, a much larger area of fluid can be swept by the actuator stroke, thus significantly amplifying the lens motion. The increased gap in this amplification region, means that one can adjust the added viscous opposition to a conveniently low or negligible level, because the viscous forces are proportional to the inverse gap cubed. The presence of liquid in the electrode gap will still suppress the snap-down effect, providing analog controllability at a reasonable voltage.

Figure 14:
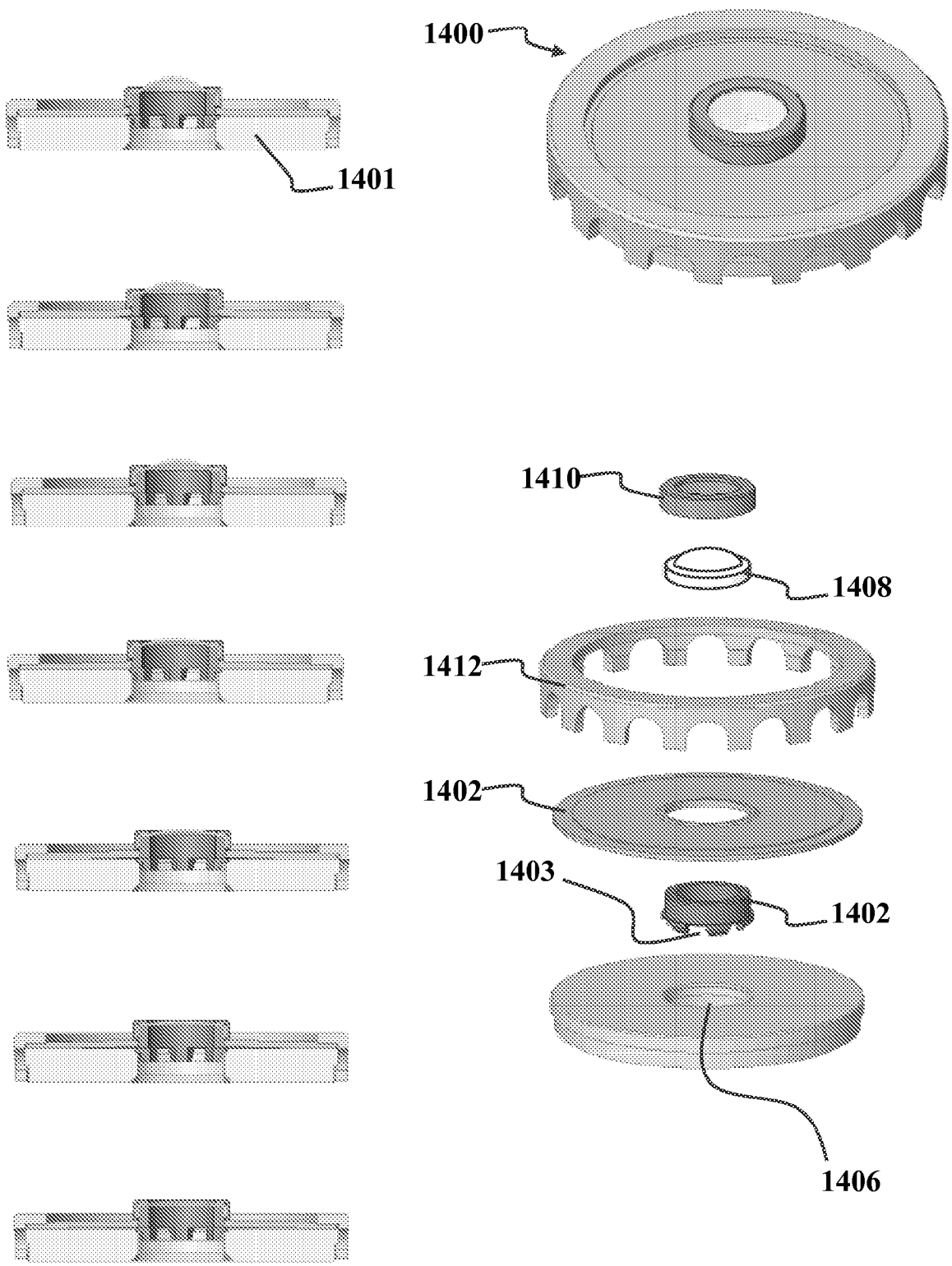
FIG. 14 is an alternative construction of a fluidic lens according to an embodiment of the present invention.

An alternative construction of a fluidic lens 1400 is depicted in FIG. 14. This lens is a single sided lens having a zipper actuating electrostatic actuator. The operating sequence is shown in the cross-sections running down the left side of the figure. This design includes an aperture ring 1402 that separates a reservoir portion 1401 underneath a flexible electrode 1404 from an aperture 1406 underneath a transparent membrane 1408. The transparent membrane 1408 is held in place by a first retainer ring 1410 and the flexible electrode 1404 is held in place by a second retainer ring 1412. The aperture ring 1402 includes passages 1403 that communicate between the first reservoir portion 1401 and the aperture 1406.

Figure 15A:
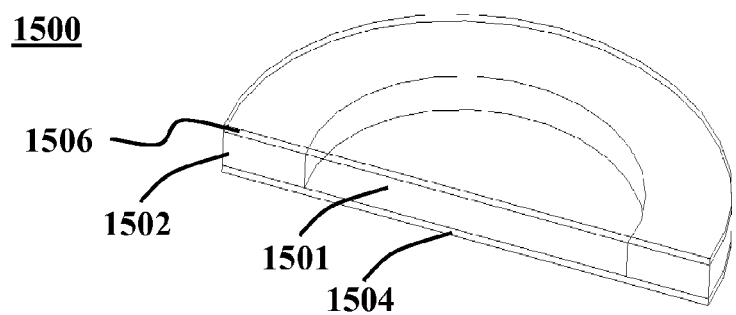
FIG. 15A is a three-dimensional cutaway view of a liquid pill lens according to an embodiment of the present invention.
Figure 15B:
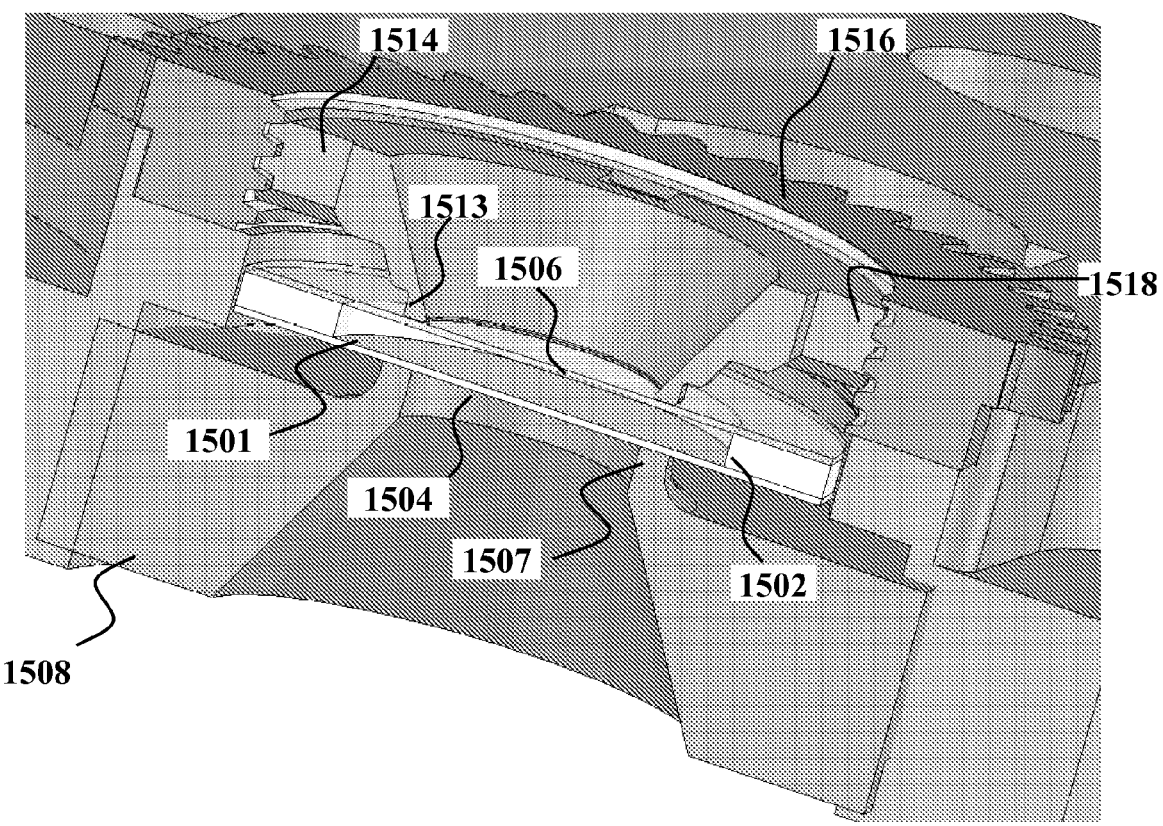
FIG. 15B is a three-dimensional cutaway view illustrating actuation of a liquid pill lens according to an embodiment of the present invention.

In some embodiments it is desirable for the actuator to be decoupled from the fluid flow. In such cases an optimized lens referred to herein as a liquid pill lens may be used. The liquid pill lens is a low-cost, producible fluidic lens having front and back optical surfaces with refractive power and capable of being actuated by controlled deformation. The structure of the liquid pill is very simple. As shown in FIG. 15A, a liquid pill lens 1500 includes a cavity 1501 formed by a perforated spacer 1502 and two membranes 1504, 1506. The cavity 1501 is filled with a fluid having convenient optical, mechanical and chemical properties. Although, in this example, the interior cavity 1501 is shaped as a circular cylinder, the outer boundary of the spacer 1502 may take various shapes such as circular, square, rectangular or odd. The liquid pill lens 1500 may be mechanically actuated using a mechanism e.g., as shown in FIG. 15B. For example, a circular rim 1507 protruding from a passive retainer 1508 (shown near the bottom of FIG. 15B) may contact the lower compliant membrane 1504. Another circular rim 1513 protrudes from an actuated top ring 1514 (shown just above the center of FIG. 15B) to contact the upper compliant membrane 1506 of the liquid pill lens 1500. The operation of the lens is readily understood from FIG. 15B. The top ring 1514 may be lowered or raised at will by an actuator means chosen, shown for example as a lead screw 1516 having threads that engage threads 1518 on the top ring 1514. The lead screw 1516 may be coupled by a geared mechanism to a rotating motor (not shown). The squeezing action of the top ring 1514 causes the center portion of both membranes 1504, 1506 to bulge outward, thus controlling the refractive power of the lens 1500. Instead of a mechanical actuator, the liquid pill lens 1500 may be actuated using a zipper electrostatic actuator that is external to the pill.

The use of a liquid pill lens in conjunction with a zipper actuator avoids viscosity issues. The lens fluid that fills the cavity can be optimized for optical and environmental constraints. In addition, the Zipper design can borrow more heavily from existing art. Furthermore, segmented or multiple actuators possible for tilt control.

It is noted that this approach may be designed to solve an alignment problem typically encountered with this type of fluid lens (i.e., a fluid lens that is actuated by depressing an annular piston directly on the optical surface). Specifically, it is difficult to align the membrane and the top ring such that they are parallel with each other. Such misalignment leads to astigmatism and other aberrations in the fluid lens. This problem can generally be solved if the lens cell "floats" angularly within the outer ring—i.e., if the outside diameter (O.D.) of the lens cell is somewhat smaller than the inside diameter (I.D.) of the outer ring, thus allowing some angular freedom of movement of the lens cell within the outer ring. Additionally, the threads in the top ring can be sized, relative to the threads in the I.D. of the geared internal lead screw, such that the top ring is allowed some angular freedom of movement within the threads. Further, the bottom retainer can be rigidly fixed to the base plate. In this fashion, the lens cell is allowed angular freedom wherein it can orient itself in a position such that the lower membrane of the lens cell (i.e., the membrane of the lens cell that is proximal to the bottom retainer and distal to the top ring) is parallel to the piston of the bottom retainer. Similarly, the top ring is allowed angular freedom to align itself parallel to the top membrane of the lens cell (i.e., the membrane of the lens cell that is proximal to the top ring and distal to the bottom retainer). By allowing the lens cell and the top ring to float and find parallel orientations for the membranes and their respective actuating surfaces, aberrations in the fluid lens can be avoided.

Figure 16:
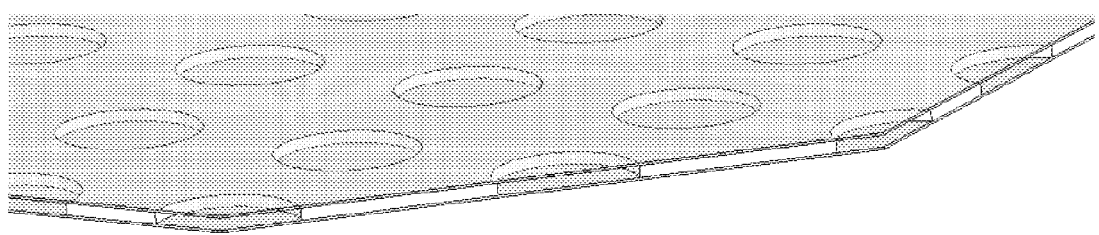
FIG. 16 is a three-dimensional view of a liquid pill sheet according to an embodiment of the present invention before singulation.

Fabrication of the liquid pill can follow well-known industrial methods. Here is a possible sequence of steps:

1. A perforated plastic spacer sheet and a bottom transparent plastic membrane are laminated using one or more of the following techniques: thermal, ultrasonic, adhesive or solvent welding.
2. An automated precision dispensing system, meters a precisely known quantity of fluid in each well formed by a perforation of the spacer and the bottom membrane. The fluid amount is determined by the desired shape of the liquid pill in the relaxed state (ranging from flat to concave membranes).
3. The top membrane is vacuum laminated onto the spacer sheet. Similar methods are employed in the food industry to eliminate air from packages. This step would typically involve first sealing the membrane edges on all sides except for a vacuum passage on one side. Once the air has been evacuated, thermal, ultrasonic or thermosonic welding action can be applied onto the interstitial areas (between perforations). In the design of the perforated sheet, as shown in FIG. 16, sufficient space should be allocated between perforations to allow for: (a) adequate membrane bonding area, (b) some clearance between the welding head and the edge of the perforation to prevent forceful evaporation of the filling fluid, and (c) space for cuts separating individual liquid pills (see next step).
4. The singulation process separates the finished sheet into individual liquid pills. This may be done by mechanical shearing, steel rule die cutting, laser cutting, etc. The cutting tool width should produce a narrow enough kerf (or material loss) to leave enough material for adequate bonding and sealing of the membranes in individual liquid pills.

As mentioned above, the shape of the liquid pills may be other than circular. This would create additional spacer area, which could be used for locating features such as registration pins and anti-rotation keys.

Figure 17:
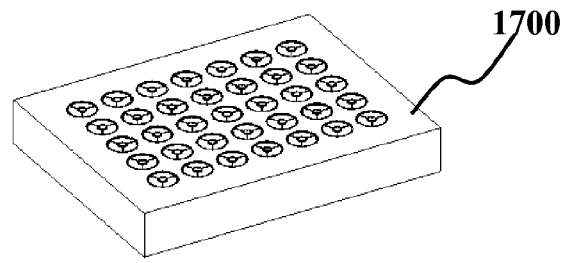
FIG. 17 illustrates a mold that may be used for manufacturing fluidic lens according to an embodiment of the present invention.

Capacitive fluidic lenses of the types described herein may be manufactured using standard techniques and equipment. Equipment may include PDMS mixing equipment, molds, an injection molding machine, ovens, an electron beam evaporation chamber, and possibly a clean room, lithography equipment and dielectric material processing equipment. FIG. 17A illustrates an example of a mold cavity 1700 that may be used in fabrication of fluidic lenses according an embodiment of the invention.

By way of example a conventional manufacturing plant such as an LCD manufacturer is likely to have suitable experience and equipment (e.g., PDMS experience, clean room facilities, etc.). The general lens manufacturing process may proceed as shown in FIGS. 18A-18D. The process may be automated under the control of software running on a process controller that regulates such process parameters as temperature, time, vacuum, and the like.

Figure 18A:
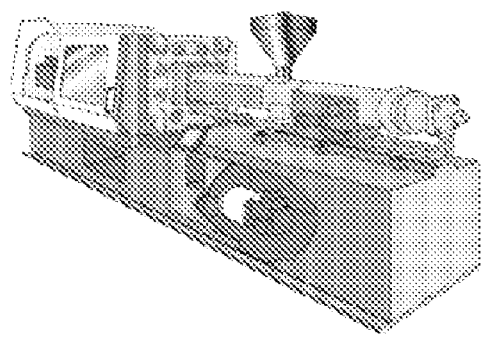
FIGS. 18A-18D illustrate the steps of manufacturing process of a general lens.
Figure 18B:
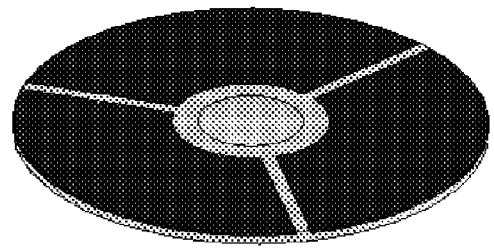
Figure 18C:
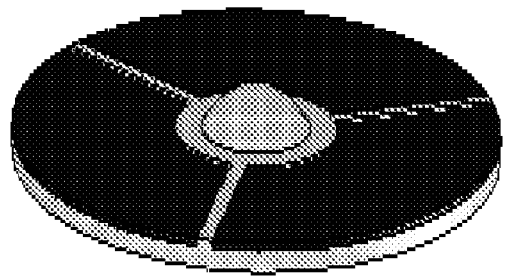
Figure 18D:
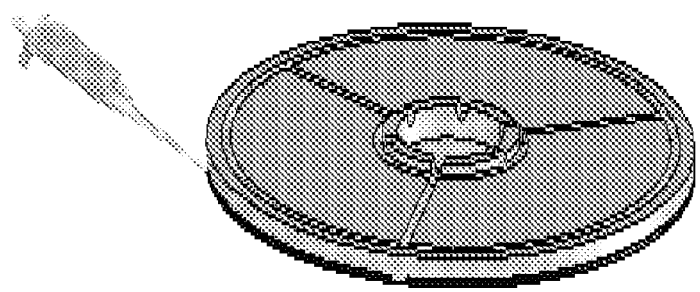

The Process Steps may proceed as follows:
1) A mixture of PDMS 10:1 Sylgard 184 may be poured into molds, as shown in FIG. 18A, and cured in an oven to form two membrane lens halves.
2) Conductors may be added to each membrane half, as shown in FIG. 18B, by applying mask and precursor to the molded PDMS, vapor depositing a chromium bond layer and vapor depositing a gold conduction layer. The conductor mask may then be removed.
3) Insulator may be added by applying an insulator mask to the molded PDMS and vapor depositing or otherwise forming insulator over the PDMS and mask. The insulator mask may subsequently be removed.
4) The two lens halves may then be bonded together, filled with oil and the fill holes may be plugged, which is shown in FIG. 18C.
5) The resulting electrostatic lens may then be tested for electrical and optical performance, which is shown in FIG. 18D.

A key step in the fabrication process of fluidic lenses according to embodiments of the present invention is the formation of a conductive, e.g., metalized membrane for the elastic capacitor section. It is desirable that such a metallization process be a low-cost process that produces strong adhesion of the metallization to the underlying elastomer. The metal used preferably is highly ductile and the coating highly conductive at strains greater than about 5%. Preferably the process should involve little or no lithography yet provide a pattern for pads, wires, terminations and the like.

Unfortunately, most metal-on-elastomer films tend to fracture at 2-3% strain. The rupture of such films occurs by localized plastic deformation in the form of local thinning and forming of shear bands. To overcome this problem, embodiments of the invention may use elastomer membranes that have been metallized using spontaneous wrinkling of gold film on PDMS Membranes. In this technique, stripes of gold (Au) films are made on PDMS with a built-in compressive stress to form surface waves. A Cr+ adhesion interlayer (e.g., about 5-nm thick) is deposited on the elastomer before deposition of the gold film to a thickness of about 100 nanometers. Gold is one of the most ductile metals and is also highly conductive. Gold may be deposited by electron beam evaporation at room temperature onto PDMS. Conductivity for gold-on-elastomer films has been observed at strains up to 22%

Figure 19:
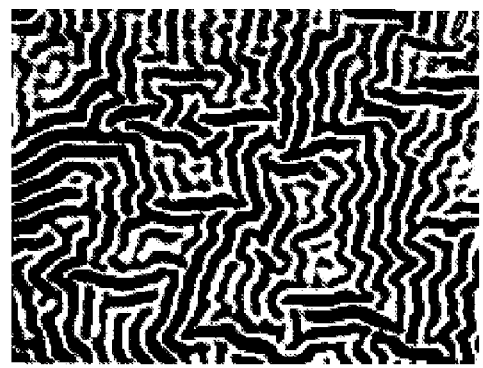
FIG. 19 is an optical image of the wave pattern formed in a 100-nm thick gold film evaporated on a 1-nm thick PDMS membrane.

FIG. 19 depicts an optical image of the wave pattern formed in a 100-nm thick gold film evaporated on a 1-mm thick PDMS membrane, wherein the white lines is gold and the dark lines is PMDS.

Such gold-on-elastomer films are described, e.g., by S. Pèrichon, et. al., in "*Stretchable gold conductors on elastomeric substrates,*" *Appl. Phys. Lett.,* 82, 15, p. 2404-2406 (Apr. 14, 2003), disclosure of which is incorporated herein by reference for all purposes.

According to alternative embodiments of the present invention, electrostatic lenses may be manufactured using a process known as multilayer soft lithography. In this process a soft polymer (e.g., PDMS or other elastomer) is cast on a mold containing a microfabricated relief or engraved pattern. The casting molds may be made of silicon wafers on which a photoresist pattern has been created using a conventional photolithography as in fabrication of integrated circuits. Lithography masks may be made of transparencies on which the pattern is printed using a commercial laser printer with 20,000 dpi resolution. Un-crosslinked liquid polymer is poured over the mold and cured (crosslinked). After crosslinking, the polymer is peeled off the mold. The surface of the polymer that was in contact with the mold is left with an imprint of the mold topography. Such topography typically defines channels and chambers that will form part of a microfluidic system. Several layers of elastomer, all with different patterns, may be stacked and bonded together forming microfluidic device.

Figure 20A:
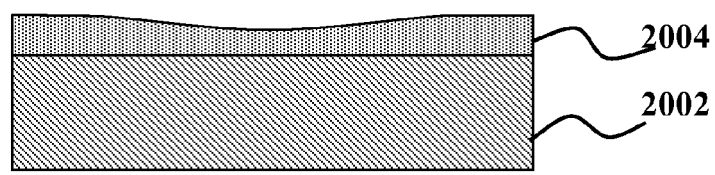
FIGS. 20A-20I are cross-sectional schematic diagrams illustrating steps for making electrostatic lens according to an embodiment of the present invention.
Figure 20B:
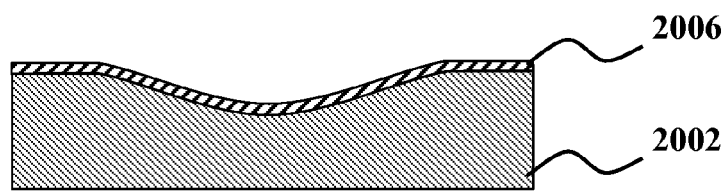
Figure 20C:
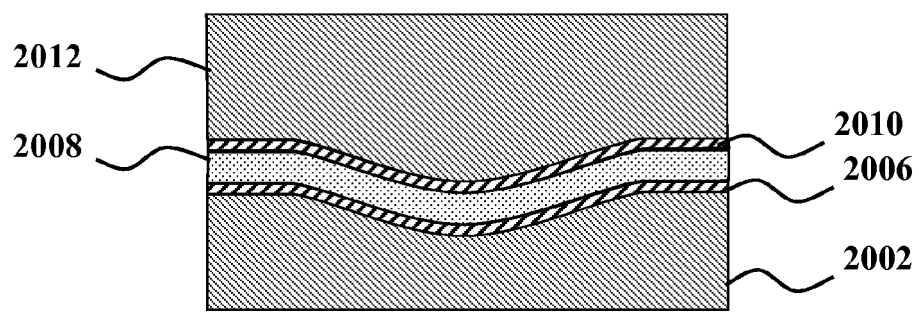

Fabrication of an electrostatic lens using multilayer soft lithography may proceed as shown in FIGS. 20A-20I. First, a photoresist mask 2004 is placed on silicon wafers or other suitable substrates 2002 and a gray-scale lithography may be performed on silicon wafers or other suitable substrates 2002 to create mold patterns as shown in FIG. 20A. Next a pattern is reactive-ion etched into the wafer and the wafer is coated with a mold release 2006 as shown in FIG. 20B. Next a layer of thermo-cast PDMS 2008 is deposited onto the mold release 2006. A second layer of mold release 2010 is deposited on the PDMS and a mating mold piece 2012 is deposited or otherwise formed on the second layer of mold release resulting in the structure shown in FIG. 20C.

Figure 20D:
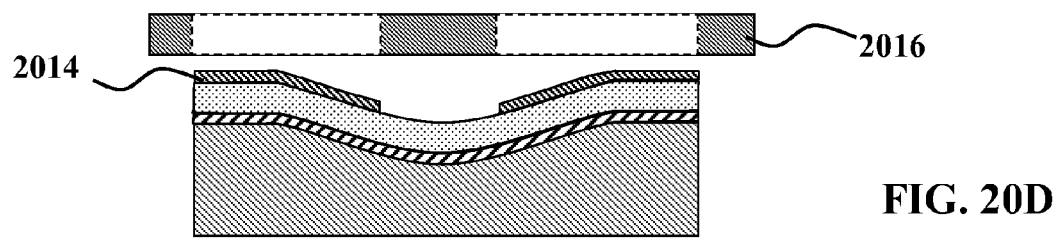
Figure 20E:
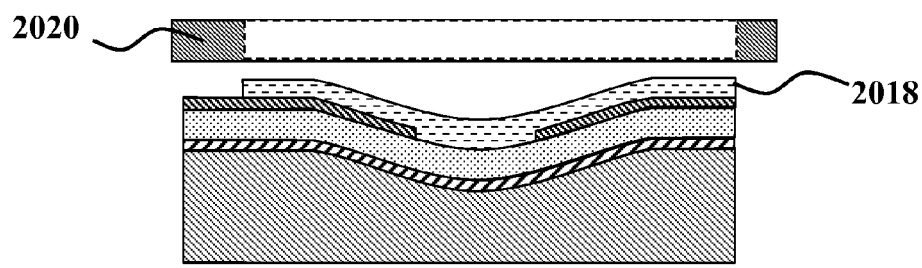
Figure 20F:
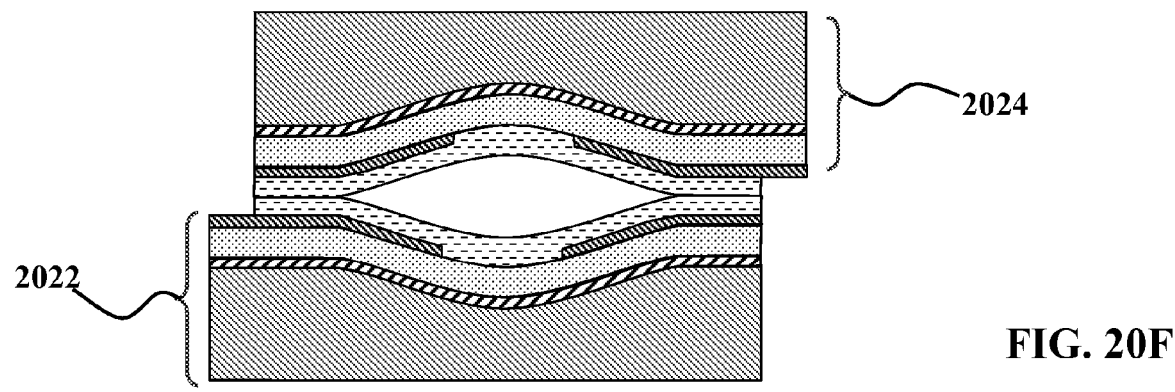

After the mold pieces 2012 and the second layer of mold release 2010 are separated, metal electrodes 2014 may be formed on the PDMS layers 2008, e.g., by evaporation through a shadow mask 2016 as shown in FIG. 20D. Openings in the shadow mask correspond in size and shape to the electrodes. Metal deposits through the openings onto the PDMS. Metal is not deposited onto portions of the PDMS covered by solid parts of the mask. Insulator material 2018 is then formed over selected portions of the PDMS 2008 and the metal electrodes 2014. By way of example, insulator material may be deposited through a different shadow mask 2020 as shown in FIG. 20E. These processes may be repeated to form two mating pieces 2022, 2024 that are mirror images of each other. These two pieces may be combined together and bonded as shown in FIG. 20F. An enclosed volume is formed between the two pieces of PDMS from each half.

Figure 20G:
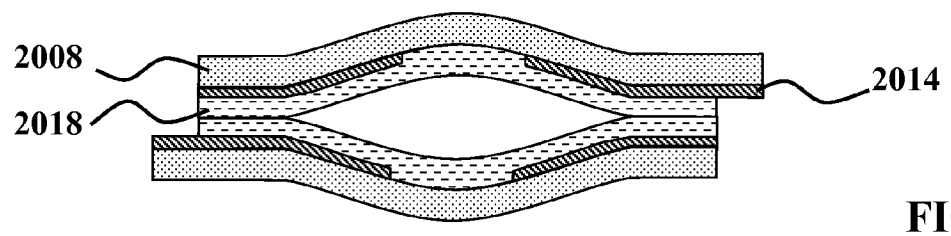
Figure 20H:
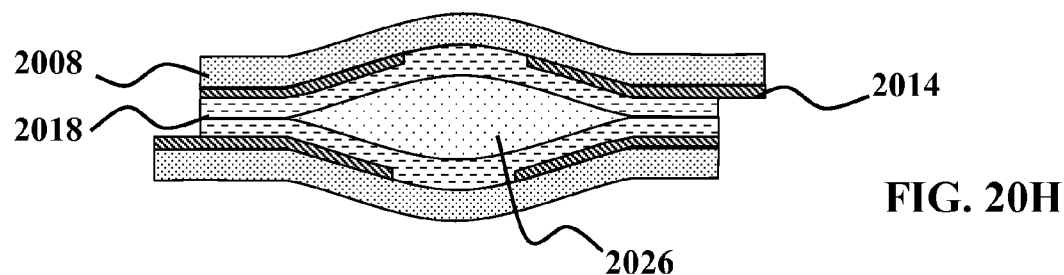
Figure 20I:
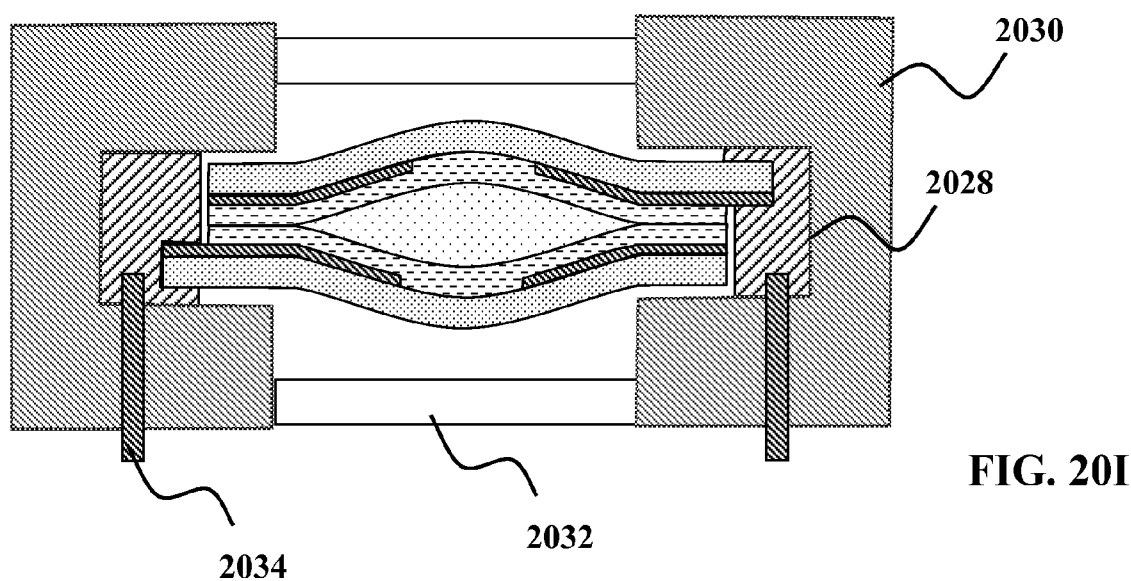

After the two halves are bonded together, the molds may be removed as shown in FIG. 20G. The enclosed volume between the two pieces of PDMS 2008 is then filled with a transparent fluid 2026 as shown in FIG. 20H. By way of example, the enclosed volume may be filled through fill holes by immersing the device in a fluid bath with ultrasonic agitation. After filling the fill holes may be sealed, for example with conductive epoxy 2028, to retain the fluid within the enclosed volume. After the fill holes are sealed, the device may be packaged in a housing 2030 having two windows 2032 and electrical contacts 2034 may be bonded to the metal electrodes as shown in FIG. 20I.

Embodiments of the present invention may use perfluorinated polyether (PFPE) inert fluids as the transparent fluid. PFPE fluids have several desirable properties including low vapor pressure, chemical inertness, high thermal stability, good lubricant properties, no flash or fire point, excellent compatibility with metals, plastics & elastomers, good aqueous and non-aqueous solvent resistance, high dielectric properties, low surface tension, good radiation stability, environmental acceptability and low cost. The table below lists some properties of PFPE fluids. Comparative graphs of refractive index versus optical wavelength for PFPE fluids and other refractive media are shown in FIG. 21.

| Typical Property | Units | Value |
| --- | --- | --- |
| Average molecular weight | a.m.u. | 1800 |
| Specific gravity (20° C., 68° F.) | g/cm3 | 1.88 |
| Kinematic Viscosity | cSt | 64 |
| Viscosity Index | | 71 |
| Vapor Pressure:     @ 25° C. | Torr | $8 \times 10^{-7}$ |
|                    @ 100° C. | Torr | $3 \times 10^{-3}$ |
| Pour Point | ° C. | −50 |
|  | ° F. | −58 |
| Heat of Vaporization (200° C., 392° F.) | cal/g | 11 |
| Surface Tension | Dyne/cm | 21 |
| Evaporation Loss (22 hrs; 120° C.) | % by wt. | 2.8 |
| Ultimate Total Pressure | Torr | $1.7 \times 10^{-3}$ |
| Specific Oil Consumption | Cm3/hr | 0.4 |
| Dielectric Strength (ASTM D877 Standard) | kV/100 mils | 40 |
| Dielectric Constant ($10^2$-$10^5$ Hz) (ASTM D877) | | 2.15 |
| Resistivity (ASTM D257 Standard) | Ohm cm | 1015 |
| Dissipation Loss ($10^2$-$10^5$ Hz) (ASTM D150) | | $4 \times 10^4$ |
| Refractive Index, $n^{20}D$ @20° C. (68° F.) | | 1.300 |

Figure 21:
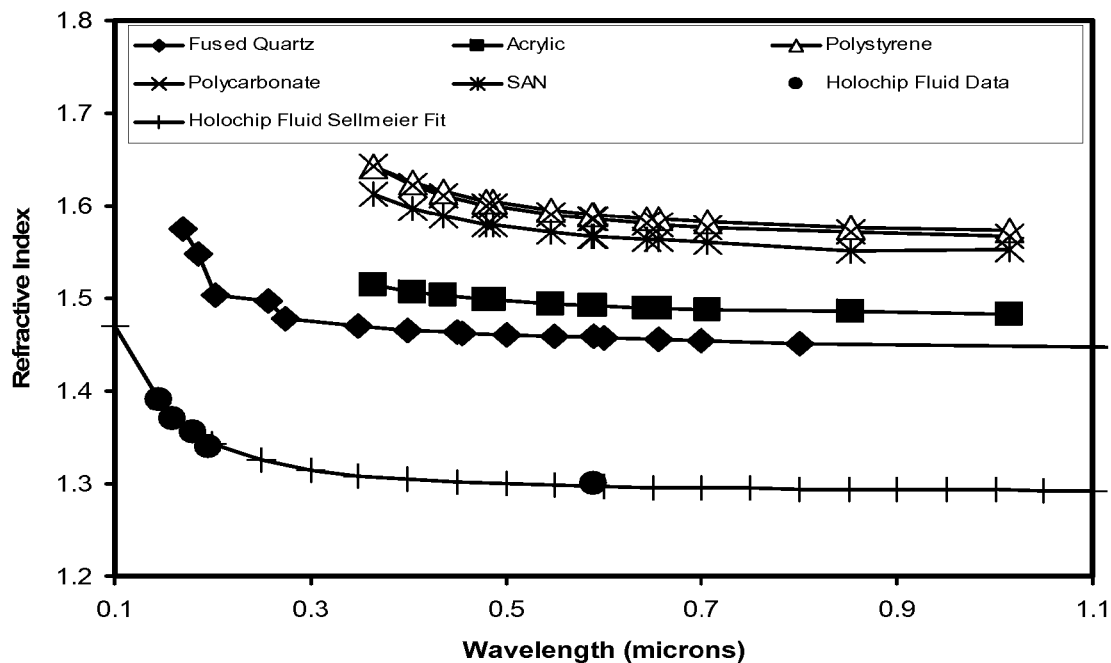
FIG. 21 is a graph of refractive index as a function of optical wavelength for PPFPE fluids.

As can be seen from the graph in FIG. 21, PFPE fluids have lower dispersion than even fused quartz. Thus fluidic lenses made using such fluids can have lower chromatic aberration than other lens materials, including glass.

Drop test performance for electrostatically actuated fluidic lenses has been modeled assuming a basic design that uses a PDMS membrane filed with a PFPE fluid. As can be seen from the following table such a design is theoretically capable of withstanding more than 3900 g's of acceleration.

In modeling the drop test performance only the weakest link in the system—the lens membrane—has been modeled. The lens membrane has the most compliance and lowest resonant frequency of any part in the system. The rest of the system is stiff and not as easily excited by vibration.

| Lens Property | Value | Units | Notes |
| --- | --- | --- | --- |
| Lens volume | 2.2E−08 | (m^3) | Assumed sphere |
| Lens mass | 4.3E−05 | (kg) | Density = 1900 kg/m^3 |
| Tension @ 50 diopters | 3.9 | (N/m) | Normal operation |
| Tension @ hemispherical stretch | 149.5 | (N/m) | Assumed worst case due to inertial loading; it is a factor of 38x more severe than normal use and a factor of 5x less severe than the smallest peel strength of identified laminated films |
| Tension @ hemispherical stretch | 0.854 | (lb/in = pli) | Pounds/linear inch to compare with bond |
| Typical bond line peel strength | 4.5 | (lb/in = pli) | Data for Kapton gives safety factor of 5.3 |
| Membrane stress | 217 | (psi) | Membrane thickness = 100 micron |
| Mylar tensile strength (psi) | 25000 | (psi) | Smallest strength found gives safety factor of 115 |
| Total inertial force (Integrate normal component of tension) | 1.64 | (N) | |
| Peak acceleration | 38537.73 | (m/s^2) | F/m |
| Peak acceleration | 3932.42 | (g's) | Expressed in g's |

Figure 22:
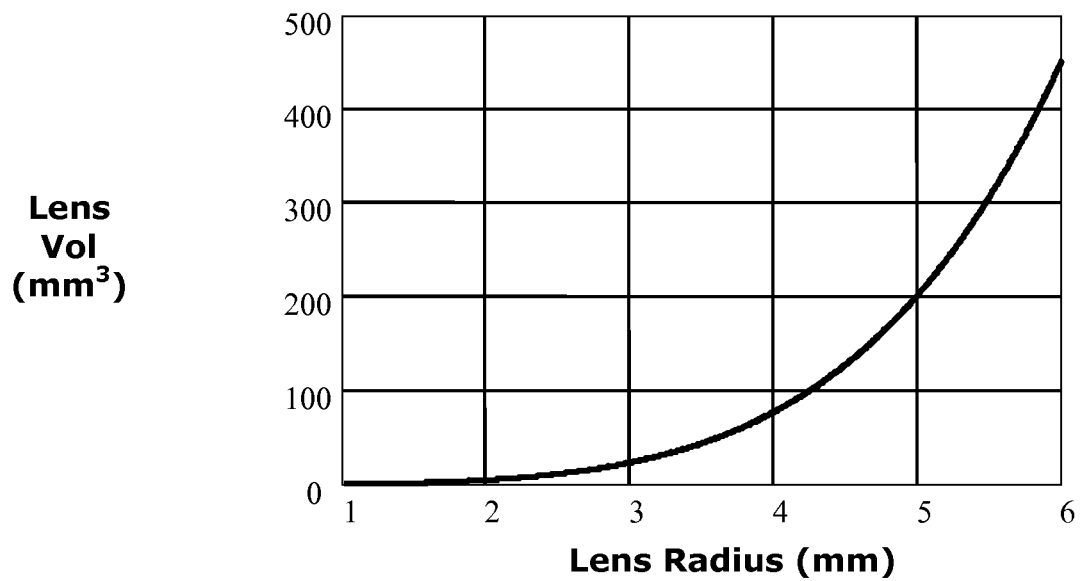
FIG. 22 is a graph illustrating lens volume scale in a non-linear fashion as a function of lens radius.

Embodiments of the present invention exhibit certain advantages over prior art fluidic lenses in terms of scalability. One prior art approach uses a microfluidic lens with a microfluidic pump. The pump actuator is not scalable. As can be seen from FIG. 22, in a fluidic lens that uses a microfluidic pump the lens volume scales in a nonlinear fashion as a function of lens radius. Consequently, in such a lens, the actuator requires nonlinearly increasing size and response time as the lens radius increases.

An alternative electrostatic fluidic lens design utilizes a phenomenon known as electrowetting. In electrowetting lenses, the shape of the interface between two immiscible fluids is changed by applying an electric field. However, the choices for fluids for such lenses is limited. Furthermore, there tends to be a small difference in refractive for typical combinations of fluids used in electrowetting lenses. Consequently, electrowetting lenses require large fluid volume and high voltage. In addition, the fluid interface has limited stability at large lens size. Above a certain size, the fluidic interface becomes unstable and unusable as a variable lens.

Figure 23:
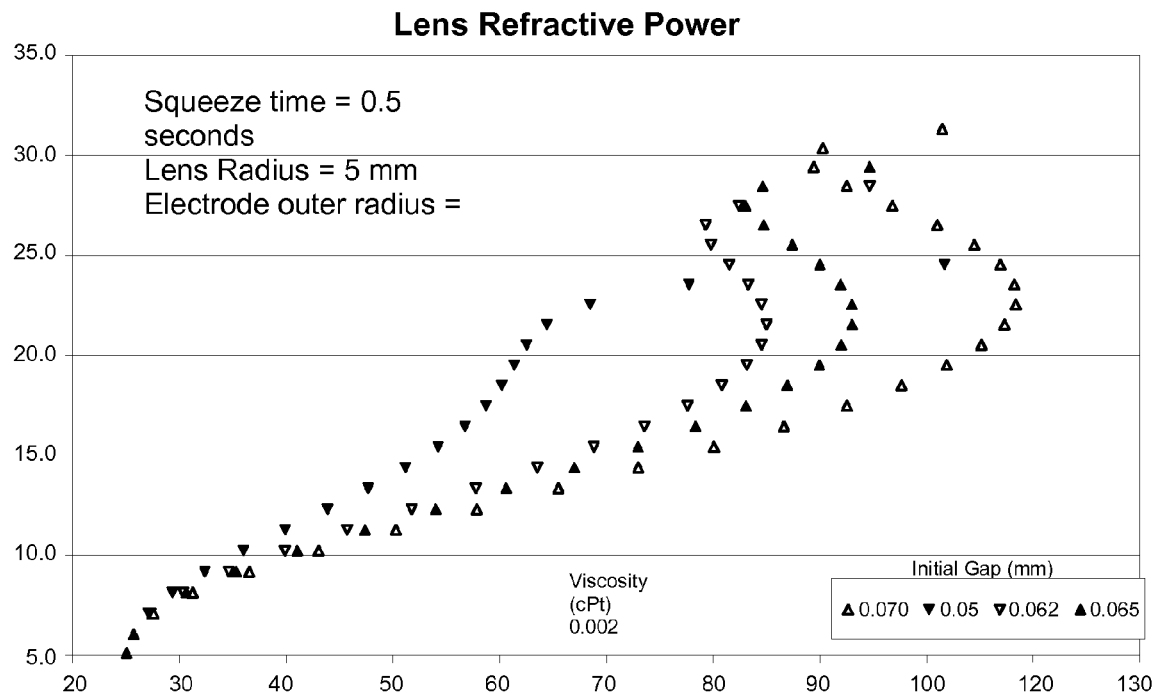
FIG. 23 is a graph showing plots of refractive lens power response for different initial gaps.
Figure 24:
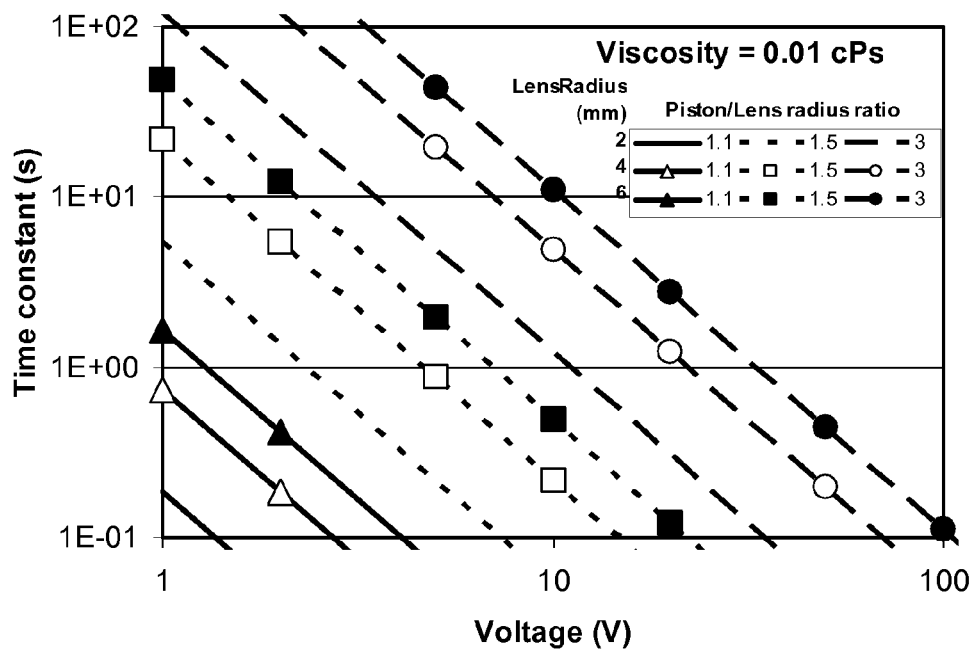
FIG. 24 is graph showing plots of response time versus voltage for ratios of piston radius to lens radius.

Embodiments of the present invention avoid the above-described disadvantages of prior fluidic lenses that utilize microfluidic pumps or electrowetting. The integrated electrostatic actuator/lens approach utilized in embodiments of the present invention is highly scalable and provides practical solutions for relatively large radius lenses, e.g., lenses having a radius greater than about 5 mm. Lenses according to embodiments of the present invention may exhibit the following advantageous scalability factors for a focal power range of about 100 Diopters. The actuation voltage is expected to remain <50V. The complexity and cost are expected to increase proportionally with lens size. The actuation stroke required for a focal power range of 100 Diopters in large lenses is expected to be relatively small (e.g., <50 mm). The actuator size is expected to scale linearly with lens size. In addition fast response times (e.g., less than about 100 milliseconds) are believed to be possible with electrostatically actuated fluidic lenses according to embodiments of the present invention. FIG. 23 shows plots of refractive lens power response for different initial gaps. FIG. 24 shows plots of response time versus voltage for ratios of piston radius to lens radius.

As can be seen from FIG. 24, response time decreases with increasing actuation voltage and increases with increasing lens radius and piston/lens radius ratio.

As can be seen from the foregoing discussion, embodiments of the present invention address scalability issues that plagued prior art fluidic lenses. Specifically, a large (10 mm dia aperture) simple (parallel plate) device cannot displace the required volume of fluid in order to achieve a 50 diopter range of focal power per membrane using a 15 mm electrode radius and starting from a 25 micron gap. There is not enough fluid to fill the lens to that level. A larger gap takes higher voltage even with low viscosity fluids. Very low viscosity bring back the snap-down effect to parallel plate capacitors. However, embodiments of the present invention provide multiple solution paths to these problems. Specifically, an air-gap zipper actuator provides significant advantages over prior art parallel plate actuators. In some embodiments flow amplification may be used to increase the volume of fluid displaced. In other embodiments, two or more fluidic lenses may be stacked in series in a compound lens to increase the overall range of focal power of the compound lens. Alternatively, two or more actuators may be stacked in a single lens to increase fluid volume displacement.

Figure 25A:
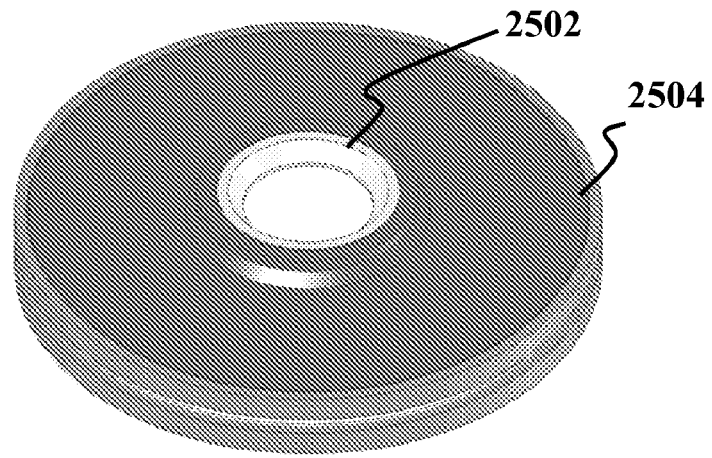
FIG. 25A is a three-dimensionally external view of an electrostatically actuated fluidic lens.
Figure 25B:
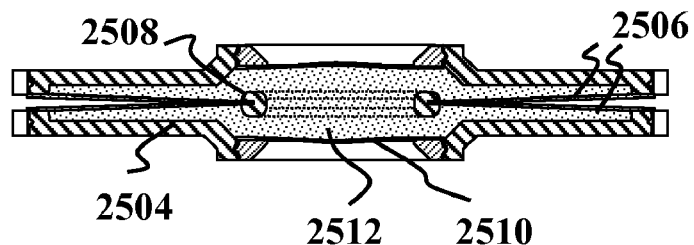
FIG. 25B is a cross-sectional view of the electrostatically actuated fluidic lens of FIG. 25A with flat elastomer membrane according to an embodiment of the present invention.
Figure 25C:
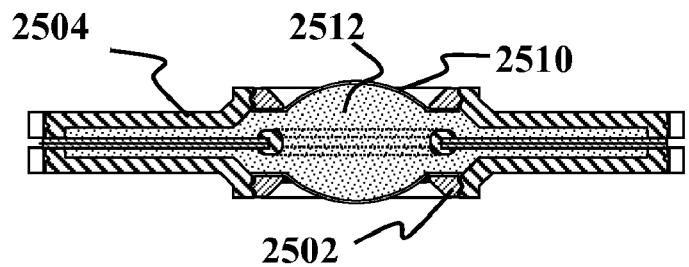
FIG. 25C is a cross-sectional view of the electrostatically actuated fluidic lens of FIG. 25A with expanded elastomer membrane according to an embodiment of the present invention.
Figure 26:
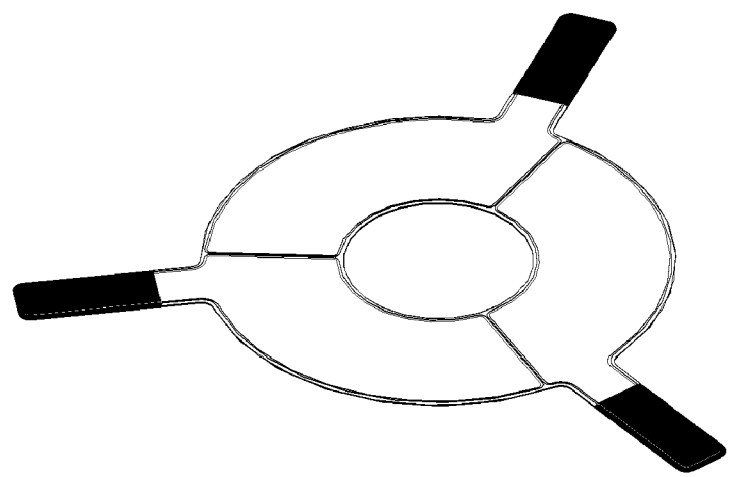
FIG. 26 is a three-dimensional view of an electrostatically actuated fluidic lens utilizing a zipper actuator n the form of a flex circuit according to an embodiment of the present invention.

FIGS. 25A-25C illustrate an example of an electrostatically actuated fluidic lens according to a currently preferred embodiment of the present invention. FIG. 25A is a three-dimensionally external view of an electrostatically actuated fluidic lens 2500, which includes a snap ring 2502 and a reservoir ring 2504. The lens 2500 utilizes a zipper actuator in the form of a flex circuit as depicted in FIG. 26. The zipper actuator includes two flexible conductive electrodes that are divided into three segments. As shown in FIG. 25B, the two electrodes 2506 have a central aperture and are held together by a grommet 2508 that fits through the aperture. Each electrode 2506 is attached at its periphery to a rigid reservoir ring 2504. Each reservoir ring 2504 has recess that defines a fluid reservoir and an aperture covered by a transparent elastomer membrane 2510. The membranes 2510 are retained, e.g., by snap rings 2502. A transparent fluid 2512, e.g., PFPE, fills the space in the recesses and apertures that is bounded by the reservoir rings 2504, membranes 2510 and flexible electrodes 2506. In this example, the reservoirs are filled such that in a rest position, the membranes 2510 are more or less flat and the reservoir rings 2504 are spaced slightly apart and a wedge-shaped air gap is present between the two electrodes 2506 as shown in FIG. 25B. When a voltage is applied between the two electrodes 2506, the resulting electrostatic force pulls the electrodes towards each other, which, in turn, pulls the two reservoir rings 2504 towards each other. This reduces the volume of fluid between the electrodes 2506 and the reservoir rings 2504. As a result the fluid is displaced into the apertures where it expands the elastomer membrane 2510 as shown in FIG. 25C, producing two curved refracting surfaces. The curvature of the refracting surfaces is adjusted by adjusting the voltage applied between the two electrodes. The recesses in the rigid reservoir rings provide a degree of flow amplification. Segmentation of the electrodes, e.g., as shown in FIG. 26, permits adjustment of a tilt of the lens by applying different voltages between different segments of the electrodes.

Figure 27A:
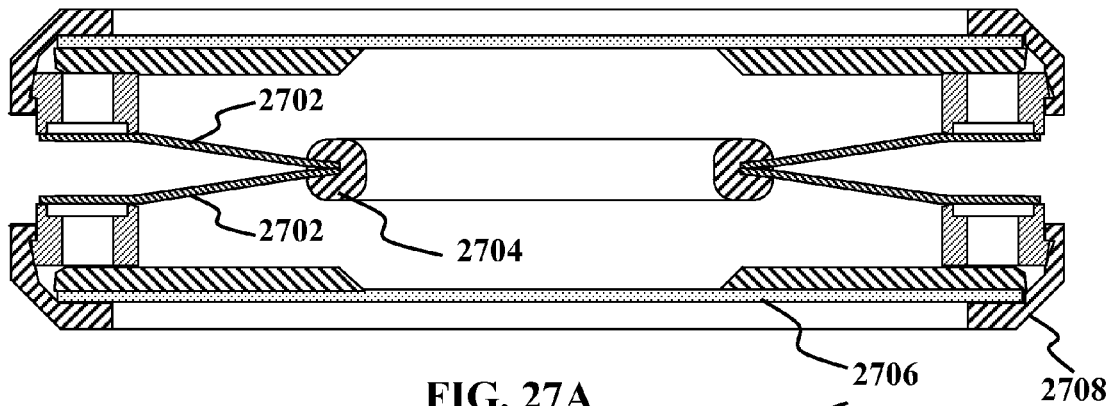
FIGS. 27A-27B are cross-sectional schematic diagrams illustrating an alternative electrostatically actuated fluidic lens according to an embodiment of the present invention.
Figure 27B:
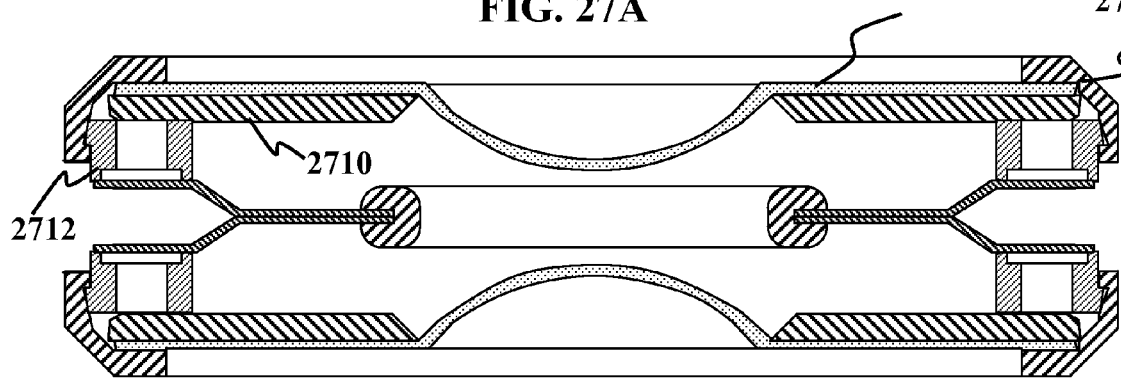
Figure 27C:
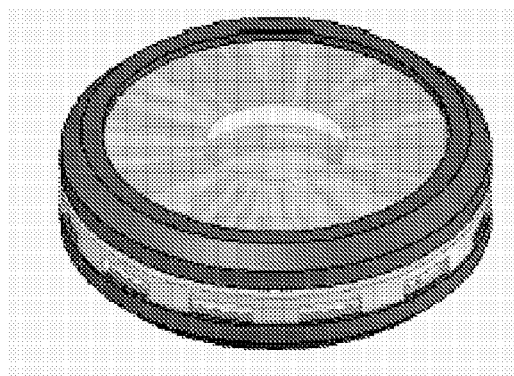
FIG. 27C is a three-dimensional view of the alternative electrostatically actuated fluidic lens of FIGS. 27A-27B according to an embodiment of the present invention.
Figure 27D:
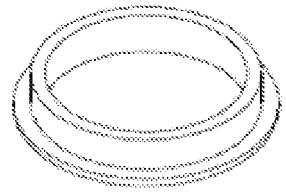
FIG. 27D is a three-dimensional view of a grommet.
Figure 27E:
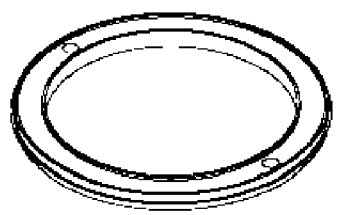
FIG. 27E is a three-dimensional view of a retainer rings.
Figure 27F:
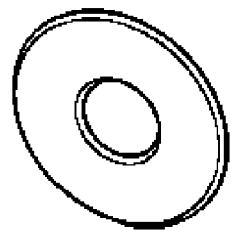
FIG. 27F is a three-dimensional view of a top plate.
Figure 27G:
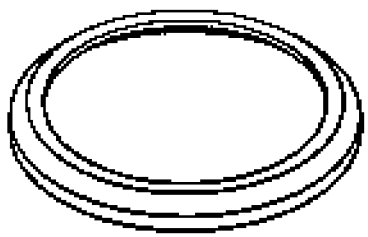
FIG. 27G is a three-dimensional view of a snap ring.

In the above preferred embodiment, applying a voltage led to an increase in membrane curvature and increased positive focal power. Alternatively, applying a voltage may lead decreased membrane curvature and/or increased negative focal power. For example, FIGS. 27A-27C illustrate an alternative preferred embodiment of a fluidic lens 2700. In this embodiment, the fluidic lens has a similar construction to that shown in FIGS. 25A-25C. As shown on FIGS. 27A-27B, two flexible electrodes 2702 are held together by a grommet 2704 that fits through an aperture in each electrode. FIG. 27D shows detail of the grommet. The electrodes 2702 are attached peripherally to conductor retainer rings 2712, which is depicted in FIG. 27E, e.g., using an adhesive. A top plate 2710, which is shown in FIG. 27F, and transparent elastomer membrane 2706 (e.g., PDMS) are retained between the top plate 2710 and a snap ring 2708, which is shown in FIG. 27G. Each snap ring 2708 engages one of the conductor retainer rings 2712 to secure a membrane and top plate between the retainer ring 2712 and snap ring 2708. The conductor retainer ring 2712 includes a large opening that provides a reservoir for fluid. The top plate 2710 includes a smaller diameter opening that defines an aperture that is covered the membrane 2706. The internal volume bordered by the membranes 2706, top plates 2710, conductor retainer 2712 and electrodes 2702 is filled with a transparent fluid (e.g., PFPE).

Figure 27H:
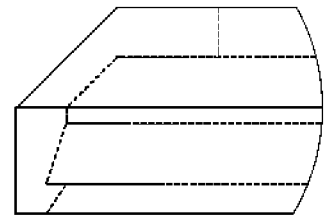
FIG. 27H is a perspective view illustrating a portion of an internal lip of the snap ring.

The electrostatic fluidic lens may be assembled as follows. The electrodes may be glued to the conductor retainers. The electrodes may be cut to shape if needed. One glued membrane is inserted onto the grommet and the fixed spacer is placed over the over the corresponding conductor retainer. The other electrode is then placed onto the grommet and the grommet is heat staked to secure the two electrodes together. The top plate is then put on the conductor retainer and the membrane is stretched over the conductor retainer and clamped over the conductor retainer. Excess membrane material may be cut away so that the membrane forms a surface of the lens. The snap ring is then placed over the top plate and pressed onto the conductor retainer. The snap ring has an internal lip as shown in FIG. 27H that engages an external lip on the conductor retainer. The partially assembled lens is then flipped over, filled with fluid and degassed. A second top plate is then placed on the second conductor retainer. Another piece of membrane is then is stretched over the second conductor retainer and clamped over the conductor retainer. Excess membrane material may be cut away so that the membrane forms a second surface of the lens. The second snap ring is then placed over the second top plate and pressed onto the conductor retainer.

Operation of the fluidic lens proceeds as follows. Initially, when no voltage is applied between the electrodes, a wedge-shaped gap is present between the two electrodes as shown in FIG. 27B and the two transparent membranes are more or less flat across the apertures. However, in this embodiment, the conductor retainer rings are prevented from moving towards each other by fixed spacers. As a result, when a voltage is applied between the two electrodes, the electrodes are drawn towards each other increasing the internal volume of the fluidic lens. Fluid from the apertures is drawn towards this increased internal volume which draws the transparent elastomer membranes into the negatively focusing configuration shown in FIG. 27C. Note that it is possible in this embodiment to fill the internal volume with a sufficiently large amount of fluid that the transparent membranes bulge outward when no voltage is applied to the electrodes. Applying a voltage has the effect of reducing the outward bulge and positive focal power of the lens. By appropriate filling of the internal volume, the lens may be made to go from positively focusing to negatively focusing by application of an appropriate voltage between the electrodes.

Figure 28A:
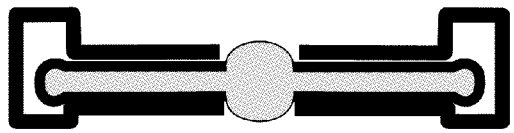
FIGS. 28A-28B are cross-sectional schematic diagrams of a negatively acting lens according to an embodiment of the present invention.
Figure 28B:
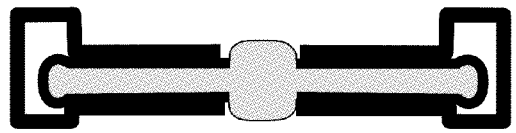

There are other variations on a negatively acting lens. For example, a negatively active lens may be fabricated as shown in FIGS. 28A-28B.

In this example, a fluid-filled volume of a flexible reservoir is fixed and viscous effects minimized by allowing a sufficient thickness of fluid. One or more electrodes are attached to the flexible reservoir. The electrodes on the reservoir are initially spaced apart from corresponding electrodes on an outer frame by a dielectric-filled gap. In this example, the dielectric material filling the gap between the electrodes is air. In an unenergized state, as shown in FIG. 28A, the reservoir has an embossed (e.g. thermoformed) membrane set for a minimum focal length (maximum focal power). Embossed domes are durable and in widespread use for membrane switches. Such embossed domes for membrane switches are commercially available, see, e.g., http://www.screenprintdow.com/OLDwork/swi/mlm1.htm. Applying an electrostatic force between the electrodes on the reservoir and the electrodes on the frame creates negative pressure in fluid which flattens a dome of the membrane. Optical aberrations in the lens effect produced by the domes may be confined to narrow annular region around domes.

As discussed herein embodiments of the present invention include fluid-filled parallel-plate capacitors capable of squeezing fluid into a centrally-disposed elastic-membrane-delimited lens. Actuation is obtained by application of an electric field between the plates. Pressurization of the fluid causes the membranes to bulge, thereby controllably altering the optical power of the lens. The elastic energy of the membranes provides the restoring force which prevails, once the electric field is diminished.

Embodiments described above include two advantageous features: a) "Double Rim" hydraulic stroke amplification and b) "Single rim" amplification.

"Double Rim" hydraulic stroke amplification occurs when the membrane edge is attached to a fixed support (inner rim) and the fluid from the capacitive reservoir is transferred to the lens area. The average lens stroke may be estimated from the capacitor stroke and the system geometry, e.g., as follows:

$$AverageLensStroke = CapacitorStroke \times \frac{CapOuterRadius^2 - CapInnerRadius^2}{LensRadius^2}$$

In a "Single rim" amplification configuration the membrane is directly attached the inner radius of the capacitor. The volume swept by the moving actuator is defined by the area circumscribed by the outer capacitor radius, including the lens area. The average lens stroke may be estimated from:

$$AverageLensStroke = CapacitorStroke \times \frac{CapOuterRadius^2}{LensRadius^2}$$

Figure 29:
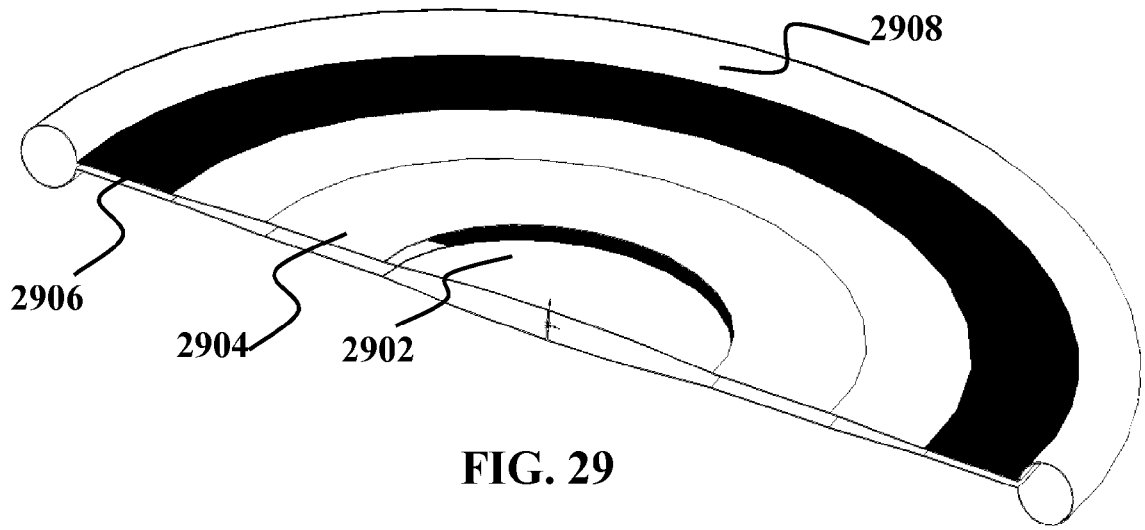
FIG. 29 is a three-dimensional view illustrating moving plate profile of an electrostatic flow amplifier according to an embodiment of the present invention.

Additional embodiments of the present invention overcome the limitations of earlier parallel-plate devices by providing a shaped plate with sections separately optimized for maximum electrostatic force and for minimum viscous resistance to flow. FIG. 29 is a three-dimensional view of one half of a electrostatic flow amplifier 2900, which includes a lens 2902, a deeper flow channel 2904, a capacitor section 2906 and a flexible seal 2908. The arrangement in FIG. 29 shows that the region of largest gap is disposed adjacent to the lens cavity. The electroded area is located peripherally and provided with a relatively narrow gap. Although that narrow gap still presents some viscous opposition to the movement of the profiled rigid plates, the peripheral location and the narrowness of the electroded region insures a relatively small viscous resistance to flow. The gently widening gap also ensures a laminar flow with modest overall backpressure prevails.

Figure 30:
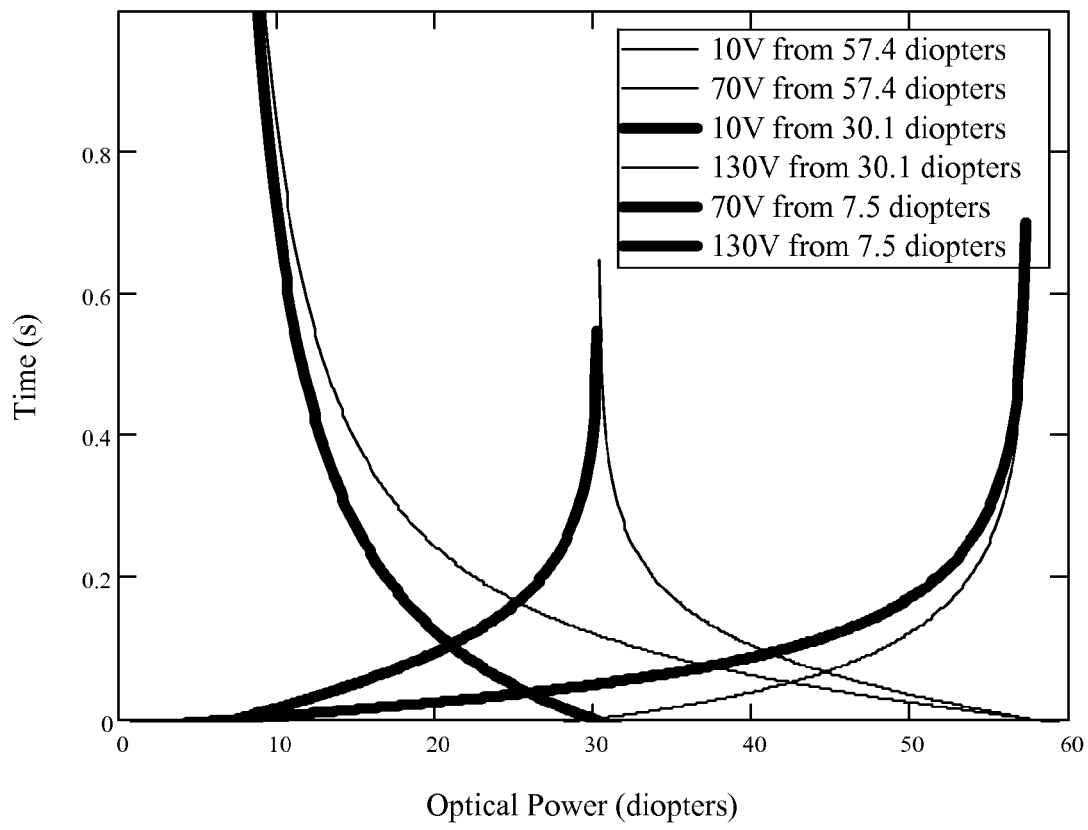
FIG. 30 is a graph illustrating dynamic performance of the electrostatic flow amplifier.

The predicted dynamic performance for this configuration is depicted in FIG. 30. Although this performance is superior to the case of a parallel-plate capacitor, it still takes as much as 130V to achieve an operating range of about 50 diopters per membrane. The response time is mostly faster than a second except for the case of retracting to a low voltage state.

Figure 31:
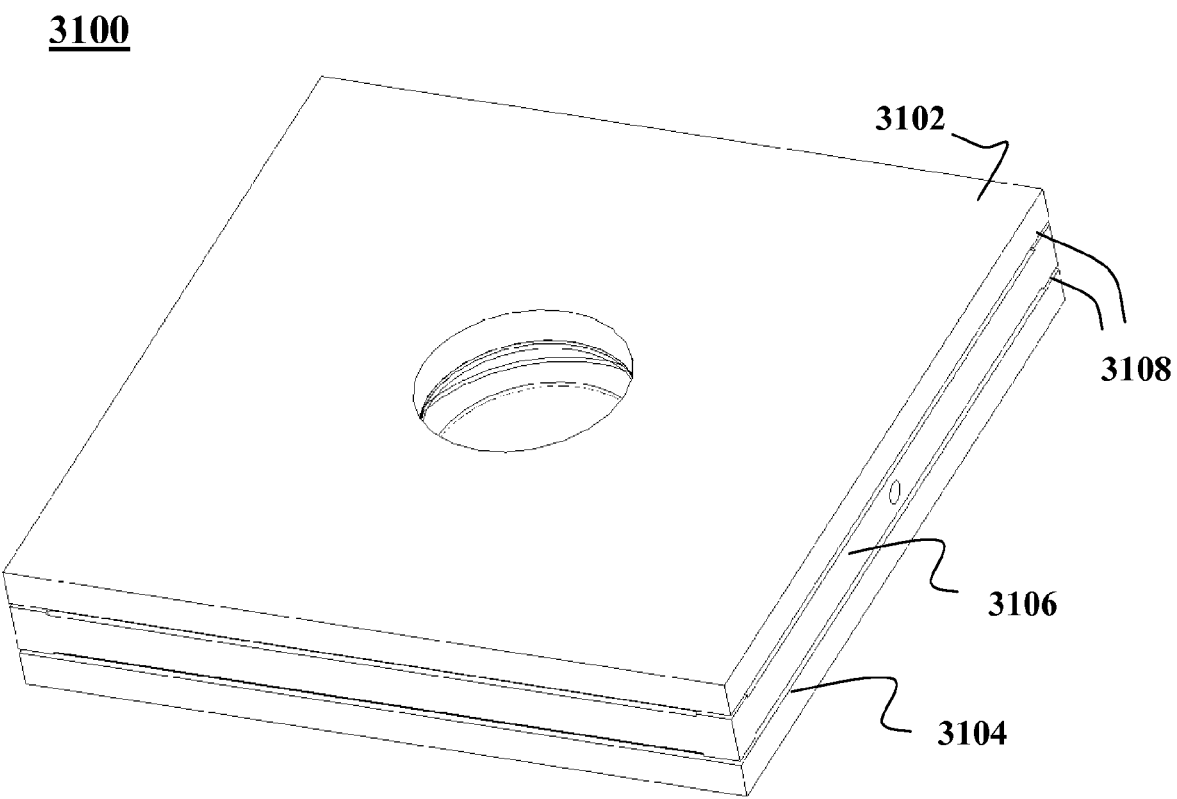
FIG. 31 is a three-dimensionally external view of a Drycap flow amplifier.
Figure 32:
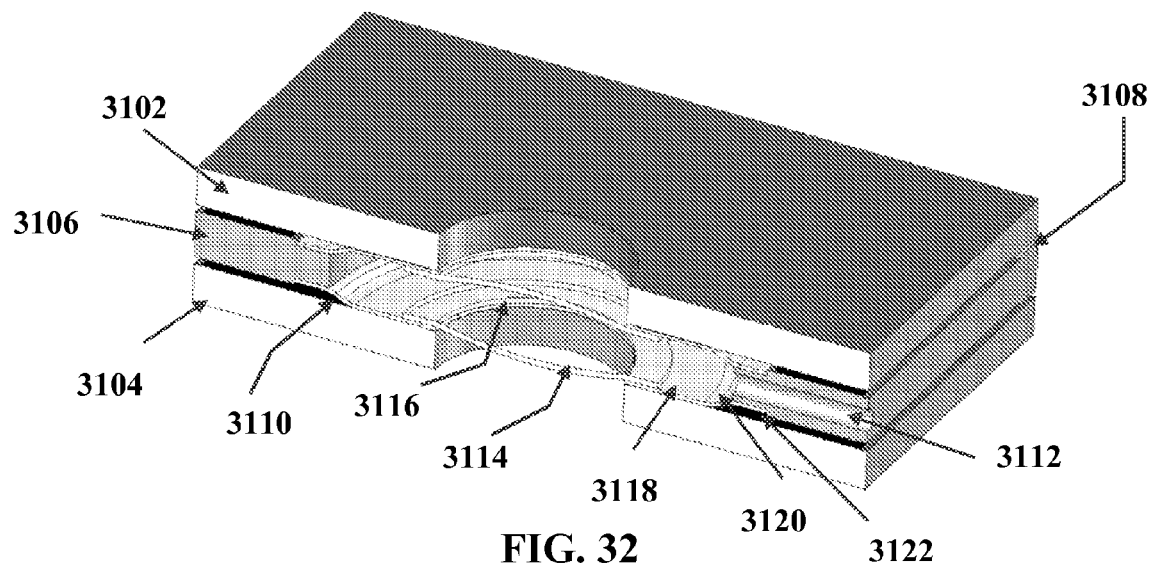
FIG. 32 is a three-dimensionally cross-sectional view of the Drycap flow amplifier.

To further improve the performance of this electro-fluidic lens, the actuator area is segregated from the fluid reservoir by a flexible seal. This reduces viscous effects very significantly, and permits a simpler mechanical construction. FIG. 31 and FIG. 32 illustrate a preferred embodiment of the inventive concept.

As can be seen from FIG. 31 and FIG. 32, an electro-fluidic lens 3100 may include a mid-plane spacer 3106 and lens membranes 3114 disposed between first and second planar electrodes 3102, 3104. The electrodes 3102, 3104 (and lens membranes 3114) are supported from the mid-plane spacer 3106. The mid-plane spacer 3106 may be constructed as a multi-layer printed circuit (PC) board. Electrical connection may be provided to the electrodes through the mid-plane spacer 3106. The electrodes 3102, 3104 have some degree of freedom of movement in an axial direction. Specifically, gaps between the electrodes and the mid-plane spacer 3106 permit some movement of the electrodes toward the spacer. The electrodes include aligned openings that permit light to pass through a lens section 3116 between the electrodes. The lens section 3116 is bounded by the membranes 3114, first and second flexible seals 3110 and an inside radius of an opening in the mid-plane spacer 3106. A transparent fluid fills the lens section 3116. A filler hole 3112 may be provided in the mid-plane spacer 3106 for the purpose of filling the lens section 3116 with fluid. The flexible seals 3110 may be substantially ring-shaped. Each seal may include an inner ring 3118 and an axially offset outer ring 3122. A sloping section 3120 connects the inner and outer rings. The sloping section 3120 also provides the seals with a certain amount of flexibility that allows the seals to be compressed axially. The flex seals 3110 may be metalized to facilitate connection of the mid-plane spacer 3106 to the planar electrodes. The inner ring 3118 of each seal is placed between an electrode and a membrane. Each membrane covers a central opening in the inner ring and one of the aligned openings in the electrodes. In such a configuration, pressure from the fluid in the lens section 3116 tends to press the membranes 3114 against the inner rings 3118 of the flexible seals 3110.

When a voltage is applied between the electrodes 3102, 3104, they are attracted to each other and exert a force against the flexible seals 3110. The force axially compresses the flex seals 3110 forcing fluid toward the aperture. The membranes 3114 expand in response to the resulting displacement of fluid thereby changing their radius of curvature and the focal length of the lens. Thin corner spacers 3108 can be seen near the corners of the gaps between the mid-plane spacer 3106 and electrodes 3102, 3104. The corner spacers 3108 are designed to prevent the gap from going into the pull-in (snap-down) range. They can also make the possible mis-orientation of the lenses very small. The corner spacers 3108 may be integrally formed as part of the mid-plane spacer 3106 or they may be formed separately.

Figure 33:
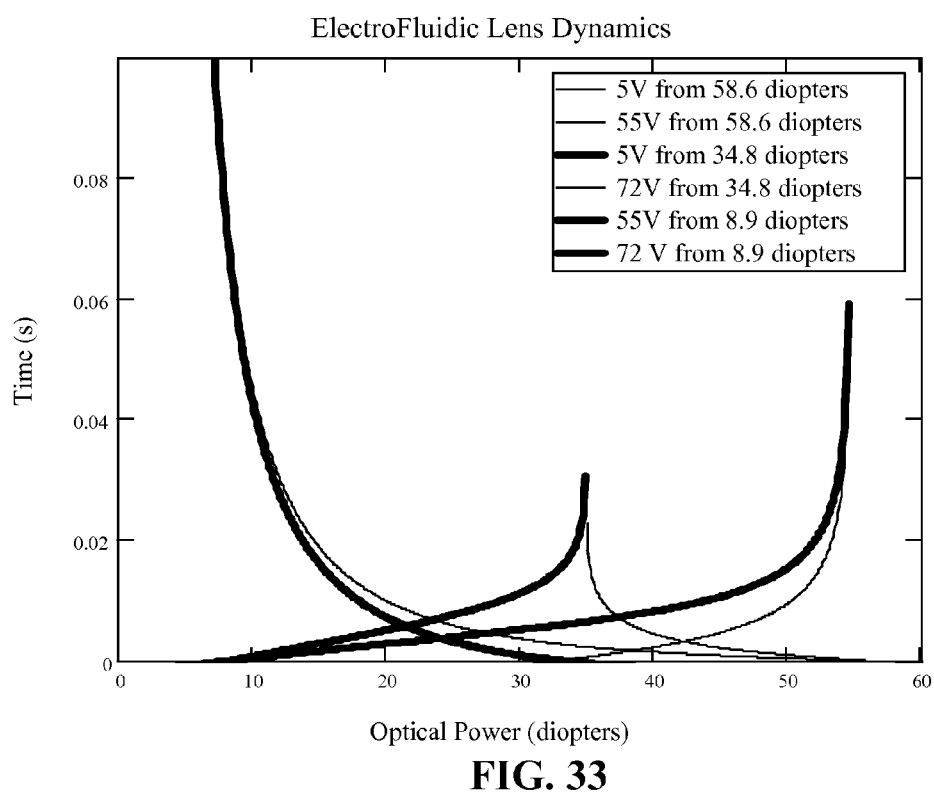
FIG. 33 is a graph illustrating dynamic performance of the Drycap flow amplifier.

The predicted performance for this configuration (referred to herein as a DryCap) is shown in FIG. 33. A marked decrease in response time and voltage requirements is visible from the graph. A diopters range similar to that of FIG. 30 may be achieved with about 72 V. The response time is much better than 1 second.

A possible assembly sequence for the above-described electro-fluidic lens may proceed as follows:

1. Transparent membranes may be pre-bonded to flex seals.
2. The Flex seals may be bonded to the mid-plane spacer, e.g., using adhesive or a welding technique such as thermo-sonic welding.
3. Adhesive may be deposited near the center openings of the electrodes.
4. The electrodes may be clamped in position against the mid-plane spacer.
5. Fluid may be injected through the filling channel in the mid-plane spacer to inflate lens bladder.
6. The pressure of the fluid may be maintained to hold the flexible seals against the electrodes until the electrodes are bonded to flex seal membranes.
7. The fluid filling channel may be plugged and the electrodes may be unclamped.

The above-described sequence is listed for the purpose of example and should be viewed as a limitation upon the invention. The steps may be performed in a different order than described above.

During the course of development of fluidic lenses described herein very important characteristic of fluid-filled elastic membranes was discovered. The elastic restoring force exerted by the stretched membrane upon the pressurized fluid is a complicated function of the actuator stroke. This function can be approximated by a cubic in actuator displacement with a very good accuracy for the range of parameters of interest in a practical device. Unlike a normal spring, a "cubic spring" stiffens up very rapidly as the stretching advances. This observation was the key to the conception of a Double Lens variant of the above-described electro-fluidic lens. If the volume of fluid displaced by the moving electrode actuator were to be shared among two membrane domes, each one of them would undergo only half of the lens displacement of the previous embodiment. The two domes, taken together would have an optical power roughly equal to that of the previous variant (along with some increase in Fresnel reflection and scattering losses), but due to the nonlinear elasticity, the required actuator force would decrease by a factor of 8, and the voltage by a nominal factor of about 2.8.

Figure 34:
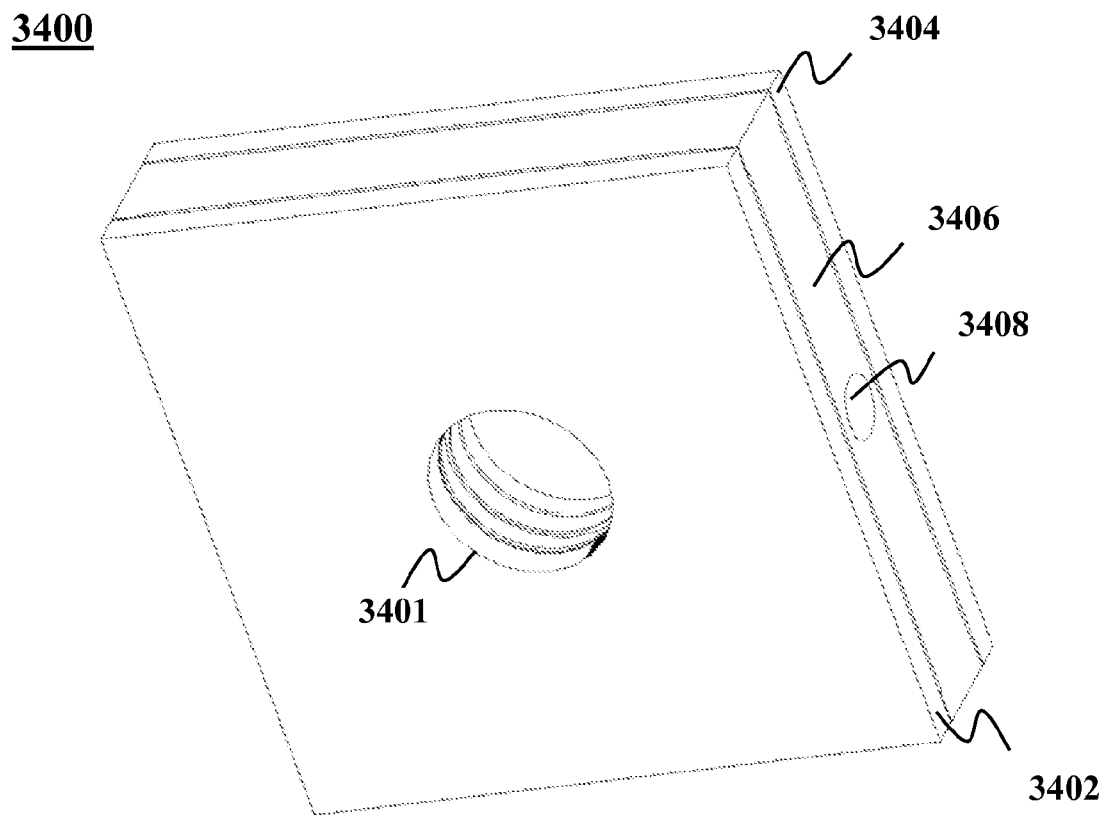
FIG. 34 is a three-dimensionally external view of a Drycap flow amplifier with a double lens.
Figure 35:
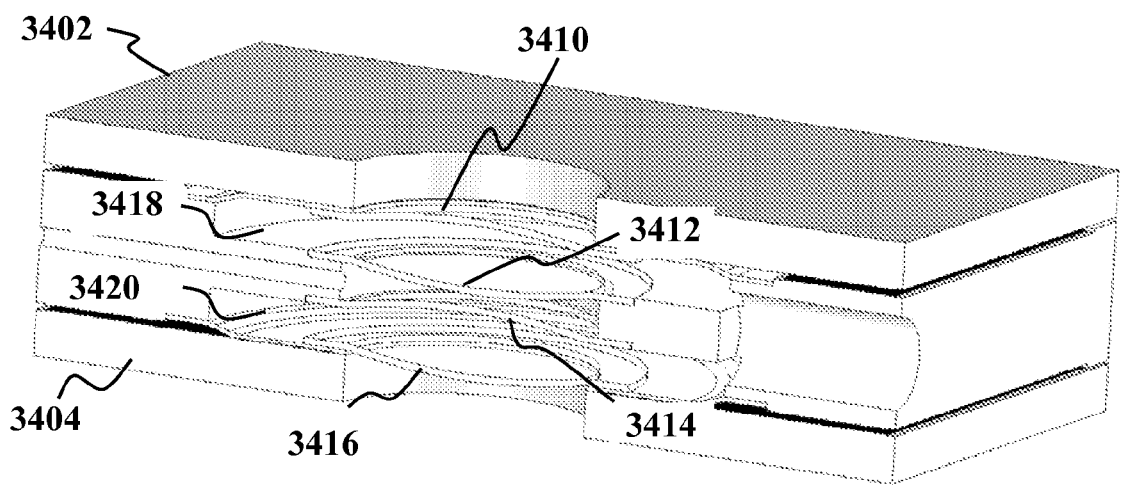
FIG. 35 is a three-dimensionally cross-sectional view of the Drycap flow amplifier with a double lens.
Figure 36:
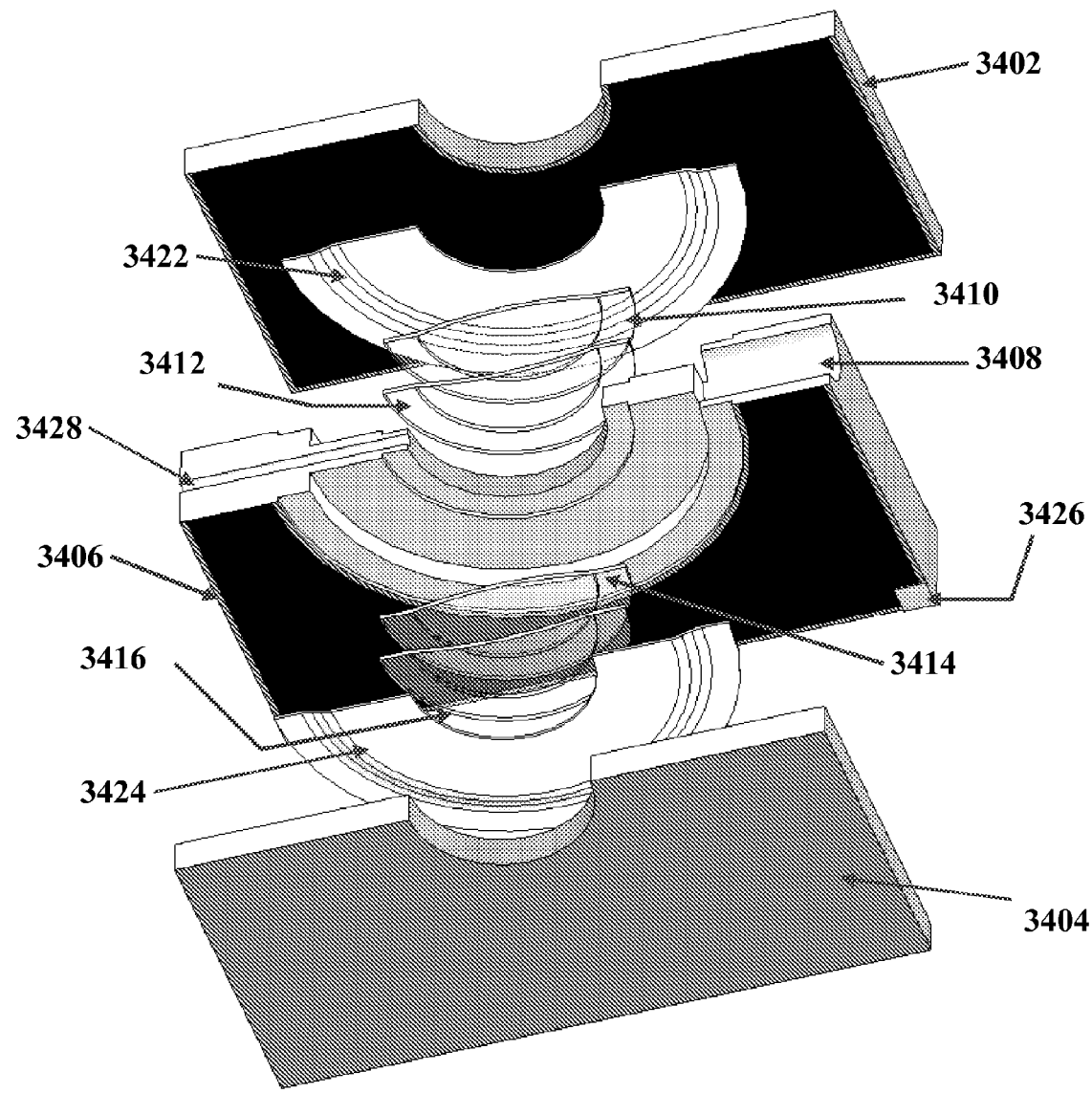
FIG. 36 is a exploded cross-sectional view of the Drycap flow amplifier with double lens.

FIG. 34, FIG. 35 and FIG. 36 illustrate an electro-fluidic Double Lens configuration according to an embodiment of the present invention. The double lens configuration 3400 includes a mid-plane spacer 3406 between first and second movable planar electrodes 3402, 3404. As in the previous embodiment, the mid-plane spacer 3406 may be constructed as a multi-layer printed circuit (PC) board. Electrical connection may be provided to the electrodes through the mid-plane spacer 3406. The mid-plane spacer 3406 includes upper and lower recesses 3418, 3420 and a central aperture 3401. Upper and lower flex seals 3422, 3424 (e.g., as described above with respect to FIG. 32) seal upper and lower membranes 3410, 3416 in place with respect to aligned openings in the first and second electrodes 3402, 3404. The flex seals 3422, 3424 also allow for a restoring force that acts against compressive force exerted by the electrodes 3402, 3404 when an attractive electrostatic force acts between them. The flex seals 3422, 3424 may be metalized to facilitate bonding to the electrodes 3402, 3404.

First and second transparent inner membranes 3412, 3414 cover opposite sides of the central aperture 3401 in the mid-plane spacer 3406. Fluid fills an upper lens section bounded by the upper recess 3418, the upper flex seal 3422, upper membrane 3410 and first inner membrane 3412. Fluid fills a lower lens section bounded by the lower recess 3420, the lower flex seal 3424, lower membrane 3416 and second inner membrane 3414. A vent hole 3428 allows air to flow freely in and out of a space between the two inner membranes 3412, 3414. A filler hole 3408 communicates with both the upper and lower recesses 3418, 3420 to permit simultaneous filling of both lens sections.

A possible assembly sequence may proceed as follows.
1. The first and second inner lens membranes may be bonded to mid-plane spacer.
2. The upper and lower membranes may be pre-bonded to the flex seals.
3. The flex seals may be bonded to the mid-plane spacer using adhesive or a welding technique such as thermosonic welding.
4. Adhesive may be deposited near the center openings of electrodes.
5. The electrodes may be clamped in position against mid-plane spacer.
6. Fluid may be injected fluid through the filling channel in the mid-plane spacer to inflate the lens bladders, while simultaneously providing a supporting back pressure through the vent port
7. The device may be held under pressure until electrodes are bonded to the flex seals
8. The filling channel may be plugged and the electrodes may be unclamped.
9. The pressure in the vent hole may be released.

Figure 37:
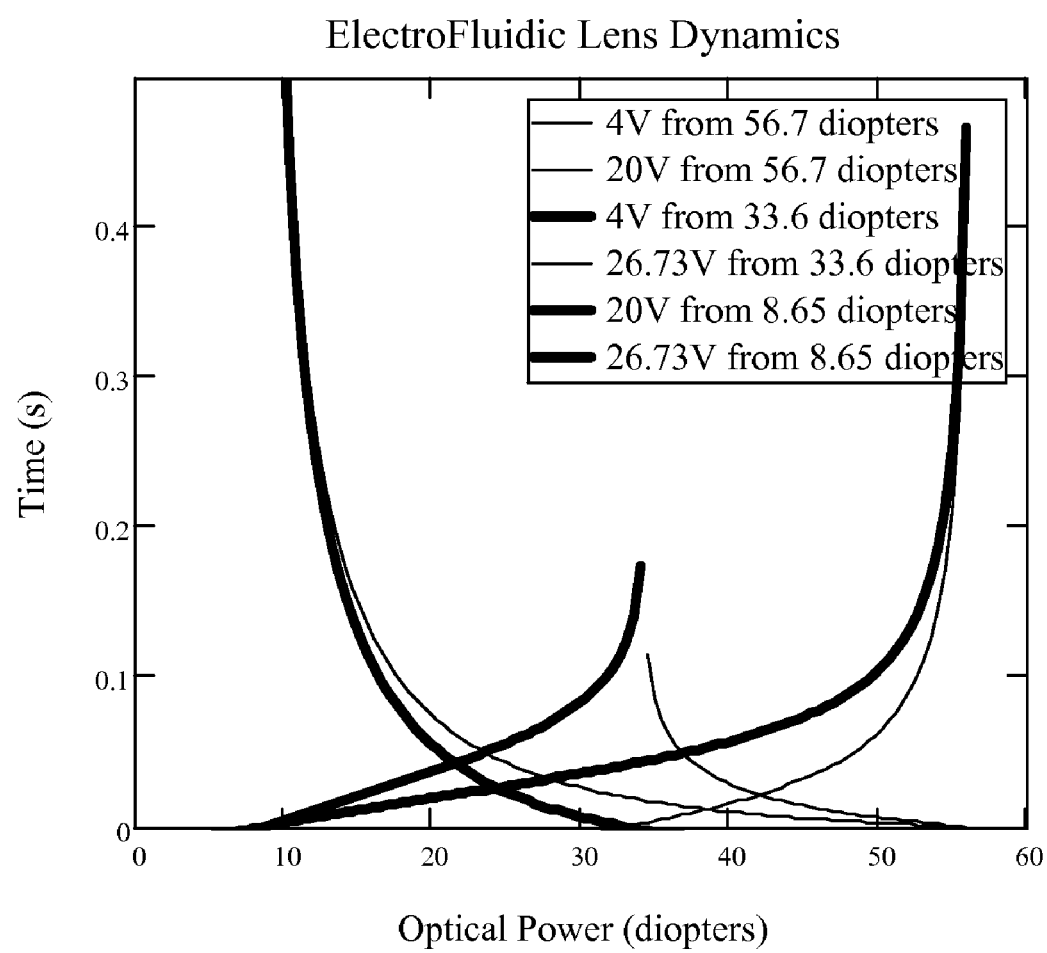
FIG. 37 is a graph illustrating dynamic performance of the Drycap flow amplifier with double lens.
Figure 38:
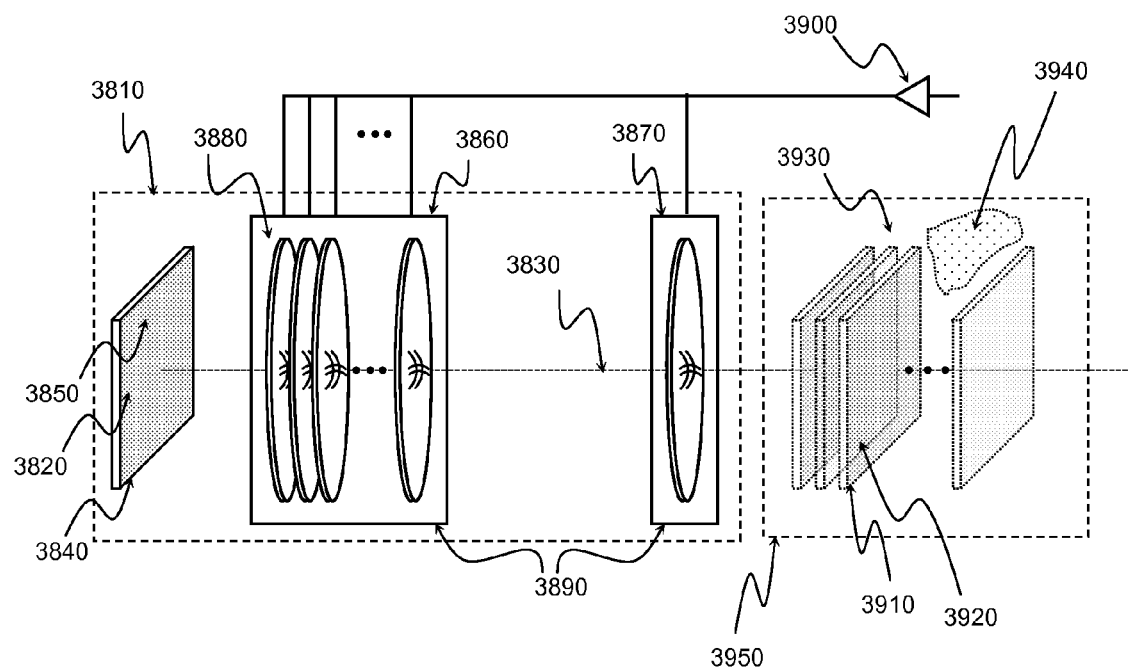
FIG. 38 is a schematic diagram of an imaging system based on combinatorial optics according to an embodiment of the present invention.
Figure 39:
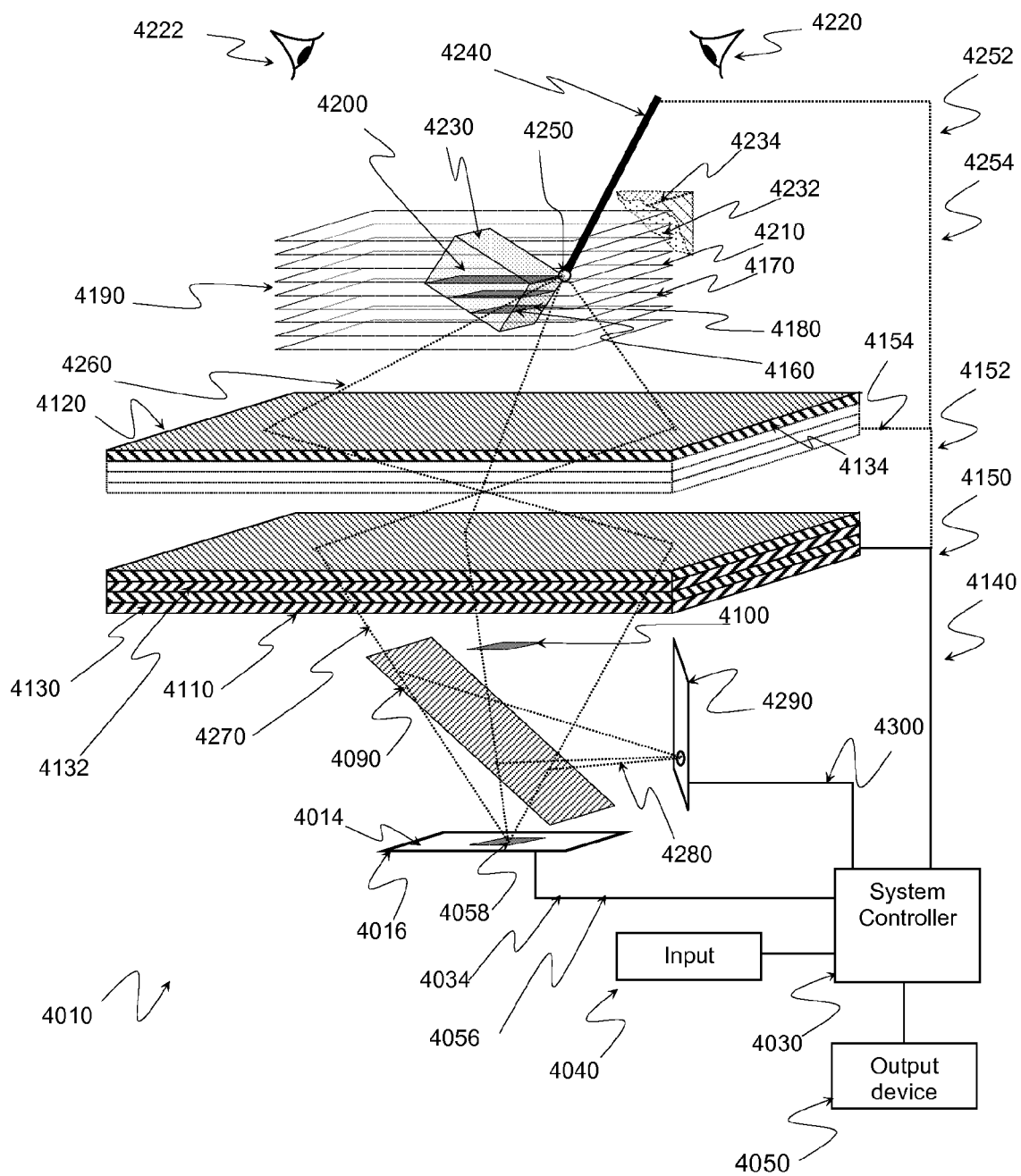
FIG. 39 is a schematic diagram illustrating a three-dimensional display system based on combinatorial optics according to an embodiment of the present invention.

As anticipated and shown in FIG. 37, the performance may undergo a significant improvement. While the response time remains well below a second, the voltage range needed to achieve a range of about 50 diopters per lens pair (or about 100 diopters for the 4-membrane device) has now dropped to less than 27 V.

Fluidic lenses of the various types shown herein may be used in many different types of optical instruments. Examples of such instruments include a camera, zoom lens, lens system, eyeglasses, telescope, cell phone camera, mobile email device camera, web camera, video phone, microscope, magnifier, eyepiece, telephoto lens, zoom lens, mirror, anamorphic aspect ratio lens, projector, projection television, plasma display, di-chromatic optical element, theodolite, fiber optic coupler, radar system, currency authentication device, or video surveillance system. Examples of such instruments are described in US Patent Publication 20070030573, which is incorporated herein by reference.

In addition, fluidic lenses of the various types described herein may be used in combinatorial optical processors of a type having one or more optical modules; wherein at least one of the one or more optical modules includes N addressable optical elements, where N is an integer greater than or equal to 1. Such combinatorial optical processors are described, e.g., in US Patent Application Publication 2002/0158866 A1, which has been incorporated herein by reference. In addition, variable focus lenses, such as those described herein may be stacked together with zero or more additional variable focal length lenses in a digital focus lens system, e.g., as shown in FIGS. 3A-3D, and employed in digital focus lens systems such as those described in U.S. Pat. No. 7,072,086, which has been incorporated herein by reference.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. In the claims that follow, the indefinite article "A", or "An" refers to a quantity of one or more of the item following the article, except where expressly stated otherwise. The appended claims are not to be interpreted as including means-plus-function limitations, unless such a limitation is explicitly recited in a given claim using the phrase "means for." Any feature described herein, whether preferred or not, may be combined with any other feature, whether preferred or not.

What is claimed is:

1. An electrostatically actuated fluidic device, that is capable of providing a variable-focal length lens, comprising:
   an elastic capacitor section;
   an elastic lens section in fluid communication with the capacitor section, the elastic lens section being characterized by a focal length;
   a fluid capable of fluid motion disposed at least partially in the capacitor and lens sections;
   wherein a voltage may be applied to the capacitor section causing it to deform;
   wherein the deformation of the capacitor section causes a portion of the fluid to flow into or out of the lens section;
   wherein a change in volume of fluid in the lens section causes the lens section to deform resulting in a variation in the focal length of the lens section.

2. The device of claim 1 wherein the elastic capacitor section includes a zipper actuator.

3. The device of claim 1 wherein the elastic capacitor section includes a fluid amplification device attached to a deformable electrode.

4. The device of claim 1 wherein the elastic capacitor section includes a membrane having an electrically conductive portion.

5. The device of claim 1 wherein the elastic capacitor section includes a membrane having one or more electrode segments formed thereon.

6. The device of claim 1 wherein the elastic capacitor section includes a liquid pill lens having perforated spacer with a cavity formed between two membranes.

7. The device of claim 1 wherein the elastic capacitor section includes a first flexible electrode and a second flexible electrode, wherein the first and second flexible electrodes are attached proximate their centers and free to move at their peripheries such that a variable wedge-shaped air gap external to the fluid is formed between the first and second flexible electrodes.

8. The device of claim 7, further comprising a one or more rigid elements attached to first or second flexible electrode, wherein rigid elements and electrodes define an internal volume having a reservoir and an aperture for the elastic lens section.

9. The device of claim 8 wherein the one or more rigid elements are free to move relative to each other under the influence of an electrostatic force between the first and second flexible electrodes.

10. The device of claim 8 wherein the one or more rigid elements are restrained from moving relative to each other under the influence of an electrostatic force between the first and second flexible electrodes.

11. The device of claim 1, wherein the device is stacked together with stacked together with zero or more additional variable focal length lenses in a digital focus lens system and or zero or more fixed focal length lenses in a digital focus lens system.

12. The device of claim 1 wherein the device is stacked together with zero or more additional variable focal length lenses in a combinatorial optical processor comprising one or more optical modules; wherein at least one of the one or more optical modules includes N addressable optical elements, where N is an integer greater than or equal to 1.

13. A compact optical system having a variable focal length lens and a fixed focal length optic wherein a position of the variable focal length lens is substantially fixed with respect to the fixed focal length optic and wherein the a variable focal length lens is a fluidic lens having a refracting surface with a variable curvature.

14. The system of claim 13 wherein the variable-focal-length lens is fixed in its position relative to the fixed focal length lens.

15. The system of claim 13 wherein the variable focal length lens is able to change a focal length or an orientation of its optical axis.

16. The system of claim 13, further comprising one or more image capture elements optically coupled to the variable focal length lens and/or fixed focal length optic.

17. The system of claim 16 wherein the image capture elements include a CCD or CMOS image sensor, photographic or holographic film, human eye or camera.

18. The system of claim 13, further comprising a second variable focal length lens, wherein the fixed focal length optic is disposed between the variable focal length lens and the second variable focal length lens.

19. The system of claim 13 wherein the fixed focal length lens is a spacer optic located between two or more variable focal length lenses or between a variable focal length lens and an image sensor.

20. The system of claim 19 wherein the spacer optic is a material having an index of refraction greater than that of a surrounding medium; whereby the spacer optic serves to lengthen an effective optical path length between optical elements located on either side of it.

21. The system of claim 19 wherein the spacer optic has one or more optical surfaces patterned into it in order to modify one or more static optical properties to the system.

22. The system of claim 21 wherein the spacer optic includes a concave lens surface that adds negative focal power to the system.

23. The system of claim 21 wherein the spacer optic includes one or more diffraction gratings adapted to diffract portions of the light going through it.

24. The system of claim 21 wherein the spacer optic includes one or more optical coatings.

25. The system of claim 19 wherein the spacer optic provides structural support to the system.

26. The system of claim 19 wherein the spacer optic is component of integration and packaging of the system.

27. The system of claim 13 wherein an overall length of the system is less than about 10 mm.

28. The system of claim 13 wherein the system is configured as a zoom lens.

29. The system of claim 13 wherein the system is configured as an autofocus lens system.

30. The system of claim 13, further comprising one or more additional static optical elements.

31. The system of claim 30 wherein the one or more additional static optical elements include a wide-angle objective lens or lens group, achromatic lenses or lens groups.

32. The system of claim 13 wherein the variable focal length lens and fixed focal length optic are configured together as a component of a camera, microscope, telescope, rifle scope, or endoscope.

33. The system of claim 13 wherein the variable focal length lens includes:
an elastic capacitor section;
an elastic lens section in fluid communication with the capacitor section, the elastic lens section being characterized by a focal length;
a fluid capable of fluid motion disposed at least partially in the capacitor and lens sections.

34. The system of claim 13 wherein the variable focal length lens and fixed focal length optic are stacked together with zero or more additional variable focal length lenses in a digital focus lens system.

35. The system of claim 13 wherein the variable focal length lens and fixed focal length optic are stacked together with zero or more additional variable focal length lenses in a combinatorial optical processor comprising one or more optical modules; wherein at least one of the one or more optical modules includes N addressable optical elements, where N is an integer greater than or equal to 1.

36. An electro-fluidic optical system, comprising:
a mid-plane spacer having a central opening;
first and second transparent membranes disposed over the central opening;
a transparent fluid filling a space within the central opening bordered by the first and second membranes;
first and second electrodes, wherein the first and second electrodes have a degree of freedom of movement in an axial direction, wherein the mid-plane spacer and membranes are disposed between the first and second electrodes and wherein the first and second electrodes are supported from the mid-plane spacer by first and second flexible seals respectively, wherein the first and second flexible seals are configured to flex in an axial direction.

37. The system of claim 36 wherein the mid-plane spacer is constructed as a multi-layer printed circuit (PC) board.

38. The system of claim 37 wherein electrical connection is provided to the electrodes through the mid-plane spacer.

39. The system of claim 36 wherein one or more gaps between the electrodes and the mid-plane spacer permit some movement of the electrodes toward the spacer.

40. The system of claim 36 wherein the electrodes include aligned openings that permit expansion of the membranes.

41. The system of claim 36 wherein the mid-plane spacer includes one or more filler holes for the purpose of filling a space between the first and second membranes with fluid.

42. The system of claim 36 wherein the first and/or second flexible seals are ring-shaped.

43. The system of claim 36 wherein the first and/or second flexible seal includes an inner ring, an axially offset outer ring and a sloping section that connects the inner ring and outer ring.

44. The system of claim 43 wherein the sloping section provides the flexible seal with a certain amount of flexibility that allows the seal to be compressed axially.

45. The system of claim 36 wherein at least a portion of the first and/or second flexible seal is at least partially conductive in order to facilitate electrical connection of the flexible seal to the mid-plane spacer or to the first or second electrode.

46. The system of claim 36, wherein the mid-plane spacer includes corner spacers that rise slightly above a surface level of the mid-plane spacer, wherein the amount of rise is sufficient to prevent a snap down condition.

47. The system of claim 36, further comprising first and second inner membranes disposed between the first and second membranes, wherein the central opening is divided into first and second recesses with a central aperture communicating between the first and second recesses, wherein the first and second inner membranes cover opposite sides of the central aperture, wherein fluid fills the first recess between the first membrane and the first inner membrane and wherein fluid fills the second recess between the second membrane and the second inner membrane, whereby the system is divided into two dual surface fluid lens sections.

48. The system of claim 47 wherein the mid-plane spacer includes a vent that communicates with a space between the first and second inner membranes.

49. The system of claim 21 wherein the spacer optic includes a convex lens surface that adds positive focal power to the system.

50. The device of claim 5 wherein the electrode segments are configured to allow for actuation of the lens wherein the actuation includes adjustment of a tilt of the elastic lens section and/or control over a shape of the elastic lens section.

51. The system of claim 13 wherein the system is configured as an image stabilization system.

52. The device of claim I further comprising a projector, wherein the fluidic optical device is a variable lens coupled to the projector, wherein the lens is configured to project images at focal planes, wherein the focal planes are disposed at one or more distances from the projector.

53. The device of claim I further including a three-dimensional display system, wherein the fluidic optical device is a variable lens coupled to the three-dimensional display system, wherein the variable lens is configured to project a three-dimensional image by projecting images from the three-dimensional display system at one or more distances from the variable lens.

54. The device of claim 52 wherein the projector is a three-dimensional display system, wherein the fluidic optical device includes one or more additional variable lenses coupled to the three-dimensional display system, wherein the variable lens and the one or more additional variable lenses are configured to project a three-dimensional image by projecting images from the three-dimensional display system-at one or more distances from the variable lens.

55. The device of claim 1 further including a free-space three-dimensional display system, wherein the fluidic optical device is a variable lens coupled to the three-dimensional display system, wherein the variable lens is configured to project a three-dimensional image in free space by projecting images from the three-dimensional display system at one or more distances from the variable lens.

56. The device of claim 1 further including a randomly-addressable three-dimensional display system, wherein the fluidic optical device is a variable lens coupled to the three-dimensional display system, wherein the variable lens is configured to project images from the three-dimensional display system at randomly addressable focal planes at one or more distances from the variable lens.

57. The device of claim 1 further including a three-dimensional display system, wherein the fluidic optical device is a variable lens coupled to the three-dimensional display system, wherein the variable lens is configured to project a three-dimensional image by projecting images from the three-dimensional display system at one or more distances from the variable lens, wherein the three-dimensional display system further comprises one or more addressable optical elements, wherein the one or more addressable optical elements include one or more active optical elements, liquid crystals, polymer-dispersed liquid crystals, holographic polymer-dispersed liquid crystals, lenses or other optical elements dispersed in liquid crystals, electro-optics, nonlinear optics, electro-holographic optics, grating light valves, adaptive optics, varifocal mirrors, flexible mirror membranes, micro- electromechanical systems, variable lenses or micro-mirrors.

58. The device of claim 1 further including a three-dimensional display system, wherein the fluidic optical device is a variable lens coupled to the three-dimensional display system, wherein the variable lens is configured to project a three-dimensional image by projecting images from the three-dimensional display system at one or more distances from the variable lens, wherein the three-dimensional display system further comprises one or more addressable optical elements that are capable of being actively switched between two or more states of operation.

59. The device of claim I further including a three-dimensional display system, wherein the fluidic optical device is a variable lens coupled to the three-dimensional display system, wherein the variable lens is configured to project a three-dimensional image by projecting images from the three-dimensional display system at one or more distances from the variable lens, wherein the three-dimensional display system further comprises one or more lenses, prisms, mirrors, gratings, optical fiber or holographic optical elements.

60. The device of claim 1 further including a three-dimensional display system, wherein the fluidic optical device is a variable lens coupled to the three-dimensional display system, wherein the variable lens is configured to project a three-dimensional image by projecting images from the three-dimensional display system at one or more distances from the variable lens, wherein the three-dimensional display system further comprises one or more object sources, wherein the one or more object sources include one or more display sources, liquid crystals, lasers, light emitting diodes, mirrors, holographic optical elements, or micro-electro- mechanical mirrors.

61. The device of claim I further including a three-dimensional display system, wherein the fluidic optical device is a variable lens coupled to the three-dimensional display system, wherein the variable lens is configured to project a three-dimensional image by projecting images from the three-dimensional display system at one or more distances from the variable lens, wherein the three-dimensional display system further comprises one or more imaging medium or imaging chamber employed near or coinciding with at least a portion of three- dimensional image.

62. The device of claim 1 wherein the imaging medium is chosen from the group of light scattering particles, microscopic glass beads, liquid vapor, and ionized gases and fluorescing gases.

63. The device of claim I further including a three-dimensional display system, wherein the fluidic optical device is a variable lens coupled to the three-dimensional display system, wherein the variable lens is configured to project a three-dimensional image by projecting images from the three-dimensional display system at one or more distances from the variable lens, wherein the three-dimensional display system further comprises one or more at least partially reflective pointers, wherein the one or more at least partially reflective pointers include one or more physical objects, human fingers, pointing devices, pens or wands.

64. The device of claim 1 further including a three-dimensional display system, wherein the fluidic optical device is a variable lens coupled to the three-dimensional display system, wherein the variable lens is configured to project a three-dimensional image by projecting images from the three-dimensional display system at one or more distances from the variable lens, wherein the three-dimensional display system further comprises one or more physical feedback apparatus, wherein the one or more physical feedback apparatus include one or more gloves, pressure sensors or force feedback devices.

65. The device of claim 1 further including a three-dimensional display system, wherein the fluidic optical device is a variable lens coupled to the three-dimensional display system, wherein the variable lens is configured to project a three-dimensional image by projecting images from the three-dimensional display system at one or more distances from the variable lens, wherein the three-dimensional display system further includes one or more partial reflectors.

66. The device of claim 1 further including a three-dimensional display system, wherein the fluidic optical device is a variable lens coupled to the three-dimensional display system, wherein the variable lens is configured to project a three-dimensional image by projecting images from the three-dimensional display system at one or more distances from the variable lens, wherein the three-dimensional display system further includes one or more photodetectors, cameras, CMOS photodetectors, photomultiplier tubes, silicon photodetectors, germanium photodetectors, semiconductor detectors or detector arrays.

67. The device of claim 1 further including an interactive three-dimensional display system, wherein the fluidic optical device is a variable lens coupled to the three-dimensional display system, wherein the variable lens is configured to project a three-dimensional image by projecting images from the three-dimensional display system at one or more distances from the variable lens, wherein the three-dimensional display system further comprises one or more pointers or physical feedback apparatus wherein one or more of the presence or location of the pointers or physical feedback apparatus may be identified and utilized to enable observers to interact with the three-dimensional image.

68. The device of claim 1 further including an interactive three-dimensional display system, wherein the fluidic optical device is a variable lens coupled to the three-dimensional display system, wherein the variable lens is configured to project a three-dimensional image by projecting images from the three-dimensional display system at one or more distances from the variable lens, wherein the three-dimensional display system further includes one or more at least partially reflective pointers, wherein light reflected by the pointers is received by the three-dimensional display system thereby enabling the position of the pointers to be calculated by the three-dimensional display system and thereby allowing one or more observers controlling the pointers to interact with the three-dimensional image.

69. The device of claim 1 further including a three-dimensional display system, wherein the three-dimensional display system further includes one or more display source configured to generate image light, wherein the fluidic optical device is one or more variable lens coupled to the three-dimensional display system, wherein the display source and variable lens are synchronized such that the variable lens projects at least a portion of the image light, forming one or more image at one or more image plane locations.

70. The device of claim 69 wherein the images are generated at a sufficiently rapid frequency such that an observer may perceive the images to be appearing simultaneously.

71. The device of claim 70 wherein the images form the appearance of a three- dimensional image.

72. The device of claim 69 wherein the display source includes one or more liquid crystals, lasers, light emitting diodes, mirrors, holographic optical elements, or micro-electro-mechanical mirrors.

* * * * *